(12) United States Patent
Gavathiotis et al.

(10) Patent No.: US 12,440,494 B2
(45) Date of Patent: Oct. 14, 2025

(54) COMPOUNDS USEFUL FOR INHIBITING RAF DIMERS

(71) Applicant: ALBERT EINSTEIN COLLEGE OF MEDICINE, Bronx, NY (US)

(72) Inventors: Evripidis Gavathiotis, Roslyn, NY (US); Bogos Agianian, Bayside, NY (US)

(73) Assignee: ALBERT EINSTEIN COLLEGE OF MEDICINE, Bronx, NY (US)

( * ) Notice: Subject to any disclaimer, the term of this patent is extended or adjusted under 35 U.S.C. 154(b) by 910 days.

(21) Appl. No.: 17/432,589

(22) PCT Filed: Feb. 25, 2020

(86) PCT No.: PCT/US2020/019695
§ 371 (c)(1),
(2) Date: Aug. 20, 2021

(87) PCT Pub. No.: WO2020/176501
PCT Pub. Date: Sep. 3, 2020

(65) Prior Publication Data
US 2022/0265669 A1    Aug. 25, 2022

Related U.S. Application Data

(60) Provisional application No. 62/810,799, filed on Feb. 26, 2019, provisional application No. 62/810,056, filed on Feb. 25, 2019.

(51) Int. Cl.
| | | |
|---|---|---|
| *A61K 31/5377* | (2006.01) | |
| *A61K 31/495* | (2006.01) | |
| *A61K 31/5025* | (2006.01) | |
| *A61K 31/506* | (2006.01) | |
| *A61P 35/00* | (2006.01) | |
| *C07D 295/13* | (2006.01) | |
| *C07D 487/04* | (2006.01) | |

(52) U.S. Cl.
CPC ........ *A61K 31/5377* (2013.01); *A61K 31/495* (2013.01); *A61K 31/5025* (2013.01); *A61K 31/506* (2013.01); *A61P 35/00* (2018.01); *C07D 295/13* (2013.01); *C07D 487/04* (2013.01)

(58) Field of Classification Search
CPC .............. A61K 31/5377; A61K 31/495; A61K 31/5025; A61K 31/506; A61P 35/00; C07D 295/13; C07D 487/04
See application file for complete search history.

(56) References Cited

FOREIGN PATENT DOCUMENTS

| | | | |
|---|---|---|---|
| EP | 0847992 A1 | 6/1998 | |
| EP | 1724258 A1 | 11/2006 | |
| EP | 2107052 A1 * | 10/2009 | ........... C07C 275/24 |
| WO | 2002098839 A1 | 12/2002 | |
| WO | WO-02098839 A1 * | 12/2002 | ........... C07C 233/80 |
| WO | WO-2005034840 A2 * | 4/2005 | ............. C12Q 1/485 |
| WO | 2009002495 A1 | 12/2008 | |

(Continued)

OTHER PUBLICATIONS

International Search Report; International Application No. PCT/US2020/019695; International Filing Date—Feb. 25, 2020; Date of Mailing—Jun. 2, 2020, 4 pages.
Written Opinion of the International Searching Authority; International Application No. PCT/US2020/019695; International Filing Date—Feb. 25, 2020; Date of Mailing—Jun. 2, 2020, 9 pages.
"Braftovi" [Prescribing Information Datasheet]; Array Biopharma Inc.; 2020; Retrieved online from "https://www.fda.gov/drugsatfda"; 24 pages (2020).
Alexander, M. et al.; "Update 2020: Management of Non-Small Cell Lung Cancer"; Lung, vol. 198; pp. 897-907; DOI:10.1007/s00408-020-00407-5 (2020).
Araque, K. et al.; "Updates on the Management of Thyroid Cancer"; Horm Metab Res, vol. 50; pp. 562-577 (2020).
Combe, P. et al.; "Sustained response to vemurafenib in a low grade serous ovarian cancer with a BRAF V600E mutation"; Invest New Drugs, vol. 33; pp. 1267-1270; DOI:10.1007/s10637-015-0297-4 (2015).

(Continued)

*Primary Examiner* — Jeffrey H Murray
*Assistant Examiner* — Luisalberto Gonzalez
(74) *Attorney, Agent, or Firm* — CANTOR COLBURN LLP

(57) ABSTRACT

The disclosure provides compounds of Formula I (Formula I) (c) And the pharmaceutically acceptable salts thereof. The A, B, C, and D rings and the variables, $R^A$, $R^B$, $R^C$, $R^D$, $L_0$, $L_1$, $L_2$, and $L_2$, are defined herein. Compounds and salts of Formula I are useful as inhibitors of RAF kinase dimerization, including dimerization of wild type and mutant BRAF kinases. The disclosure includes pharmaceutical compositions comprising a compound or salt of Formula I. The disclosure also includes methods of treating a cancer susceptible to treatment with an inhibitor of BRAF dimers or BRAF dimerization, comprising administering a therapeutically effective amount of a compound or salt of Formula I to a patient in need of such treatment. These cancers susceptible to treatment with an inhibitor of BRAF dimers or BRAF dimerization include melanoma, thyroid cancer, hairy cell leukemia, ovarian cancer, lung cancer, and colorectal cancer.

(Formula I)

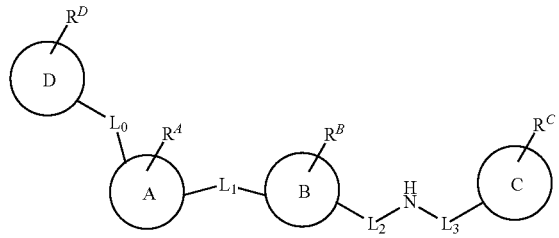

12 Claims, 16 Drawing Sheets

(56) References Cited

FOREIGN PATENT DOCUMENTS

| WO | 2011018170 A2 | 2/2011 |
| WO | 2014194667 A1 | 12/2014 |
| WO | 2016196940 A1 | 12/2016 |
| WO | 2017200826 A1 | 11/2017 |

OTHER PUBLICATIONS

Dietrich, S. et al.; "BRAF inhibition in hairy cell leukemia with low-dose vemurafenib"; Blood, vol. 27, Issue No. 23; pp. 2847-2855; DOI:10.1182/blood-2015-11-680074 (2016).

Grever, M.; "BRAF inhibitor: targeted therapy in hairy cell leukemia"; Blood, vol. 127, Issue No. 23; pp. 2784-2785; DOI: 10.1182/blood-2016-03-704262 (2016).

Hyman, D. et al.; "Vemurafenib in Multiple Nonmelanoma Cancers with BRAF V600 Mutations"; New England Journal of Medicine, vol. 373; pp. 726-736; DOI:10.1056/NEJMoa1502309 (2015).

Mendivil, A. et al.; "Dramatic clinical response following dabrafenib and trametinib therapy in a heavily pretreated low grade serous ovarian carcinoma patient with a BRAF V600E mutation"; Gyn Onc Rpts 26; pp. 41-44; DOI:10.1016/j.gore.2018.09.002 (2018).

\* cited by examiner

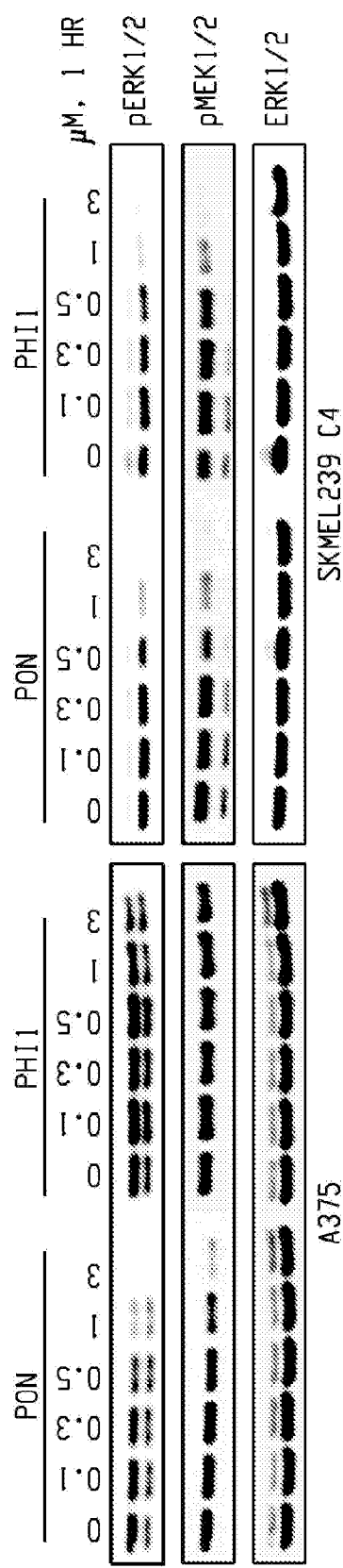
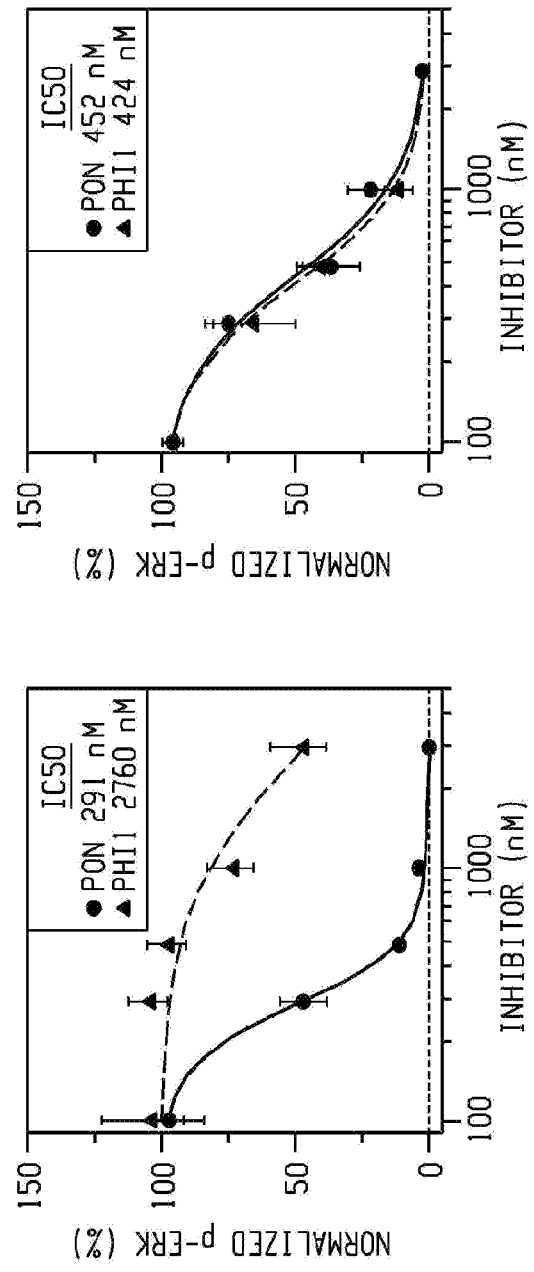
Fig. 2A
Fig. 2B

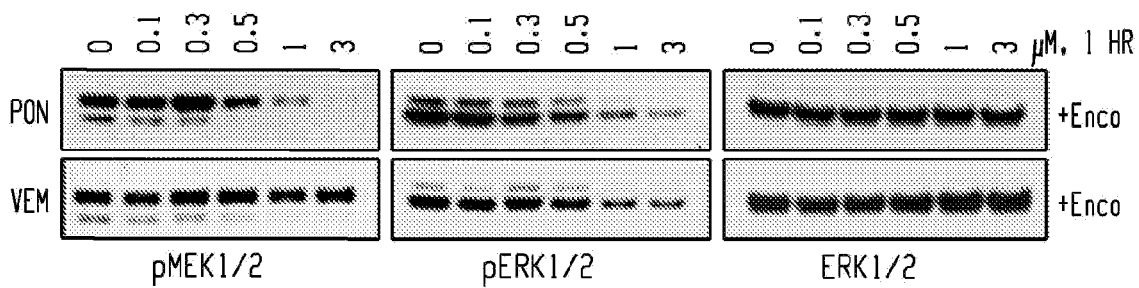
Fig. 4C
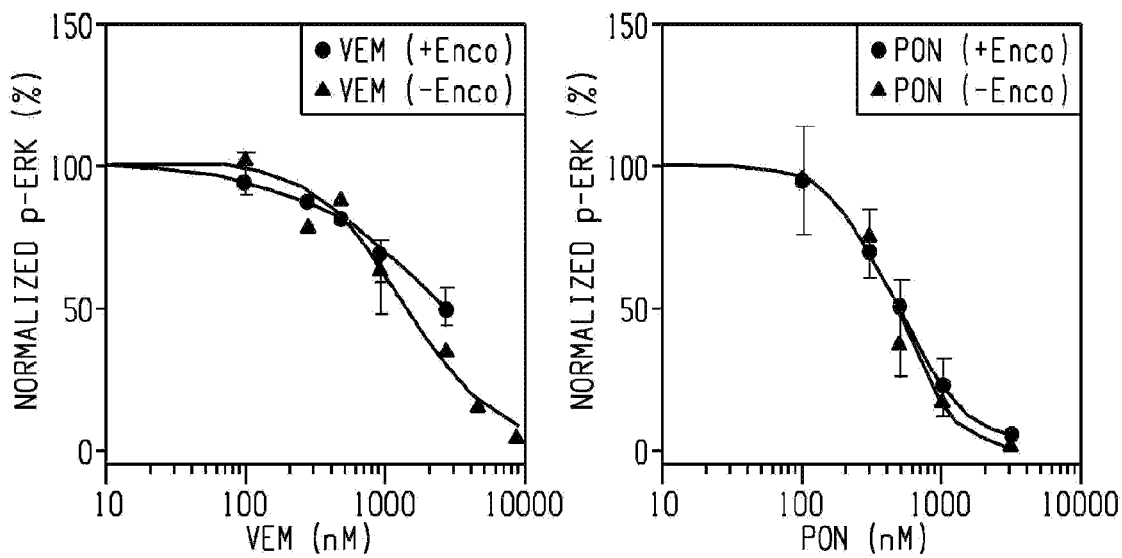
Fig. 4D
| IC50s OF pERK INHIBITION (nM) SKMEL239 C4 CELLS | | |
|---|---|---|
| | -Enco | +Enco |
| PHI1 | 424 | 134 |
| VEM | 2425 | 2504 |
| PON | 452 | 495 |
| AZ-628 | 33 | 40 |
| LY3009120 | 51 | 64 |
| TAK-632 | 83 | 71 |
Fig. 4E

* CROSSREACTIVITY BAND FROM PREVIOUS PERK PROBE

COMPOUNDS USEFUL FOR INHIBITING RAF DIMERS

CROSS REFERENCE TO RELATED APPLICATION

This application is a National Stage application of PCT/US2020/019695, filed Feb. 25, 2020, which claims priority to U.S. Provisional Application No. 62/810,056, filed Feb. 25, 2019 and U.S. Provisional Application No. 62/810,799, filed Feb. 26, 2019, each of which is hereby incorporated by reference in its entirety.

STATEMENT OF GOVERNMENT SUPPORT

This invention was made with government support under grant number CA238229 awarded by the National Institutes of Health. The government has certain rights in the invention.

FIELD OF THE DISCLOSURE

The disclosure is directed to compounds of Formula I, described herein, pharmaceutical compositions of compounds of Formula I, and methods of using compounds of Formula I to treat cancer, particularly cancers dependent on dimers of the RAF family, including cancers dependent on wild type BRAF dimers and mutant BRAF dimers, such as $BRAF^{V600E}$ dimers.

BACKGROUND

The RAS-RAF-MEK-ERK signaling pathway (Extracellular signal Related Kinase or ERK signaling) regulates mammalian cell growth, proliferation and survival. This pathway is normally activated by growth factor receptor signaling that promotes activation of RAS at the plasma membrane. RAF kinases (ARAF, BRAF, and CRAF isoforms) are subsequently recruited at the membrane by interaction with the active form of RAS bound to GTP, leading to a cascade of phosphorylation and activation steps of downstream kinases MILK 1/2 and ERK1/2. Aberrant activation of ERK signaling is a hallmark of many cancers most commonly due to mutations of RAS and BRAF. BRAF mutants are found in up to 9% of all human cancers and over 60% of melanoma.

Cancers dependent on dimers of RAF family, include cancers dependent on wild type BRAF dimers, $BRAF^{V600E}$ dimers, dimers of BRAF splice variants (including p61-BRAF) and BRAF fusions, and BRAF dimers belonging to Class II and Class III. Additional BRAF mutations associated with cancer include R4621, 1463S, G464V, G464E, G466A, G466E, G466V, G469A, G469E, D594V, F595L, G596R, L597V, L597R, T5991, V600D, V600K, V600R, T1 195, and K601E. Specifically, these cancers include pediatric-low grade gliomas, $BRAF^{V600E}$ gliomas, central nervous system tumors including primary CNS tumors such as glioblastomas, astrocytomas (e.g., glioblastoma multiforme) and ependymomas, and secondary CNS tumors (i.e., metastases to the central nervous system of tumors originating outside of the central nervous system).

RAF proteins activate ERK signaling as homo and heterodimers in the presence of active RAS. In contrast, $BRAF^{V600E}$ can activate ERK signaling independent of RAS as an active monomer. Drug development efforts have yielded three FDA-approved RAF inhibitors, vemurafenib, dabrafenib and encorafenib that show remarkable efficacy in patients with $BRAF^{V600E}$ melanoma tumors. However, drug resistance to these inhibitors is developed leading to short-term improvement of patients' survival.

Several mechanisms of clinical resistance to RAF inhibitors have been identified, including feedback re-activation of receptor tyrosine kinases and RAS, RAS mutations, BRAF amplification and expression of $BRAF^{V600E}$ splice variants. These resistance mechanisms commonly lead to reactivation of ERK signaling through RAF dimerization. Vemurafenib and dabrafenib are poor inhibitors of RAF dimers. This limitation led to the use of combinations of RAF and MEK inhibitors in $BRAF^{V600E}$ melanoma patients with a clear benefit in progression-free survival; although the same mechanisms promote resistance to the RAF and MEK inhibitors combination.

Consequently, RAF dimerization has been recognized as an important target for effective inhibition of ERK signaling in tumors. This disclosure provides inhibitors of RAF dimers useful for treating cancer, including tumors expressing BRAF mutations.

SUMMARY

The disclosure provides a compound of Formula I, or a pharmaceutically acceptable salt thereof,

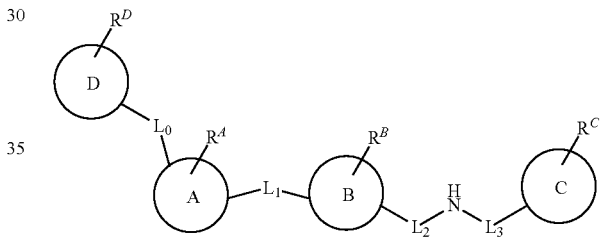

(Formula I)

Within Formula I the variables, e.g. Rings A, B, C, and D, linkers $L_0$, $L_1$, $L_2$, $L_3$, $R^D$, $R^A$, $R^B$, and $R^C$, carry the following definitions.

Ring A is a 5- or 6-membered aryl or heteroaryl group that is optionally substituted by one or more substituents independently chosen from $R^A$.

Ring B is a 5- or 6-membered aryl or heteroaryl group that is optionally substituted by one or more substituents independently chosen from $R^B$.

Ring C is a 5-6-membered heterocycloalkyl or heteroaryl group containing at least one Nitrogen ring atom and containing 0-3 additional ring heteroatoms independently chosen from N, O, and S, that is optionally substituted by one or more substituents independently chosen from $R^C$.

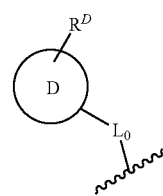

is optional.

Ring D, when present, is a 5- or 6-membered aryl or heteroaryl group or a bicyclic aryl or heteroaryl group containing 8-10 ring atoms, optionally substituted by one or more substituents independently chosen from $R^D$.

$L_0$ when present is a $C_1$-$C_4$alkylene linker in which one single bond is optionally replaced by a triple bond.

$L^1$ is —N(R$^1$)C(=O)—, —C(=O)N(R$^1$), —N(R$^1$)C(=O)O—, —OC(=O)N(R$^1$)—, —C(=O)S(=O)—, —S(=O)C(=O)—, —N(R$^1$)S(=O)—, —S(=O)N(R$^1$)—, —N(R$^1$)S(=O)$_2$—, —S(=O)$_2$N(R$^1$)—, or —N(R$^1$)C(=O)N(R$^1$)—.

$R^1$ is independently chosen at each occurrence from hydrogen and $C_1$-$C_2$alkyl.

$L_2$ is a $C_1$-$C_4$alkylene linker in which one single bond is optionally replaced by a triple bond.

$L_3$ is a bond or a $C_1$-$C_4$alkylene linker, which is optionally substituted with oxo.

$R^A$, $R^B$, and $R^D$ are independently chosen at each occurrence from halogen, hydroxyl, cyano, nitro, amino, oxo, and Y.

Y is a $C_1$-$C_8$ alkyl group, optionally chosen at each occurrence, in which any single bond is optionally replaced by a double or triple bond and one or more $CH_2$ groups in the $C_1$-$C_8$alkyl is optionally replaced by —O—, —S—, —S(=O)—, —S(=O)$_2$—, —P(=O)—, or N(R$^2$)—, and which is optionally substituted by one or more substituents independently chosen from halogen, hydroxyl, amino, cyano, oxo (=O), thiol (—SH), thione (=S), =NR$^1$, and $C_3$-$C_6$cycloalkyl.

$R^C$ is independently chosen at each occurrence from halogen, hydroxyl, cyano, nitro, amino, oxo, —SO$_2$F, —SO$_2$NH$_2$, Y, and Z.

Z is $C_3$-$C_6$cycloalkyl, $C_3$-$C_6$cycloalkenyl(C$_0$-$C_2$alkyl)-, aryl(C$_0$-$C_2$alkyl)-, (5- to 7-membered heterocycloalkyl)(C$_0$-$C_2$alkyl)-, (5- to 6-membered partially unsaturated heterocycloalkyl)(C$_0$-$C_2$alkyl), or (5- to 6 membered heteroaryl)(C$_0$-$C_2$alkyl)-, which Z$^1$ is optionally substituted by one or more substituents independently chosen from halogen, hydroxyl, cyano, nitro, oxo, amino, —SO$_2$F, —SO$_2$CH$_3$, and $C_1$-$C_6$ alkyl, in which any single bond is optionally replaced by a double or triple bond, and any —CH$_2$ group is optionally replaced by a S, N, or O heteroatom and which is optionally substituted by one or more independently chosen halogen, hydroxyl, amino, cyano, oxo, and amino substituents.

$R^2$ is independently chosen and each occurrence from hydrogen, $C_1$-$C_6$alkyl, and (C$_3$-$C_6$cycloalkyl)C$_0$-$C_4$alkyl-.

The disclosure includes pharmaceutical compositions comprising a compound of Formula I or salt thereof, together with a pharmaceutically acceptable carrier.

The disclosure includes methods of using a compound of Formula I or salt thereof, for treating a patient suffering from cancer, comprising administering a therapeutically effective amount of the compound or salt of Formula I to the patient. Cancers that can be treated using a compound of Formula I include cancers dependent on dimers of RAF family, including cancers dependent on wild type BRAF dimers, BRAF$^{V600E}$ dimers, dimers of BRAF splice variants (including p61-BRAF) and BRAF fusions, and BRAF dimers belonging to Class II and Class III. Examples of such cancers can include pediatric-low grade gliomas, BRAF$^{V600E}$ gliomas, central nervous system tumors including primary CNS tumors such as glioblastomas, astrocytomas (e.g., glioblastoma multiforme) and ependymomas, and secondary CNS tumors (i.e., metastases to the central nervous system of tumors originating outside of the central nervous system). The cancer can be melanoma, thyroid cancer, hairy cell leukemia, ovarian cancer, lung cancer, or colorectal cancer. The cancer can be a cancer susceptible to treatment with a RAF dimer inhibitor.

The disclosure includes a method of treating a patient suffering from a cancer, comprising (a) determining that a cell of the cancer contains a BRAF$^{V600E}$ mutation, and (b) administering a therapeutically effective amount of a compound of Formula I or salt thereof, to the patient.

DETAILED DESCRIPTION

Terminology

Figure 1:
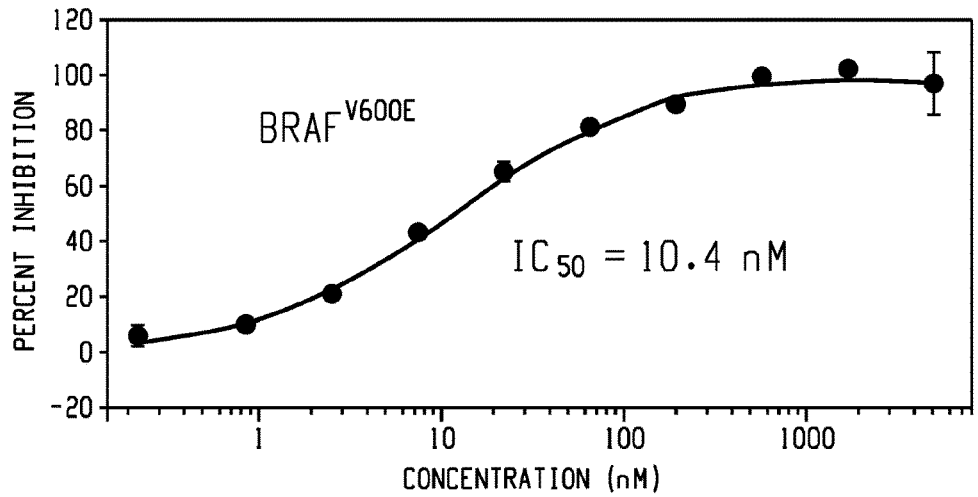
FIG. 1. Inhibition of BRAF$^{V600E}$ and, BRAF(WT)kinase activity by PHI1 using SelectScreen (Invitrogen) assay in the presence of 100 μM ATP. Half-maximal inhibition values (IC$_{50}$) in kinase activity by PHI1 are measured. Data represent mean±SD, n=3.
Figure 2:
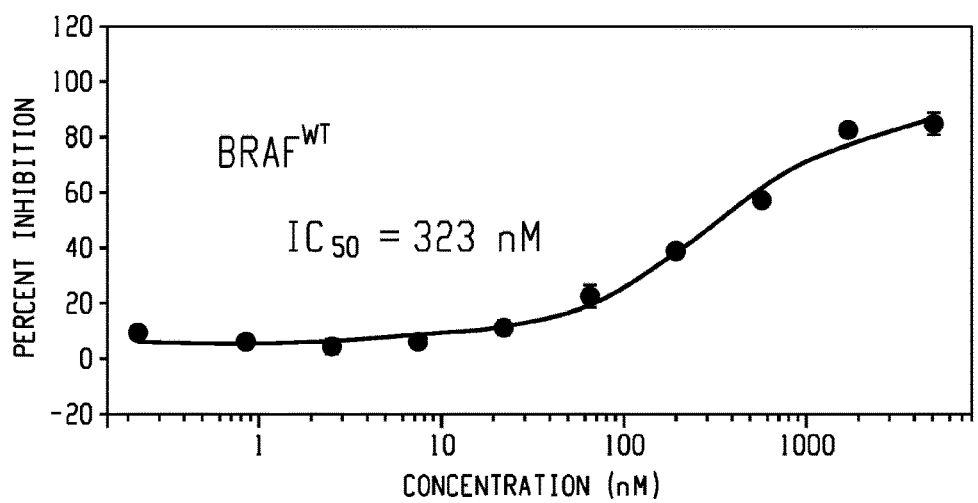
FIG. 2. PHI1 is a BRAF dimer inhibitor. (A) A375 melanoma cells (dependent on BRAF$^{V600E}$ monomers) or SMEL239 C4 melanoma cells (dependent on p61-BRAFV600E) were left untreated (regular media plus 0.2% DMSO) or treated for 1 hr with increasing concentrations of PHI1 or ponatinib. Activity was assayed with western blotting of pERK and pMEK, with ERK1/2 being the total ERK loading control. (B) normalized values (mean±SEM, n=3) of p-ERK inhibition, obtained by densitometry of the data in (A) with corresponding fitted curves. These data demonstrate PHI1 targets significantly better BRAF$^{V600E}$ dimer species compared to BRAF monomers.
Figure 3:
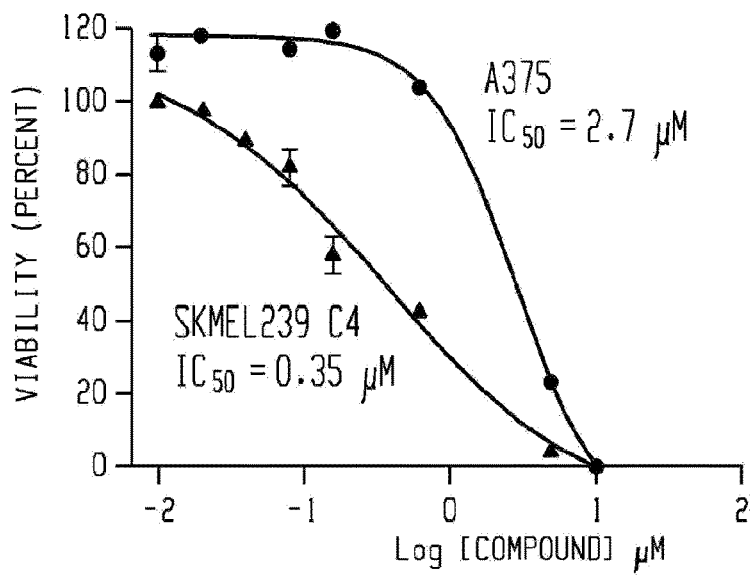
FIG. 3. Effect of PHI1 on the viability of A375 and SMEL239 C4 melanoma cells. Half-maximal effective values (EC$_{50}$) of viability were obtained by nonlinear regression fits using a four-parameter logistic curve. PHI1 inhibits effectively the growth of SMEL239 C4 cells but not A375 cells. Data represent mean±SEM, n=3.
Figure 4A:
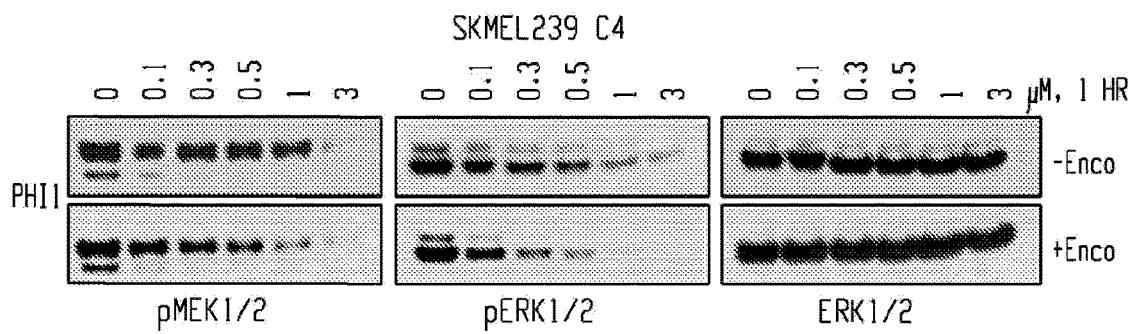
FIG. 4. PHI1 is a selective BRAF dimer inhibitor that displays positive co-operativity in second site inhibition of BRAF$^{V600E}$ dimer. SKMEL239 C4 cells without Encorafenib treatment and after Encorafenib treatment for 1 hr, followed by exchange with fresh medium for another hour, were treated with increasing concentrations of PHI1 (A) or PON and VEM (C) and cell lysates were assayed by western blot with the indicated antibodies to assess ERK-pathway inhibition. Representative blots from three independent experiments in each case is shown. Normalized values (mean±SD, n=3) obtained by densitometry and non-linear regression fits of p-ERK activity from PHI1treatment is shown in (B) and for VEM/PON in (D). is shown respectively. (E) Table summarizing p-ERK inhibition results from PHI1, VEM and PON in comparison to known BRAF inhibitors in Encorafenib-free and Encorafenib-treated SKMEL239 C4 cells. Only PHI1 displays positive co-operativity indicated by the lower IC50 upon Encorafenib pre-treatment.
Figure 4B:
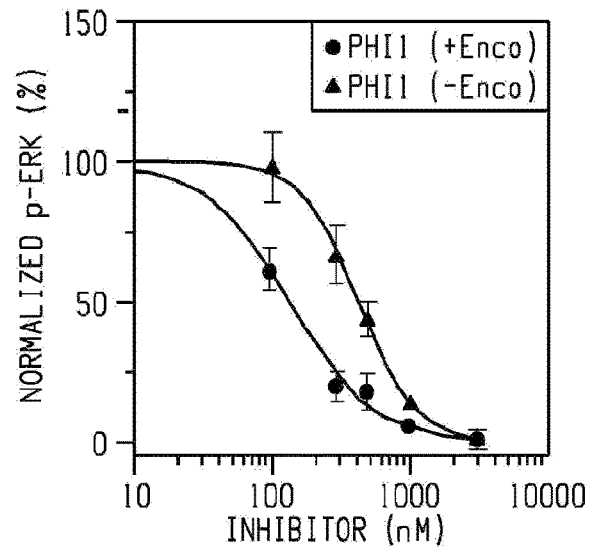
Figures 5A, 5B:
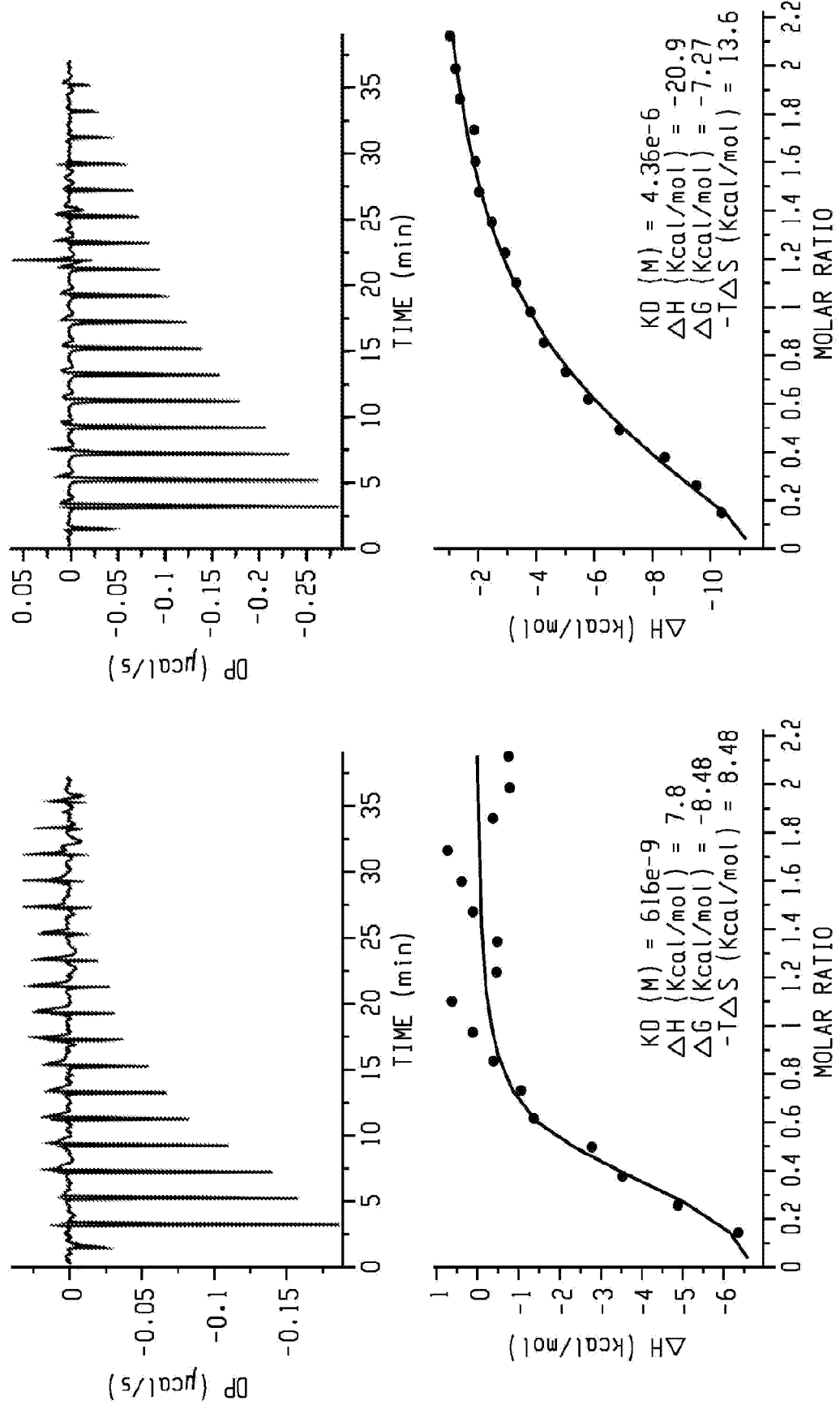
FIG. 5. Isothermal titration calorimetric (ITC) analysis of PHI1 binding to BRAF monomer, compared to ponatinib. BRAF509H mutant, which is unable to dimerize, was titrated in solutions of (A) PHI1 or (B) ponatinib. Heat was recorded on a MicroCal PEAQ-ITC instrument. The thermodynamic parameters demonstrate the distinct binding profile of PHI1 (vs. ponatinib) and high micromolar affinity for BRAF monomers, compared to low micromolar affinity for ponatinib.
Figure 6:
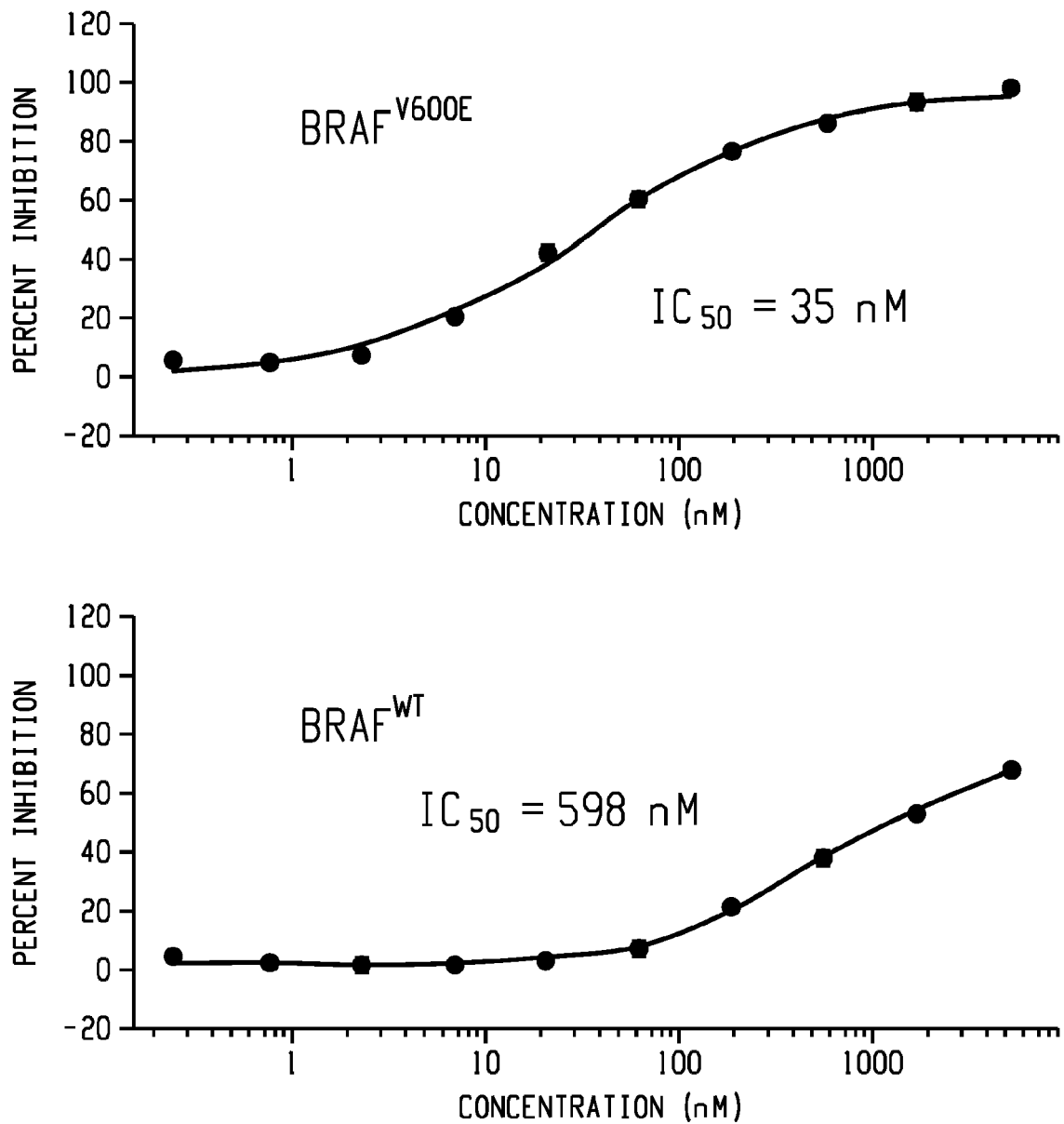
FIG. 6. Inhibition of BRAF$^{V600E}$ and, BRAF(WT)kinase activity by PHI2 using SelectScreen (Invitrogen) assay in the presence of 100 μM ATP. Half-maximal inhibition values (IC$_{50}$) in kinase activity by PHI1 are measured. Data represent mean±SD, n=3.

In order for the present disclosure to be more readily understood, certain terms and phrases are defined below and throughout the specification.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that includes more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," or the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. The open-end phrases such as "comprising" include and encompass the close-ended phrases. Comprising may be amended to the more limiting phrases "consisting essentially of" of "consisting of" as needed.

The definition of each expression, e.g., alkyl, Y, Z, or the like, when it occurs more than once in any structure, is intended to be independent of its definition elsewhere in the same structure.

It will be understood that "substitution" or "substituted with" includes the implicit proviso that such substitution is in accordance with permitted valence of the substituted atom and the substituent, and that the substitution results in a stable compound, e.g., a compound which does not spontaneously undergo transformation such as by rearrangement, cyclization, elimination, or other reaction.

The term "substituted" means that any one or more hydrogens on the designated atom or group is replaced with a selection from the indicated group, provided that the designated atom's normal valence is not exceeded. When the substituent by a group that is bound by a double bond, e.g. oxo (i.e., $=O$), then 2 hydrogens on the atom are replaced. When aromatic moieties are substituted by an oxo group, the aromatic ring is replaced by the corresponding partially unsaturated ring. For example, a pyridyl group substituted by oxo is a pyridone. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation into an effective therapeutic agent.

A dash ("—") that is not between two letters or symbols is used to indicate a point of attachment for a substituent.

The term "saturated," as used herein, pertains to compounds and/or groups which do not have any carbon-carbon double bonds or carbon-carbon triple bonds.

The term "unsaturated," as used herein, pertains to compounds and/or groups which have at least one carbon-carbon double bond or carbon-carbon triple bond.

Compounds of Formula I include compounds of the formula having isotopic substitutions at any position. Isotopes include those atoms having the same atomic number but different mass numbers. By way of general example, and without limitation, isotopes of hydrogen include tritium and deuterium and isotopes of carbon include $^{11}C$, $^{13}C$, and $^{14}C$. Compounds of Formula I also require enrichment of deuteration (substitution of a hydrogen atom with deuterium) at identified positions.

The term "alkyl" means a branched or unbranched aliphatic radical containing the indicated number of carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 2-methylcyclopentyl, and 1-cyclohexylethyl. When —$C_0$-$C_n$ alkyl is used in conjunction with another substituent, such as $C_3$-$C_6$cycloalkyl($C_0$-$C_2$alkyl)-the other substituent group is bound to the group it substitutes by a single bond ($C_0$) or by an alkylene linker having the indicated number of carbon atoms.

An "alkylene" group is a bivalent saturated alkyl radical having the indicated number of carbon atoms.

The term "alkoxy" as used herein means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "aromatic" refers to a planar or polycyclic structure characterized by a cyclically conjugated molecular moiety containing 4n+2 electrons, wherein n is the absolute value of an integer. Aromatic molecules containing fused, or joined, rings also are referred to as bicyclic aromatic rings. For example, bicyclic aromatic rings containing heteroatoms in a hydrocarbon ring structure are referred to as bicyclic heteroaryl rings.

The term "aryl," as used herein means a cyclic hydrocarbon that is aromatic and contains only carbon ring atoms. Examples include phenyl group, naphthyl, biphenyl, and anthracenyl groups. The aryl groups of the present disclosure can be optionally substituted with 1, 2, 3, 4 or 5 substituents.

The term "cyano" as used herein means a —C≡N group.

"Cycloalkyl" is a saturated carbocyclic ring having the indicated number of carbon ring atoms, for example $C_3$-$C_6$cycloalkyl is a cyclopropyl, cyclobutyl, cyclopentyl, or cyclohexyl group.

"Cycloalkenyl" is an unsaturated, but not aromatic, carbocyclic ring having the indicated number of carbon ring atoms, and at least on carbon-carbon double bond in the carbocyclic ring. Examples of $C_3$-$C_6$cycloalkenyl groups include is a cyclopropenyl, cyclobutenyl, and cyclohexenyl groups.

The term "hydrocarbon" as used herein refers to an organic compound consisting entirely of hydrogen and carbon.

The term "halo" or "halogen" means —$C_1$, —Br, —I or —F.

The term "heteroatom" as used herein is art-recognized and refers to an atom of any element other than carbon or hydrogen. Illustrative heteroatoms include boron, nitrogen, oxygen, phosphorus, sulfur and selenium.

"Heteroaryl" is a stable monocyclic aromatic ring having the indicated number of ring atoms which contains from 1 to 3, or in some embodiments from 1 to 2, heteroatoms chosen from N, O, and S, with remaining ring atoms being carbon, or a stable bicyclic or tricyclic system containing at least one 5- to 7-membered aromatic ring which contains from 1 to 3, or in some embodiments from 1 to 2, heteroatoms chosen from N, O, and S, with remaining ring atoms being carbon. Monocyclic heteroaryl groups typically have from 5 to 7 ring atoms. In some embodiments bicyclic heteroaryl groups are 9- to 10-membered heteroaryl groups, that is, groups containing 9 or 10 ring atoms in which one 5- to 7-member aromatic ring is fused to a second aromatic or non-aromatic ring. When the total number of S and O atoms in the heteroaryl group exceeds 1, these heteroatoms are not adjacent to one another. It is preferred that the total number of S and O atoms in the heteroaryl group is not more than 2. It is particularly preferred that the total number of S and O atoms in the aromatic heterocycle is not more than 1. Heteroaryl groups include, but are not limited to, oxazolyl, piperazinyl, pyranyl, pyrazinyl, pyrazolopyrimidinyl, pyrazolyl, pyridizinyl, pyridyl, pyrimidinyl, pyrrolyl, quinolinyl, tetrazolyl, thiazolyl, thienylpyrazolyl, thiophenyl, triazolyl, benzo[d]oxazolyl, benzofuranyl, benzothiazolyl, benzothiophenyl, benzoxadiazolyl, dihydrobenzodioxynyl, furanyl, imidazolyl, indolyl, and isoxazolyl.

The term "heterocycloalkyl," means a saturated ring group usually having 4- to 7-ring atoms with 1 or 2 ring atoms independently chosen from N, O, and S: Examples of heterocycloalkyl groups includes azepines, azetidinyl, morpholinyl, thiomorpholinyl, pyranyl, oxopiperidinyl, oxopyrrolidinyl, piperazinyl, piperidinyl, pyrrolidinyl, quinicludinyl, thiomorpholinyl, tetrahydropyranyl and tetrahydrofuranyl.

The term "hydroxyl" as used herein means an —OH group.

The term "nitro" as used herein means a —NO$_2$ group.

"RAF kinase family" refers to RAF kinases including ARAF, BRAF and CRAF

As used herein, the term "administering" means providing a pharmaceutical agent or composition to a subject, and includes, but is not limited to, administering by a medical professional and self-administering.

"Carrier" means a diluent, excipient, or vehicle with which an active compound is administered. A "pharmaceutically acceptable carrier" means a substance, e.g., excipient, diluent, or vehicle, that is useful in preparing a pharmaceutical composition that is generally safe, non-toxic and neither biologically nor otherwise undesirable, and includes a carrier that is acceptable for veterinary use as well as human pharmaceutical use. A "pharmaceutically acceptable carrier" includes both one and more than one such carrier.

"Pharmaceutical compositions" means compositions comprising at least one active agent, such as a compound or salt of Formula (I), and at least one other substance, such as a carrier. Pharmaceutical compositions meet the U.S. FDA's GMP (good manufacturing practice) standards for human or non-human drugs.

"Pharmaceutically acceptable salts" include derivatives of the disclosed compounds in which the parent compound is modified by making inorganic and organic, non-toxic, acid or base addition salts thereof. The salts of the present compounds can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reacting free base forms of these compounds with a stoichiometric amount of the appropriate acid. Such reactions are typically carried out in water or in an organic solvent, or in a mixture of the two. Generally, non-aqueous media such as ether, ethyl acetate, ethanol, isopropanol, or acetonitrile are used, where practicable. Salts of the present compounds further include solvates of the compounds and of the compound salts.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—(CH$_2$)n-COOH where n is 0-4, and the like. Lists of additional suitable salts may be found, e.g., in G. Steffen Paulekuhn, et al., *Journal of Medicinal Chemistry* 2007, 50, 6665 and *Handbook of Pharmaceutically Acceptable Salts: Properties, Selection and Use*, P. Heinrich Stahl and Camille G. Wermuth Editors, Wiley-VCH, 2002.

As used herein, the term "patient" means a human or non-human animal, e.g. a companion animal such as a cat or dog, selected for treatment or therapy.

As used throughout this application, the term "pharmaceutically effective amount of a compound for pharmaceutical use" shall mean an amount of compound that exhibits the intended pharmaceutical or therapeutic or diagnostic effect when administered.

"Therapeutically effective amount" or "effective amount" refers to the amount of a compound that, when administered to a subject for treating or diagnosing or monitoring a disease, or at least one of the clinical symptoms of a disease or disorder, is sufficient to affect such treatment for the disease, disorder, or symptom. The "therapeutically effective amount" can vary depending on the compound, the disease, disorder, and/or symptoms of the disease or disorder, severity of the disease, disorder, and/or symptoms of the disease or disorder, the age of the subject to be treated, and/or the weight of the subject to be treated. An appropriate amount in any given instance can be readily apparent to those skilled in the art or capable of determination by routine experimentation.

"Treating" or "treatment" of any disease or disorder refers to arresting or ameliorating a disease, disorder, or at least one of the clinical symptoms of a disease or disorder, reducing the risk of acquiring a disease, disorder, or at least one of the clinical symptoms of a disease or disorder, reducing the development of a disease, disorder or at least one of the clinical symptoms of the disease or disorder. "Treating" or "treatment" also refers to inhibiting the disease or disorder, either physically, (e.g., stabilization of a discernible symptom), physiologically, (e.g., stabilization of a physical parameter), or both, or inhibiting at least one physical parameter which may not be discernible to the subject. In the context of cancer, treatment includes an amount sufficient to effect remission, an amount effect to shrink a tumor, an amount effective to halt or slow tumor growth, an amount effective to decrease the probability of developing cancer in a patient having a known risk factor for cancer, such as a mutation associated with the risk of developing cancer.

Chemical Description

Compounds of Formula I may contain one or more asymmetric elements such as stereogenic centers, stereogenic axes and the like, e.g., asymmetric carbon atoms, so that the compounds can exist in different stereoisomeric forms. These compounds can be, for example, racemates or optically active forms. For compounds with two or more asymmetric elements, these compounds can additionally be mixtures of diastereomers. For compounds having asymmetric centers, all optical isomers in pure form and mixtures thereof are encompassed. In these situations, the single enantiomers, i.e., optically active forms can be obtained by asymmetric synthesis, synthesis from optically pure precursors, or by resolution of the racemates. Resolution of the racemates can also be accomplished, for example, by conventional methods such as crystallization in the presence of a resolving agent, or chromatography, using, for example a chiral HPLC column. All forms are contemplated herein regardless of the methods used to obtain them.

All forms (for example solvates, optical isomers, enantiomeric forms, polymorphs, free compound and salts) of an active agent may be employed either alone or in combination.

The term "chiral" refers to molecules, which have the property of non-superimposability of the mirror image partner.

"Stereoisomers" are compounds, which have identical chemical constitution, but differ with regard to the arrangement of the atoms or groups in space.

A "diastereomer" is a stereoisomer with two or more centers of chirality and whose molecules are not mirror images of one another. Diastereomers have different physical properties, e.g., melting points, boiling points, spectral properties, and reactivities. Mixtures of diastereomers may separate under high resolution analytical procedures such as electrophoresis, crystallization in the presence of a resolving agent, or chromatography, using, for example a chiral HPLC column.

"Enantiomers" refer to two stereoisomers of a compound, which are non-superimposable mirror images of one another. A 50:50 mixture of enantiomers is referred to as a racemic mixture or a racemate, which may occur where there has been no stereoselection or stereospecificity in a chemical reaction or process.

Stereochemical definitions and conventions used herein generally follow S. P. Parker, Ed., McGraw-Hill *Dictionary of Chemical Terms* (1984) McGraw-Hill Book Company, New York; and Eliel, E. and Wilen, S., *Stereochemistry of Organic Compounds* (1994) John Wiley & Sons, Inc., New York. Many organic compounds exist in optically active forms, i.e., they have the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory.

A "racemic mixture" or "racemate" is an equimolar (or 50:50) mixture of two enantiomeric species, devoid of optical activity. A racemic mixture may occur where there has been no stereoselection or stereospecificity in a chemical reaction or process.

RAF Dimer Inhibitors

The disclosure provides compounds of Formula I, as described in the SUMMARY section. Without wishing to be bound to any particular theory it is believed that these compounds exert anti-cancer activity by inhibiting RAF dimers or their formation and are particularly effective for inhibiting of dimers of mutant BRAF forms, such as BRAF$^{V600E}$, found in many cancers.

In addition to compounds of Formula I the disclosure includes compounds and the salt thereof of the following subformulae of Formula I. The variables, e.g. Rings A, B, C, and D, linkers $L_0$, $L_1$, $L_2$, $L_3$, $R^D$, $R^A$, $R^B$, and $R^C$, carry the definitions set forth in the SUMMARY section unless otherwise specified. Any combinations of variable definitions is included in the scope of the disclosure so long as a stable compound results.

The disclosure includes compounds of Formula I and salts thereof, wherein:

Ring A is phenyl optionally substituted with one or more $R^A$ substituents;

Ring B is phenyl optionally substituted with one or more $R^A$ substituents; and $L^1$ is $C(=O)N(R^1)$.

The disclosure includes compounds of Formula I and the pharmaceutically acceptable salts thereof of any of the following subformulae IA, IB, IC, ID, IE, and IF

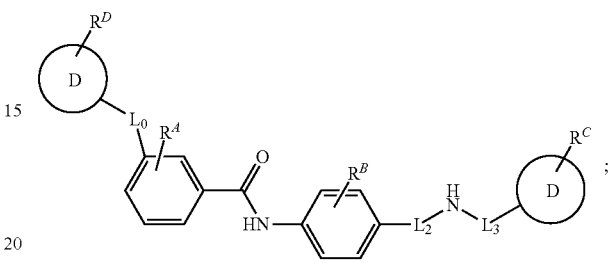

(Formula IA)

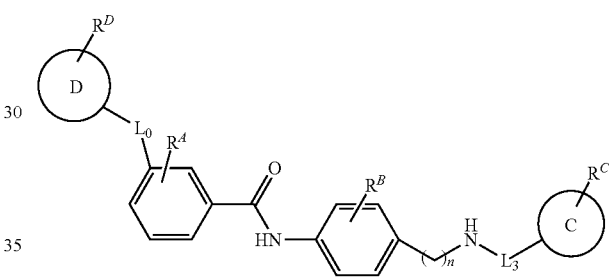

(Formula IB)

where n is 1 or 2.

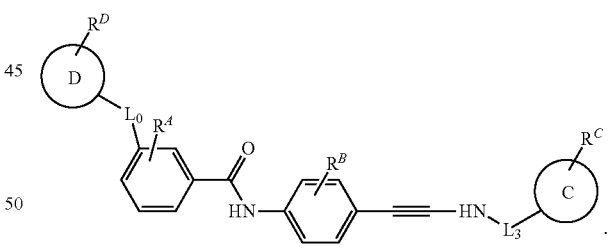

(Formula IC)

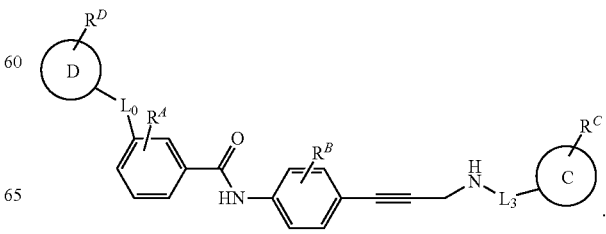

(Formula ID)

-continued

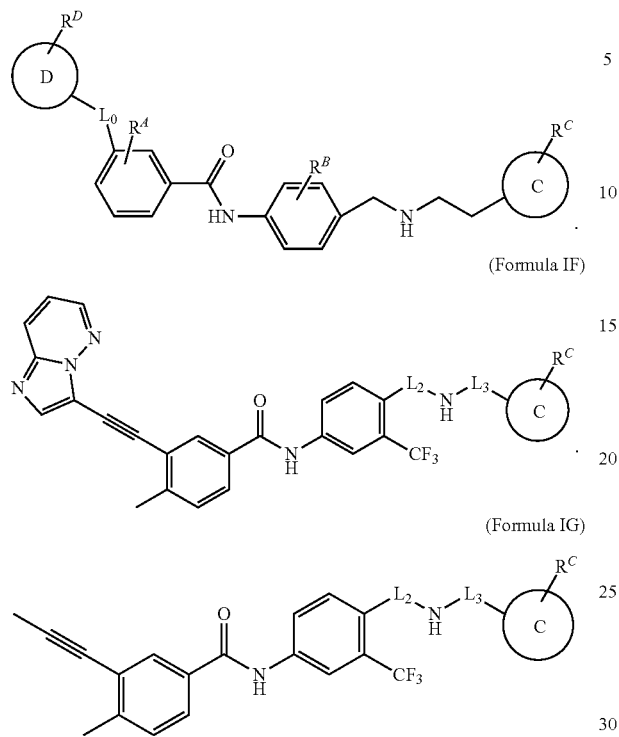

The disclosure includes compounds of Formula I and salts thereof in which

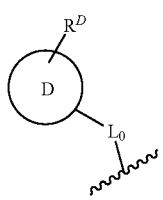

is present and in which

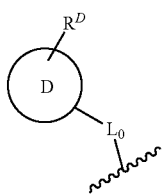

is absent.

The disclosure includes compounds of Formula I and salts thereof, wherein the D ring is chosen from

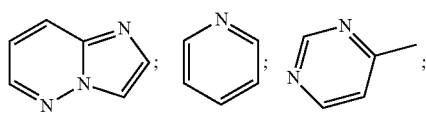

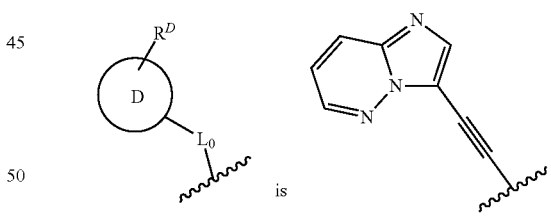

each of which D ring is attached to $L_0$ at any ring atom available for substitution, and each of which D group ia s optionally substituted with one or more substituents $R^D$. Preferably the D ring is unsubstituted or substituted with one or more substituents independently chosen from halogen, hydroxyl, cyano, nitro, amino, oxo, and Y.

The disclosure includes a compound of Formula I or salt thereof, wherein

In this embodiment $R^A$ is 4-methyl and $R^B$ is 3-trifluoromethyl.

The disclosure includes compounds of Formula I, its subformulae, such as IF, and salts thereof, wherein $L_2$ is —$CH_2$—, —C≡C— or —C≡C—$CH_2$ and $L_3$ is a bond, —$CH_2$—, or —$CH_2CH_2$—.

The disclosure includes compounds of Formula I and salts thereof, wherein $L_0$ is —$CH_2CH_2$— or —C≡C—.

The disclosure includes compounds of Formula I and salts thereof, wherein $L_3$ is —$CH_2CH_2$; and Ring C is a morpholine, thiomorpholine, or piperazine group that is unsubstituted or substituted with 1 or 2 substituents independently chosen from halogen, oxo, $C_1$-$C_2$alkyl, and $C_1$-$C_2$alkoxy.

The disclosure includes compounds of Formula I, and the subformulae thereof, wherein ring C

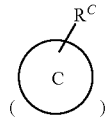

is a 6-membered heterocycloalkyl, partially unsubstituted, or heteroaryl group substituted with $R^C$.

The disclosure includes compounds of Formula I, and the subformulae thereof, wherein Ring C

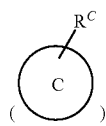

is a morpholine, piperidine, piperazine, oxadiazine, pyridine, pyrimidine, tetrahydropyrimidine, or dihydropyrimidine ring and the Ring C substituent, and $R^C$, is zero, or one or more substituents independently chosen from oxo, —$SO_2F$, —$SO_2NH_2$, -phenyl-$SO_2F$, Y, and Z.

In this embodiment Y is a $C_1$-$C_6$ alkyl group, in which any single bond is optionally replaced by a double or triple bond and one or more $CH_2$ groups in the $C_1$-$C_6$alkyl is optionally replaced by —O—, —S—, or $N(R^2)$—, and which is optionally substituted by one or more substituents independently chosen from halogen, hydroxyl, amino, and oxo (=O).

Z is a 6-membered heterocycloalkyl, a 6-membered partially unsaturated heterocycloalkyl, or a 6-membered heteroaryl), and -phenyl-$SO_2F$, which Z is optionally substituted by one or more substituents independently chosen from halogen, hydroxyl, cyano, nitro, oxo, amino, —$SO_2F$, —$SO_2CH_3$, and $C_1$-$C_6$ alkyl, in which any one —$CH_2$— is optionally replaced by —O—, and which is optionally substituted by one or more independently chosen halogen, hydroxyl, amino, cyano, oxo, and amino substituents.

In another embodiment the disclosure includes a compound or salt of any one of the above embodiments, wherein the Ring C

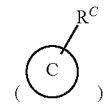

is a morpholine, piperidine, piperazine, oxadiazine, pyridine, pyrimidine, tetrahydropyrimidine, or dihydropyrimidine ring and the Ring C substituent, $R^C$, is zero, or one or more substituents independently chosen from oxo, —$C_1$-$C_4$alkyl, —$SO_2F$, —$SO_2NH_2$, -phenyl-$SO_2F$, —$SO_2C_1$-$C_4$alkyl, —C(=O)O$C_1$-$C_4$alkyl, and trifluoromethyl.

As another embodiment the disclose includes a compound or salt of any of the previous embodiment, wherein Ring

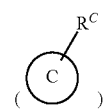

is a morpholine, piperidine, piperazine, oxadiazine, pyridine, pyrimidine, tetrahydropyrimidine, or dihydropyrimidine ring and the Ring C substituent, $R^C$, is Z, where Z is a 6-membered heterocycloalkyl, a 6-membered partially unsaturated heterocycloalkyl, -phenyl-$SO_2F$, or a 6-membered heteroaryl, which Z is optionally substituted by one or more substituents independently chosen from halogen, hydroxyl, cyano, nitro, oxo, amino, —$SO_2F$, —$SO_2CH_3$, and C(—$C_6$ alkyl, in which any one —$CH_2$— is optionally replaced by —O—, and which is optionally substituted by one or more independently chosen halogen, hydroxyl, amino, cyano, oxo, and amino substituents.

Also included are a compound of Formula I, or a pharmaceutically acceptable salt thereof, wherein the compound is

| Cmp. # | Structure | Name |
|---|---|---|
| PHI1 | 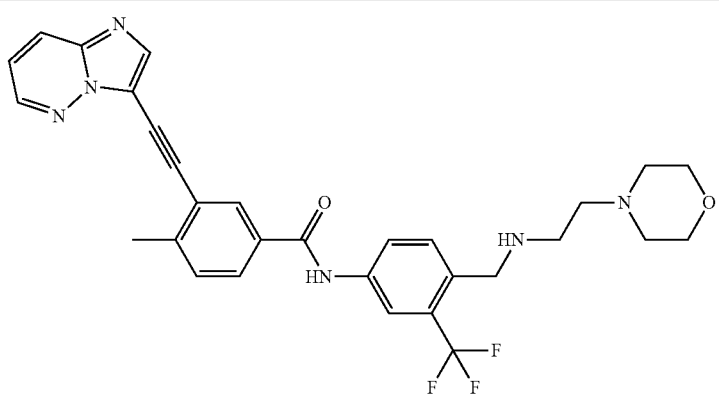 [SMILES: Cc1ccc(C(=O)Nc2ccc(CNCCN3CCOCC3)c(C(F)(F)F)c2)cc1C#Cc1cnc2cccnn12] | 3-(imidazo[1,2-b]pyridazin-3-ylethynyl)-4-methyl-N-(4-(((2-morpholinoethyl)amino)methyl)-3-(trifluoromethyl)phenyl)benzamide |

-continued

| Cmp. # | Structure | Name |
| --- | --- | --- |
| PHI2 | | N-(4-(((1-(6-ethylpyrimidin-4-yl)piperidin-4-yl)amino)methyl)-3-(trifluoromethyl)phenyl)-3-(imidazo[1,2-b]pyridazin-3-ylethynyl)-4-methylbenzamide |
| 3 | | 4-chloro-N-(4-(3-((2-morpholinoethyl)amino)prop-1-yn-1-yl)-3-(trifluoromethyl)phenyl)benzamide |
| PHI4 | | 4-chloro-N-(4-(3-((2-(2-oxomorpholino)ethyl)amino)prop-1-yn-1-yl)-3-(trifluoromethyl)phenyl)benzamide |
| PHI5 | | 4-chloroN-(4-(3-((2-(3,5-dioxopiperazin-1-yl)ethyl)amino)prop-1-yn-1-yl)-3-(trifluoromethyl)phenyl)benzamide |
| 2 | | 4-[2-[([4-[3-(2-[imidazo[1,2-b]pyridazin-3-yl]ethynyl)-4-methylbenzamido]-2-(trifluoromethyl)phenyl]methyl)amino]ethyl]piperazine-1-carboxylate |

-continued

| Cmp. # | Structure | Name |
|---|---|---|
| 4 | | 3-(imidazo[1,2-b]pyridazin-3-ylethynyl)-N-(4-(((2-(4-(6-methoxypyrimidin-4-yl)piperazin-1-yl)ethyl)amino)methyl)-3-(trifluoromethyl)phenyl)-4-methylbenzamide |
| 5 | | 3-(imidazo[1,2-b]pyridazin-3-ylethynyl)-4-methyl-N-(4-(((2-(4-oxopiperidin-1-yl)ethyl)amino)methyl)-3-(trifluoromethyl)phenyl)benzamide |
| 6 | | 3-(imidazo[1,2-b]pyridazin-3-ylethynyl)-4-methyl-N-(4-(((2-(4-(methylsulfonyl)piperazin-1-yl)ethyl)amino)methyl)-3-(trifluoromethyl)phenyl)benzamide |
| 7 | | 3-(imidazo[1,2-b]pyridazin-3-ylethynyl)-4-methyl-N-(4-(((2-(pyrimidin-4-yl)ethyl)amino)methyl)-3-(trifluoromethyl)phenyl)benzamide |
| 8 | | Methyl 4-[2-([[4-(3-Ethynyl-4-Methylbenzamido)-2-(Trifluoromethyl)Phenyl]Methyl]Amino)Ethyl]Piperazine-1-Carboxylate |
| 9 | | Tert-Butyl4-[2-([[4-(3-Ethynyl-4-Methylbenzamido)-2-(Trifluoromethyl)Phenyl]Methyl]Amino)Ethyl]Piperazine-1-Carboxylate |

| Cmp. # | Structure | Name |
| --- | --- | --- |
| 10 | | 3-ethynyl-4-methyl-N-(4-(((2-morpholinoethyl)amino)methyl)-3-(trifluoromethyl)phenyl)benzamide |
| 11 | | 3-Ethynyl-4-Methyl-N-[4-([[2-(4-Phenylpiperazin-1-Yl)Ethyl]Amino]Methyl)-3-(Trifluoromethyl)Phenyl]benzamide |
| 12 | | 3-Ethynyl-4-Methyl-N-[4-([[2-(Piperazin-1-Yl)Ethyl]Amino]Methyl)-3-(Trifluoromethyl)Phenyl]benzamide |
| 13 | | 3-(2-[imidazo[1,2-b]pyridazin-3-yl]ethynyl)-4-methyl-n-[4-([[2-(piperazin-1-yl)ethyl]amino]methyl)-3-(trifluoromethyl)phenyl]benzamide |
| 14 | | 3-Ethynyl-4-Methyl-N-(4-(((2-(4-(Pyridin-2-Yl)Piperazin-1-Yl)Ethyl)Amino)Methyl)-3-(Trifluoromethyl)Phenyl)benzamide |

-continued

| Cmp. # | Structure | Name |
|---|---|---|
| 15 | | 3-(imidazo[1,2-b]pyridazin-3-ylethynyl)-4-methyl-N-(4-(((2-(5-oxo-2-(trifluoromethyl)-5,6-dihydropyrimidin-4-yl)ethyl)amino)methyl)-3-(trifluoromethyl)phenyl)benzamide |
| 16 | | 3-(imidazo[1,2-b]pyridazin-3-ylethynyl)-4-methyl-N-(4-(((2-(2-oxomorpholino)ethyl)amino)methyl)-3-(trifluoromethyl)phenyl)benzamide |
| 17 | | N-(4-(((2-(3,5-dioxopiperazin-1-yl)ethyl)amino)methyl)-3-(trifluoromethyl)phenyl)-3-(imidazo[1,2-b]pyridazin-3-ylethynyl)-4-methylbenzamide |
| 18 | | 3-(imidazo[1,2-b]pyridazin-3-ylethynyl)-4-methyl-N-(4-(((2-(6-oxo-1,3,4-oxadiazinan-4-yl)ethyl)amino)methyl)-3-(trifluoromethyl)phenyl)benzamide |

-continued

| Cmp. # | Structure | Name |
|---|---|---|
| 19 | | 3-(imidazo[1,2-b]pyridazin-3-ylethynyl)-4-methyl-N-(4-(((2-(5-oxo-2-(trifluoromethyl)-5,6-dihydropyrimidin-4-yl)ethyl)amino)methyl)-3-(trifluoromethyl)phenyl)benzamide |
| 20 | | N-(4-(((2-(2,5-dioxo-1,2,5,6-tetrahydropyrimidin-4-yl)ethyl)amino)methyl)-3-(trifluoromethyl)phenyl)-3-(imidazo[1,2-b]pyridazin-3-ylethynyl)-4-methylbenzamide |
| 21 | | 3-(imidazo[1,2-b]pyridazin-3-ylethynyl)-4-methyl-N-(4-(3-((2-morpholinoethyl)amino)prop-1-yn-1-yl)-3-(trifluoromethyl)phenyl)benzamide |
| 22 | | 3-(imidazo[1,2-b]pyridazin-3-ylethynyl)-4-methyl-N-(4-(((2-(4-sulfamoylpiperazin-1-yl)ethyl)amino)methyl)-3-(trifluoromethyl)phenyl)benzamide |

-continued

| Cmp. # | Structure | Name |
| --- | --- | --- |
| 23 | | N-(4-(((2-(4-(hydroxymethyl)piperazin-1-yl)ethyl)amino)methyl)-3-(trifluoromethyl)phenyl)-3-(imidazo[1,2-b]pyridazin-3-ylethynyl)-4-methylbenzamide |
| 24 | | 3-(imidazo[1,2-b]pyridazin-3-ylethynyl)-4-methyl-N-(4-(((2-(4-(pyrimidin-4-yl)piperazin-1-yl)ethyl)amino)methyl)-3-(trifluoromethyl)phenyl)benzamide |
| 25 | | N-(4-(((2-(2,6-dioxomorpholino)ethyl)amino)methyl)-3-(trifluoromethyl)phenyl)-3-(imidazo[1,2-b]pyridazin-3-ylethynyl)-4-methylbenzamide |
| 26 | | 3-(imidazo[1,2-b]pyridazin-3-ylethynyl)-4-methyl-N-(4-(((2-(6-methylpyrimidin-4-yl)ethyl)amino)methyl)-3-(trifluoromethyl)phenyl)benzamide |

| Cmp. # | Structure | Name |
|---|---|---|
| 27 | 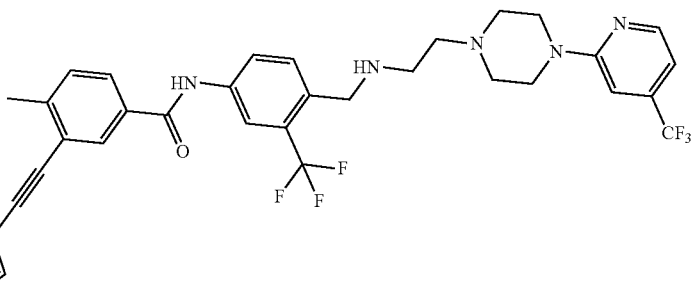 | 3-(imidazo[1,2-b]pyridazin-3-ylethynyl)-4-methyl-N-(3-(trifluoromethyl)-4-(((2-(4-(4-(trifluoromethyl)pyridin-2-yl)piperazin-1-yl)ethyl)amino)methyl)phenyl)benzamide |
| 28 | 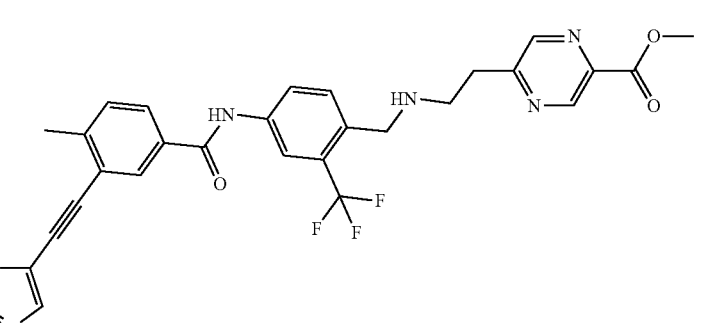 | methyl 5-(2-((4-(3-(imidazo[1,2-b]pyridazin-3-ylethynyl)-4-methylbenzamido)-2-(trifluoromethyl)benzyl)amino)ethyl)pyrazine-2-carboxylate |
| 29 | 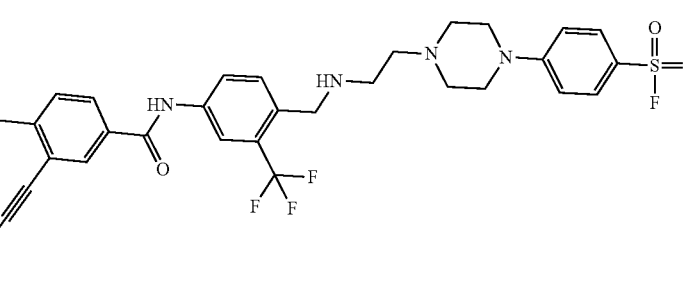 | 4-(4-(2-((4-(3-(imidazo[1,2-b]pyridazin-3-ylethynyl)-4-methylbenzamido)-2-(trifluoromethyl)benzyl)amino)ethyl)piperazin-1-yl)benzenesulfonyl fluoride |
| 30 | 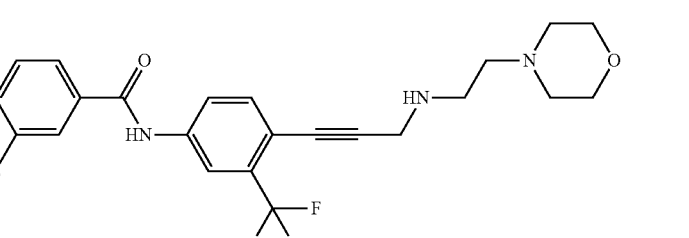 | 3-ethynyl-4-methyl-N-(4-(3-((2-morpholinoethyl)amino)prop-1-yn-1-yl)-3-(trifluoromethyl)phenyl)benzamide |
| 31 | 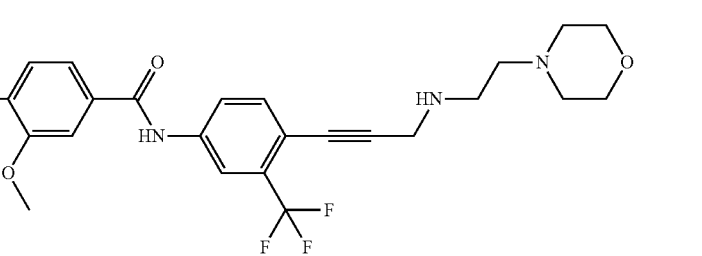 | 3-methoxy-4-methyl-N-(4-(3-((2-morpholinoethyl)amino)prop-1-yn-1-yl)-3-(trifluoromethyl)phenyl)benzamide |

| Cmp. # | Structure | Name |
|---|---|---|
| 32 | | 4-methyl-N-(4-(3-((2-morpholinoethyl)amino)prop-1-yn-1-yl)-3-(trifluoromethyl)phenyl)-3-vinylbenzamide |
| 33 | | 3-ethynyl-4-methyl-N-(4-(3-((2-(4-(methylsulfonyl)piperazin-1-yl)ethyl)amino)prop-1-yn-1-yl)-3-(trifluoromethyl)phenyl)benzamide |
| 34 | | N-(4-(3-((2-(3,5-dioxopiperazin-1-yl)-2-oxoethyl)amino)prop-1-yn-1-yl)-3-(trifluoromethyl)phenyl)-3-ethynyl-4-methylbenzamide |
| 35 | | 3-ethynyl-4-methyl-N-(4-(3-((2-(4-oxopiperidin-1-yl)ethyl)amino)prop-1-yn-1-yl)-3-(trifluoromethyl)phenyl)benzamide |
| 36 | | 3-ethynyl-4-methyl-N-(4-(3-((2-(piperazin-1-yl)ethyl)amino)prop-1-yn-1-yl)-3-(trifluoromethyl)phenyl)benzamide |
| 37 | | methyl 4-(2-((4-(3-ethynyl-4-methylbenzamido)-2-(trifluoromethyl)benzyl)amino)ethyl)piperazine-1-carboxylate |

| Cmp. # | Structure | Name |
|---|---|---|
| 38 | | 3-ethynyl-4-methyl-N-(4-(3-((2-(4-phenylpiperazin-1-yl)ethyl)amino)prop-1-yn-1-yl)-3-(trifluoromethyl)phenyl)benzamide |
| 39 | | 4-(4-(2-((3-(4-(3-ethynylbenzamido)-2-(trifluoromethyl)phenyl)prop-2-yn-1-yl)amino)ethyl)piperazin-1-yl)benzenesulfonyl fluoride |
| 40 | | 3-ethynyl-4-methyl-N-(4-(((2-(4-oxopiperidin-1-yl)ethyl)amino)methyl)-3-(trifluoromethyl)phenyl)benzamide |
| 41 | | N-(4-(((2-(3,5-dioxopiperazin-1-yl)ethyl)amino)methyl)-3-(trifluoromethyl)phenyl)-3-ethynyl-4-methylbenzamide |
| 42 | | 3-ethynyl-4-methyl-N-(4-(((2-(4-(pyrimidin-4-yl)piperazin-1-yl)ethyl)amino)methyl)-3-(trifluoromethyl)phenyl)benzamide |

| Cmp. # | Structure | Name |
| --- | --- | --- |
| 43 | | 3-ethynyl-4-methyl-N-(4-(((2-(4-phenylpiperazin-1-yl)ethyl)amino)methyl)-3-(trifluoromethyl)phenyl)benzamide |
| 44 | | 4-(4-(2-((4-(3-ethynyl-4-methylbenzamido)-2-(trifluoromethyl)benzyl)amino)ethyl)piperazin-1-yl)benzenesulfonyl fluoride |

Pharmaceutical Compositions

The disclosure includes pharmaceutical compositions comprising a compound of Formula I or a salt thereof.

The disclosure includes methods in which one or more compounds are an admixture or otherwise combined with one or more compounds and may be in the presence or absence of commonly used excipients (or "pharmaceutically acceptable carriers"); for example, but not limited to: i) diluents and carriers such as starch, mannitol, lactose, dextrose, sucrose, sorbitol, cellulose, or the like; ii) binders such as starch paste, gelatin, magnesium aluminum silicate, methylcellulose, alginates, gelatin, sodium carboxymethyl-cellulose, polyvinylpyrrolidone or the like; iii) lubricants such as stearic acid, talcum, silica, polyethylene glycol, polypropylene glycol or the like; iv) absorbents, colorants, sweeteners or the like; v) disintegrates, (e.g., calcium carbonate and sodium bicarbonate) such as effervescent mixtures or the like; vi) excipients (e.g. cyclodextrins or the like); vii) surface active agents (e.g., cetyl alcohol, glycerol monostearate), adsorptive carriers (e.g., kaolin and bentonite), emulsifiers or the like. Examples of carriers include, without limitation, any liquids, liquid crystals, solids or semi-solids, such as water or saline, gels, creams, salves, solvents, diluents, fluid ointment bases, ointments, pastes, implants, liposomes, micelles, giant micelles, or the like, which are suitable for use in the compositions.

Furthermore, the disclosure includes compositions prepared using conventional mixing, granulating, or coating methods and may contain 0.01 to 90% of the active ingredients. In some embodiments, the one or more compounds are for pharmaceutical use or for diagnostic use. Such methods can be used, for example, to prepare a bio-enhanced pharmaceutical composition in which the solubility of the compound(s) is (are) enhanced. In some embodiments, the resulting compositions contain a pharmaceutically effective amount of a compound for pharmaceutical or diagnostic use. The resulting compositions (formulations) may be presented in unit dosage form and may be prepared by methods known in the art of pharmacy. All methodology includes the act of bringing the active ingredient(s) into association with the carrier which constitutes one or more ingredients. Therefore, compositions (formulations) are prepared by blending active ingredient(s) with a liquid carrier or a finely divided solid carrier, and/or both, and then, if needed, shaping the product into a desired formulation.

Typical compositions of the disclosure contain compound from about 90 to about 80% by weight, from about 80 to about 70% by weight, from about 70 to about 60% by weight, from about 60 to about 50% by weight, from about 50 to about 40% by weight, from about 40 to about 30% by weight, from about 30 to 20% by weight, from about 20 to about 10% by weight, from about 10 to about 4% by weight, from about 4.0% to about 2.0% by weight, from about 2.0% to about 1.0% by weight, and even from about 1.0% to about 0.01% by weight. The effective amount of compounds or compositions of the disclosure may range from about 0.1 to 100 milligrams (mg) per kilogram (kg) of subject weight. In certain embodiments, the compounds or compositions of the disclosure are administered at from about 0.0001 mg/kg to 0.1 mg/kg (e.g. diagnostic monitoring), or from 0.1 mg/kg to 2 mg/kg, or from about 2 mg/kg to 5 mg/kg; in other embodiments, from about 5 mg/kg to 10 mg/kg, from about 10 mg/kg to 20 mg/kg, from about 20 mg/kg to 30 mg/kg, from about 30 mg/kg to 40 mg/kg, from about 40 mg/kg to 50 mg/kg, from about 50 mg/kg to 75 mg/kg or from about 75 mg/kg to 100 mg/kg.

It should be understood that the ingredients particularly mentioned above are merely examples and that some embodiments of formulations comprising the compositions of the present disclosure include other suitable components and agents. The invention further includes packages, vessels, or any other type of container that contain a compound of the present invention.

Methods of Treatment

The disclosure includes methods of treating a patient suffering from cancer, comprising administering a compound of Formula I or salt thereof to the patient. The cancer can be a cancer susceptible to treatment with an inhibitor of BRAF dimerization. Cancers dependent on dimers of RAF family, include cancers dependent on wild type BRAF dimers, $BRAF^{V600E}$ dimers, dimers of BRAF splice variants (including p61-BRAF) and BRAF fusions, and BRAF dimers belonging to Class II and Class III. In certain embodiments the cancer is a pediatric-low grade glioma, BRAF$^{V600E}$ glioma, central nervous system tumor, such as a primary CNS tumors including glioblastomas, astrocytomas (e.g., glioblastoma multiforme) and ependymomas, or a secondary CNS tumors (i.e., metastases to the central nervous system of tumors originating outside of the central nervous system).

Other RAF dependent cancers, including Barret's adenocarcinoma, billiary tract carcinomas, breast cancer, cervical cancer, cholangiocarcinoma, large intestinal colon carcinoma, gastric cancer, carcinoma of the head and neck including squamous cell carcinoma of the head and neck; hematologic cancers including leukemias and lymphomas such as acute lymphoblastic leukemia, acute myelogenous leukemia (AML), myelodysplastic syndromes, chronic myelogenous leukemia, Hodgkin's lymphoma, non-Hodgkin's lymphoma, megakaryoblastic leukemia, multiple myeloma and erythroleukemia, hepatocellular carcinoma, endometrial cancer, pancreatic cancer, pituitary adenoma, prostate cancer, renal cancer, sarcoma, may also be treated by administering a compound of Formula I or salt thereof to a patient having such a cancer.

The cancer can be melanoma, colorectal cancer, hairy cell leukemia, ovarian cancer, lung cancer, or thyroid cancer. In certain embodiments the cancer in a cancer having a BRAF$^{V600E}$ mutation.

The disclosure includes a method of treating a patient suffering from a cancer, comprising
(a) determining that a cell of the cancer contains a BRAF$^{V600E}$ mutation, and
(b) administering a therapeutically effective amount of a compound of Formula I or salt thereof to the patient.

The disclosure includes a method of treating a patient suffering from a cancer, comprising
(a) determining that a cell of the cancer contains a BRAF$^{V600E}$ mutation, and
(b) administering a therapeutically effective amount of a ponatinib or salt thereof to the patient.

In some embodiments, the one or more compounds, or compositions of the present disclosure, are administered to persons or animals to provide substances in any dose range that will produce desired physiological or pharmacological results. Dosage will depend upon the substance or substances administered, the therapeutic endpoint desired, the diagnostic endpoint desired, the desired effective concentration at the site of action or in a body fluid, and the type of administration. Information regarding appropriate doses of substances are known to persons of ordinary skill in the art and may be found in references such as L. S. Goodman and A. Gilman, eds, The Pharmacological Basis of Therapeutics, Macmillan Publishing, New York, and Katzung, Basic & Clinical Pharmacology, Appleton & Lang, Norwalk, Conn. (6.sup.th Ed. 1995). In some embodiments, the compounds and compositions of the present disclosure may be administered to a subject. Suitable subjects include a cell, population of cells, tissue or organism. In certain embodiments, the subject is a mammal such as a human. The compounds may be administered in vitro or in vivo.

Examples of methods of administration include, but are not limited to, oral administration (e.g., ingestion, buccal or sublingual administration), anal or rectal administration, topical application, aerosol application, inhalation, intraperitoneal administration, intravenous administration, transdermal administration, intradermal administration, subdermal administration, intramuscular administration, intrauterine administration, vaginal administration, administration into a body cavity, surgical administration, administration into the lumen or parenchyma of an organ, and parenteral administration. The compositions can be administered in any form by any means. Examples of forms of administration include, but are not limited to, injections, solutions, creams, gels, implants, ointments, emulsions, suspensions, microspheres, powders, particles, microparticles, nanoparticles, liposomes, pastes, patches, capsules, suppositories, tablets, transdermal delivery devices, sprays, suppositories, aerosols, or other means familiar to one of ordinary skill in the art.

The compound of Formula I can be the only active agent administered to a patient or it can be administered together with another active agent. Other active agents that can be administered together with a compound of Formula I or salt thereof include MEK inhibitors such as trametinib and cobimetinib, RAF inhibitors such as vemurafenib, sorafenib, encorafenib, and dabrafenib, anti-EGFR therapies such as cetuximab, panitumumab, afatinib, gefitinib and lapatinib, and PI3K inhibitors such as pictilisib, dactolisib and idelalisib. The compound of Formula I can also be administered together with or an ERK inhibitor, a SHP2 inhibitor, a KRAS inhibitor or a Receptor Tyrosine Kinase Inhibitor such as an EGFR, VEGF, FGFR, or IGFR inhibitor.

There are large numbers of antineoplastic agents available in clinical use, that may used in combination with a compound of Formula I or a salt thereof. And there are several major categories of such antineoplastic agents, namely, antibiotic-type agents, alkylating agents, antimetabolite agents, hormonal agents, immunological agents, interferon-type agents and a category of miscellaneous agents.

A first family of antineoplastic agents which may be used in combination with compounds of the present invention includes antimetabolite-type/thymidilate synthase inhibitor antineoplastic agents. Suitable antimetabolite antineoplastic agents may be selected from but not limited to the group consisting of 5-FU-fibrinogen, acanthifolic acid, aminothiadiazole, brequinar sodium, carmofur, cyclopentyl cytosine, cytarabine phosphate stearate, cytarabine conjugates, dezaguanine, dideoxycytidine, dideoxyguanosine, didox, doxifluridine, fazarabine, floxuridine, fludarabine phosphate, 5-fluorouracil, N-(21-furanidyl) fluorouracil, isopropyl pyrrolizine, methobenzaprim, methotrexate, norspermidine, pentostatin, piritrexim, plicamycin, thioguanine, tiazofurin, trimetrexate, tyrosine kinase inhibitors, and uricytin.

A second family of antineoplastic agents which may be used in combination with compounds of the present invention consists of alkylating-type antineoplastic agents. Suitable alkylating-type antineoplastic agents may be selected from but not limited to the group consisting of aldo-phosphamide analogues, altretamine, anaxirone, bestrabucil, budotitane, carboplatin, carmustine, chlorambucil, cisplatin, cyclophosphamide, cyplatate, diphenylspiromustine, diplatinum cytostatic, Erba distamycin derivatives, elmustine, estramustine phosphate sodium, fotemustine, hepsulfam, ifosfamide, iproplatin, lomustine, mafosfamide, mitolactolf, oxaliplatin, prednimustine, ranimustine, semustine, SmithKline spiromus-tine, tauromustine, temozolomide, teroxirone, tetraplatin and trimelamol.

A third family of antineoplastic agents which may be used in combination with compounds of the present invention consists of antibiotic-type antineoplastic agents. Suitaaclarubicin, actinomycin D, actinoplanone, aeroplysinin derivative, anthracycline, azino-mycin-A, bisucaberin, bleomycin sulfate, bryostatin-1, calichemycin, chromoximycin, dactinomycin, daunorubicin, ditrisarubicin B, doxorubicin, doxorubicin-fibrinogen, elsamicin-A, epirubicin, erbstatin, esorubicin, esperamicin-AI, esperamicin-Alb, fostriecin, glidobactin, gregatin-A, grincamycin, herbimycin, idarubicin, illudins, kazusamycin, kesarirhodins, menogaril, mitomycin, mitoxantrone, neoenactin, oxalysine, oxaunomycin, peplomycin, pilatin, pirarubicin, porothramycin, pyrindanycin A, Tobishi R$^A$-I, rapamycin, rhizoxin, rodorubicin, sibanomicin, siwenmycin, sorangicin-A, sparsomycin, terpentecin, thrazine, tricrozarin A, and zorubicin.

A fourth family of antineoplastic agents which may be used in combination with compounds of Formula I consists of a miscellaneous family of antineoplastic agents, including tubulin interacting agents, topoisomerase II inhibitors, topoisomerase I inhibitors and hormonal agents, selected from but not limited to the group consisting of x-carotene, X-difluoromethyl-arginine, acitretin, alstonine, amonafide, amphethinile, amsacrine, Angiostat, ankinomycin, anti-neoplaston A10, antineoplaston A2, antineoplaston A3, antineoplaston A5, antineoplaston aphidicolin glycinate, asparaginase, Avarol, baccharin, batracylin, benfluron, benzotript, bisantrene, bromofosfamide, caracemide, carmethizole hydrochloride, chlorsulfaquinoxalone, clanfenur, claviridenone, crisnatol, curaderm, cytochalasin B. cytarabine, cytocytin, DABIS maleate, dacarbazine, datelliptinium, didemnin-B, dihaematoporphyrin ether, dihydrolenperone, dinaline, distamycin, docetaxel elliprabin, elliptinium acetate, ergotamine, etoposide, etretinate, fenretinide, gallium nitrate, genkwadaphnin, grifolan NMF5N, hexadecylphosphocholine, homoharringtonine, hydroxyurea, ilmofosine, isoglutamine, isotretinoin, leukoregulin, lonidamine, marycin, merbarone, merocyanine derivatives, methylanilinoacridine, minactivin, mitonafide, mitoquidone mopidamol, motretinide, N-acylated-dehydroalanines, nafazatrom, nocodazole derivative, Normosang, ocreotide, oquizanocine, paclitaxel, pancratistatin, pazelliptine, ICRT peptide D, piroxantrone, polyhaematoporphyrin, polypreic acid, Efamol porphyrin, probimane, procarbazine, proglumide, razoxane, restrictin-P, retelliptine, retinoic acid, spatol, spirocyclopropane derivatives, spirogermanium, strypoldinone, Stypoldione, superoxide dismutase, teniposide, thaliblastine, tocotrienol, topotecan, Topostin, vinblastine sulfate, vincristine, vindesine, vinestramide, vinorelbine, vintriptol, vinzolidine, and withanolides. Alternatively, the present compounds may also be used in co-therapies with other anti-neoplastic agents, such as acemannan, aclarubicin, aldesleukin, alemtuzumab, alitretinoin, altretamine, amifostine, aminolevulinic acid, amrubicin, amsacrine, anagrelide, anastrozole, ancestim, bexarotene, bicalutamide, broxuridine, capecitabine, celmoleukin, cetrorelix, cladribine, clotrimazole, cytarabine ocfosfate, daclizumab, denileukin diftitox, deslorelin, dexrazoxane, dilazep, docetaxel, docosanol, doxercalciferol, doxifluridine, doxorubicin, bromocriptine, carmustine, cytarabine, fluorouracil, HIT diclofenac, interferon alfa, daunorubicin, doxorubicin, tretinoin, edelfosine, edrecolomab eflornithine, emitefur, epirubicin, epoetin beta, etoposide phosphate, exemestane, exisulind, fadrozole, filgrastim, finasteride, fludarabine phosphate, formestane, fotemustine, gallium nitrate, gemcitabine, gemtuzumab zogamicin, gimeracil/oteracil/tegafur combination, glycopine, goserelin, heptaplatin, human chorionic gonadotropin, human fetal alpha fetoprotein, ibandronic acid, idarubicin, (imiquimod, interferon alfa, interferon alfa, natural, interferon alfa-2, interferon alfa-2a, interferon alfa-2b, interferon alfa-NI, interferon alfa-n3, interferon alfacon1, interferon alpha, natural, interferon beta, interferon beta-Ia, interferon beta-Ib, interferon gamma, natural interferon gamma-Ia, interferon gamma-Ib, interleukin-I beta, iobenguane, irinotecan, irsogladine, lanreotide, LC 9018 (Yakult), leflunomide, lenograstim, lentinan sulfate, letrozole, leukocyte alpha interferon, leuprorelin, levamisole+fluorouracil, liarozole, lobaplatin, lonidamine, lovastatin, masoprocol, melarsoprol, metoclopramide, mifepristone, miltefosine, mirimostim, mismatched double stranded RNA, mitoguazone, mitolactol, mitoxantrone, molgramostim, nafarelin, naloxone+pentazocine, nartograstim, nedaplatin, nilutamide, noscapine, novel erythropoiesis stimulating protein, oprelvekin, osaterone, oxaliplatin, paclitaxel, pamidronic acid, pegaspargase, peginterferon alfa-2b, pentosan polysulfate sodium, pentostatin, picibanil, pirarubicin, rabbit antithymocyte polyclonal antibody, polyethylene glycol interferon alfa-2a, porfimer sodium, raloxifene, raltitrexed, rasburicase, rhenium Re 186 etidronate, RII retinamide, rituximab, romurtide, samarium (153 Sm) lexidronam, sargramostim, sizofiran, sobuzoxane, sonermin, strontium-89 chloride, suramin, tasonermin, tazarotene, tegafur, temoporfin, temozolomide, teniposide, tetrachlorodecaoxide, thalidomide, thymalfasin, thyrotropin alfa, topotecan, toremifene, tositumomab-iodine 131, trastuzumab, treosulfan, tretinoin, trilostane, trimetrexate, triptorelin, tumor necrosis factor alpha, natural, ubenimex, bladder cancer vaccine, Maruyama vaccine, melanoma lysate vaccine, valrubicin, verteporfin, vinorelbine, VIRULIZIN, zinostatin stimalamer, or zoledronic acid; abarelix; ambamustine, antisense oligonucleotide, bcl-2 (Genta), cetuximab, decitabine, dexaminoglutethimide, diaziquone, EL 532 (Elan), EM 800 (Endorecherche), eniluracil, etanidazole, fenretinidel filgrastim SDO1 (Amgen), fulvestrant, galocitabine, gastrin 17 immunogen, HLA-B7 gene therapy (Vical), granulocyte macrophage colony stimulating factor, histamine dihydrochloride, ibritumomab tiuxetan, ilomastat, IM 862 (Cytran), interleukin iproxifene, LDI 200 (Milkhaus), leridistim, lintuzumab, idiotypic, polymorphic epithelial mucin-yttrium 90 MAb (Antisoma), marimastat, menogaril, mitumomab, motexafin, gadolinium, Galderma, nelarabine, nolatrexed, P 30 protein, pegvisomant, pemetrexed, porfiromycin, prinomastat, RL 0903 (Shire), rubitecan, satraplatin, sodium phenylacetate, sparfosic acid, etrathiomolybdate, thaliblastine, thrombopoietin, tin ethyl etiopurpurin, tirapazamine, cancer vaccine (Biomira), melanoma vaccine melanoma oncolysate vaccine (New York Medical College), viral melanoma cell lysates vaccine (Royal Newcastle Hospital), or valspodar.

Biological Assays

To identify such new RAF inhibitors, we screened a panel of kinase inhibitors with various structures in a cell-based assay that probed the activity of BRAF dimers. Ponatinib, a multi-kinase inhibitor, approved for treating chronic myeloid leukemia, is a potent BRAF inhibitor that exhibits a unique binding mode by recognizing a previously undrugged allosteric pocket in BRAF kinase, in contrast to other marketed RAF inhibitors. Ponatinib creates inhibited symmetrical BRAF dimers and shows potent anti-proliferation activity in cancer cells driven by BRAF monomers and dimers. Ponatinib's mechanism of action and particular utility for treating cancers in which a BRAF mutation, such as a BRAF$^{V600E}$ mutation, was previously unrecognized. Inventors have provided additional, and surprisingly efficacious, compounds that further exploit the newly identified BRAF allosteric pocket and due to allosteric coupling with αC-helix, have increased specificity for BRAF$^{V600E}$ dimers.

BRAF kinase is a critical effector of the ERK signaling pathway, which is hyperactivated in many cancers. Oncogenic BRAF$^{V600E}$ kinase signals as an active monomer in the absence of RAS-GTP, however, in many tumors BRAF dimers mediate ERK signaling. Although clinical RAF inhibitors effectively target BRAF$^{V600E}$ monomers, prior to this disclosure selective inhibitors of BRAF dimers were elusive.

Ponatinib, CAS Reg. No. 943310-70-8, brand name ICLUSIG, is approved for treating chronic myeloid leukemia (CML) and Philadelphia chromosome positive acute lymphoblastic leukemia (Ph+ALL) including, and is particularly indicated for CML and Ph+ALL cancers that are positive for the BCR-ABL T315I mutation. It has the structure:

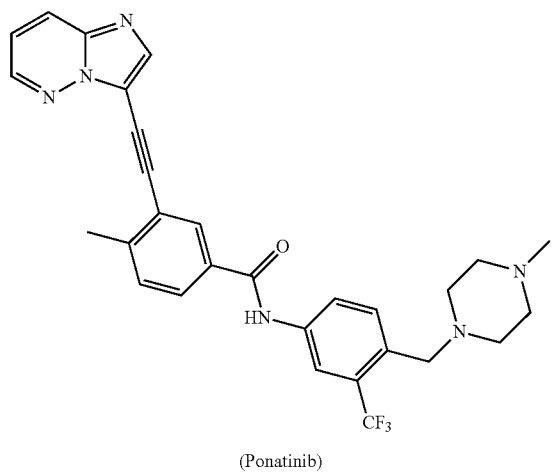 [SMILES: Cc1ccc(C(=O)Nc2ccc(CN3CCN(C)CC3)c(C(F)(F)F)c2)cc1C#Cc1cnc2cccnn12]

(Ponatinib)

EXAMPLES

General Methods
Compounds

Kinase inhibitors library was obtained from Selleck. Vemurafenib, Trametinib and Ponatinib were purchased from Selleck and purity >95% was confirmed by NMR and MS. All compounds were dissolved in DMSO to a 10 mM stock solution.

Antibodies

BRAF (Santa Cruz sc-5284), CRAF (Santa Cruz C-12) MEK1 (Millipore), MEK1/2 (Cell Signaling 4694), P-MEK1/2 (Cell Signaling 9154), ERK1/2 (Cell Signaling 4696), ERK1 (Santa Cruz sc-7383), P-ERK1/2 (Cell Signaling 4370), P-ERK1 (Santa Cruz 94), Actin (Invitrogen).

Cell Culture

Cell lines were purchased from ATCC or provided by Poulikos Poulikakos laboratory at Icahn School of Medicine at Mount Sinai. A375, SKMEL30 and SKMEL2 cells were grown in Dulbecco's modified Eagle's medium (DMEM) with 10% fetal bovine serum (FBS), 1% Pen-Strep, 1% Glutamine. SKMEL239 C$_4$ cells were grown in Dulbecco's modified Eagle's medium (DMEM) with 10% fetal bovine serum (FBS), 1% Pen-Strep, 1% Glutamine in the presence of 1 µM Vemurafenib. CALU6 cells were grown in Roswell Park Memorial Institute medium (RPMI) with 10% fetal bovine serum (FBS), 1% Pen-Strep, 1% Glutamine.

In-Cell-Western Screening

SKMEL239 clone 4 melanoma cells were plated in 96-well plate in DMEM 10% FBS, 1% Pen-Strep and 1% Glutamine, and allowed to seed overnight. Media was removed and replaced with fresh media containing 0.5 µM Vemurafenib and treated with 5 µM of corresponding kinase inhibitors and incubated for 3 hrs. Cells were then fixed in 4% formaldehyde for 20 min at room temperature (RT). Washed 4 times with 0.1% Triton in 1×PBS for 5 minutes at RT with gentle rocking. Cells were then rinse with 1×PBS and store in 1×PBS at 4° C. for future in-cell-western (ICW). For ICW, we followed LiCor PI-140 0103 Doc #988-07083 protocol with some modifications (https://www.licor.com/documents/k12xs979o8ku50313v3r0n15n47w0f0c). In brief, cells were blocked with Odyssey blocking solution (LiCor) for 1 hr at RT. Then cells were incubated with primary antibodies diluted in odyssey blocking buffer (1:200 P-ERK1 and 1:200 ERK1) for 2 hrs at RT. Follow by 4 washes with 0.1% Tween 20 in 1×PBS (PBST) for 5 min at RT. Then cells were incubated for 2 hrs at RT with secondary antibodies diluted in odyssey blocking buffer containing 0.2% Tween-20 (1:800 IRDye800 CW anti-mouse and 1:800 IRDye680R$^D$ anti-rabbit). Washed 4 times with PBST for 5 min at RT. Then rinsed once with 1×PBS, aspirated off and scanned plate with detection in both 700 and 800 nm channel with Odyssey Classic imager (ODY-0671). Quantification and analysis was performed using the Western Analysis tool from the Image Studio 3.1 software. Percent of phosphorylated-ERK1 was calculated by taking the total fluorescence levels of phosphorylated-ERK1 antibody staining divided by the total fluorescence levels of ERK1 antibody staining and normalized to percent of phosphorylated-ERK1 of untreated cells.

Western Blotting. Co-Immunoprecipitation and Kinase Activity Assays

Western blots were performed from whole cell lysates (WCL) prepared in lysis buffer containing 50 mM Tris-HCl pH7.5, 1% NP40, 150 mM NaCl, 1 mM EDTA and 10% glycerol in the presence of protease inhibitor cocktail (Roche). WCL were separated on a 4-12% NuPAGE MES gel (Invitrogen), transferred into a PVDF membrane, block for 1 hr and immunoblot with the corresponding anti-bodies. Co-immunoprecipitation assays were performed from whole cell lysate prepared in lysis buffer in the presence of protease inhibitor cocktail (Roche) and incubated at 4° C. overnight with gentle rotation, then protein G beads were added and incubated for 2 hrs more at 4° C. Kinase activity assay were performed following manufactured protocol with some modifications (Millipore). In brief, BRAF and CRAF kinase domain, and MEK1 recombinant proteins were incubated for 15 min with inhibitors, then corresponding substrates were added and incubated for 30 min at 30° C. and assay for western blot.

Cell Viability Assay

For cell viability assays, we followed the manufacturer's protocol for Cell-Titer Glo (Promega). In brief, cells were plated in 96-well plates at a density of 5000 cells per well. The next day, cells were treated with increasing concentrations of inhibitors for 72 hours at 37° C. At the end of the incubation period, 100 L of Cell-Titer Glo (Promega) was added to each well and further incubated for 15 min. at room temperature. Cell viability was determined by measuring luminescence and was detected by a F200 PRO microplate reader (TECAN). Viability assays were performed in at least triplicate and the data normalized to vehicle-treated control wells. IC$_{50}$ values were determined by nonlinear regression analysis using Prism software (Graphpad).

Cloning, Expression and Purification of BRAF

Human BRAF kinase domain (residues 443-723) with V600E mutation in addition to designed mutations to improve expression in E. coli as previously described[12] was cloned into the first multiple cloning site of a pET-28a vector, which expresses a hexa-histidine tag at the N-terminus of BRAF. Recombinant protein was transformed and expressed into E. coli strain BL21-Codon Plus(DE3)-RIPL (Agilent Technologies). Protein purification was performed by a rapid two-step procedure using nickel-affinity chromatography (Ni-NTA) followed by size exclusion chromatography with Superdex200 HR 10/30 (GE Healthcare). Ponatinib or PHI1 at 1.5 molar excess to the protein sample was added immediately after elusion from Ni-NTA column.

Kinase Activity Assay

BRAF kinase assays were performed using the Z'-LYTE™ enzymatic assay (Invitrogen, USA). Briefly, kinase activity was monitored in a cascade system consisting a mixture of inhibitor with BRAF or BRAFV600E/inactive MAP2K1 (MEK1)/inactive MAPK1 (ERK2)/Ser/Thr 03 peptide (Invitrogen) in 50 mM HEPES pH 7.5, 100 µM ATP, 10 mM MgCl2, 1 mM EGTA, 0.01% Brij-35. Titrations were performed using a 1:3 dilution. Assays were performed using SelectScreen (Invitrogen).

Biolayer Interferometry

Direct interactions between purified BRAF and Ponatinib or PHI1 were measured using biolayer interferometry on the Octet Red96 system (Forte Bio). BRAF was biotinylated using EZ-Link™ Sulfo NHS-LC-LC-Biotin (Invitrogen) in phosphate-buffered saline (PBS) according to manufacturer instructions. Excess biotin was removed using size exclusion chromatography. Freshly biotinylated protein was immobilized on Super Streptavidin biosensors (SSA) to high levels (6-8 nm) followed by quenching with biocytin. Compound binding experiments were performed at 25° C. in PBS, 0.01% Tween-20 and 2% DMSO. To reference for bulk solvent effects, binding curves were corrected using data from control protein-free SSA biosensors, which were included in each experiment and were treated similarly to protein-loaded sensors.

Pharmacophore-Based Drug Design

An in silico library of 3D compounds based on eMolecules (www.emolecules.com) library of 6.5 million purchasable compounds was generated using LIGPREP (LigPrep, version 3.8, Schrödinger, LLC) and EPIK (Epik, version 3.6, Schrödinger, LLC). The in silico library contained approximately 13.8 million compounds with different ionization state at pH 7.0±2.0, stereochemistry and tautomeric form, excluding potential Pan Assay Interference Compounds (PAINS) using PAINS definitions included in Canvas (Canvas, version 3.1, Schrödinger, LLC). Conforimation analysis of ligands was calculated using the OPLS3 force field. Phase (Phase, version 4.6, Schrödinger, LLC) module was used to generate a pharmacophore hypothesis and a 3D pharmacophore screen. The coordinates of the BRAF/Ponatinib structure were used and a pharmacophore hypothesis was generated to preserve trifluoro-phenyl and piperazine interactions of Ponatinib with BRAF and further additional interactions within the allosteric pocket. Pharmacophore hypothesis included 6 features as defined in Phase and included one aromatic ring, two positively charged groups, two hydrophobic points and one hydrogen bond acceptor. The pharmacophore screen searched the in silico library with the requirement to satisfy at least 5 out of the 6 pharmacophore features of the hypothesis. 200 hits were obtained that satisfied at least five out of seven pharamacophore constrains, comprising of diverse chemical groups. Fragments were computationally linked to the Ponatinib core structure (replacing the piperazine moiety) to produce ponatinib hybrid inhibitors. Virtual compounds were prepared with LIGPREP and EPIK and docked to BRAF$^{V600E}$ using GLIDE (Glide, version, Schrödinger, LLC). Docked compounds that demonstrated excellent fit to the pharmacophore model and have the most favorable interaction energies were selected for synthesis. Physicochemical and AMDET properties including Lipinski rules, permeability, logP, metabolic liabilities and hERG inhibition were evaluated using QikProp (QikProp, version 3.4, Schrödinger, LLC, New York, NY, 2011) to maintain or improve Ponaunib properties.

Isothermal Titration Calorimetry (ITC)

BRAF509H mutant was created using standard cloning procedures. This mutant is unable to dimerize in vitro (Rajakulendran T, Sahmi M, Lefrangois M, Sicheri F, Therrien M. A dimerization-dependent mechanism drives RAF catalytic activation. Nature. 2009 24; 461(7263):542-5). ITC was recorded using a MicroCal PEAQ-ITC instrument. Solutions of PHI1 or ponatinib (10 µM) made in PBS plus 2% DMSO were used in the cell compartment. BRAFR509H in PBS was concentrated to 150 µM in the presence of vemurafenib. Immediately before each ITC measurement, concentrated protein solution was diluted 0.8× in PBS, matched to 2% DMSO and used in the syringe. Protein was titrated in 18 or 20 injections of 2 l volume until saturation. Thermodynamic parameters were obtained using PEAQ-ITC analysis software and a one-site binding model.

Chemical Synthesis

All chemical reagents and solvents were obtained from commercial sources (Aldrich, Acros, Fisher) and used without further purification unless otherwise noted. Anhydrous solvents (tetrahydrofurane, toluene, dichloromethane, diethyl ether) were distilled in house before use. Chromatography was performed on a Biotage Isolera CombiFlash using silica gel column (200 mesh). Analytical thin layer chromatography (TLC) was performed on aluminum-backed Silicycle silica gel plates (250 m film thickness, indicator F254). Compounds were visualized using a dual wavelength (254 and 360 nm) UV lamp and/or staining with CAM (cerium ammonium molybdate) or $KMnO_4$ stains. NMR spectra were recorded on Bruker AVANCE III 300. $^1H$ and $^{13}C$ chemical shifts (δ) are reported relative to tetramethyl silane (TMS, 0.00/0.00 ppm) as internal standard or to residual solvent ($CD_3OD$: 3.31/49.00 ppm; $CDCl_3$: 7.26/77.16 ppm; dmso-$d_6$: 2.50/39.52 ppm). Mass spectra were recorded on a Shimadzu LCMS 2020.

DMF was dried over activated 4 Å molecular sieves. FastWoRX was purchased from Faster Chemistry LLC. Microwave heated reactions were performed with an Anton Paar Monowave 300. Chromatography was performed on a Teledyne ISCO CombiFlash $R_f$ 200i using disposable silica cartridges. Analytical thin layer chromatography (TLC) was performed on Merck silica gel plates and compounds were visualized using UV. NMR spectra were recorded on a Bruker 600 spectrometers. The Bruker 600 NMR instrument was purchased using funds from NIH award 1S10OD016305. $^1H$ chemical shifts (δ) are reported relative to tetramethyl silane (TMS, 0.00 ppm) as internal standard or relative to residual solvent signals. Mass spectra were recorded by the Proteomics Facility at the Albert Einstein College of Medicine.

Example 1. Ponatinib is a Potent Braf Inhibitor

Figure 9A:
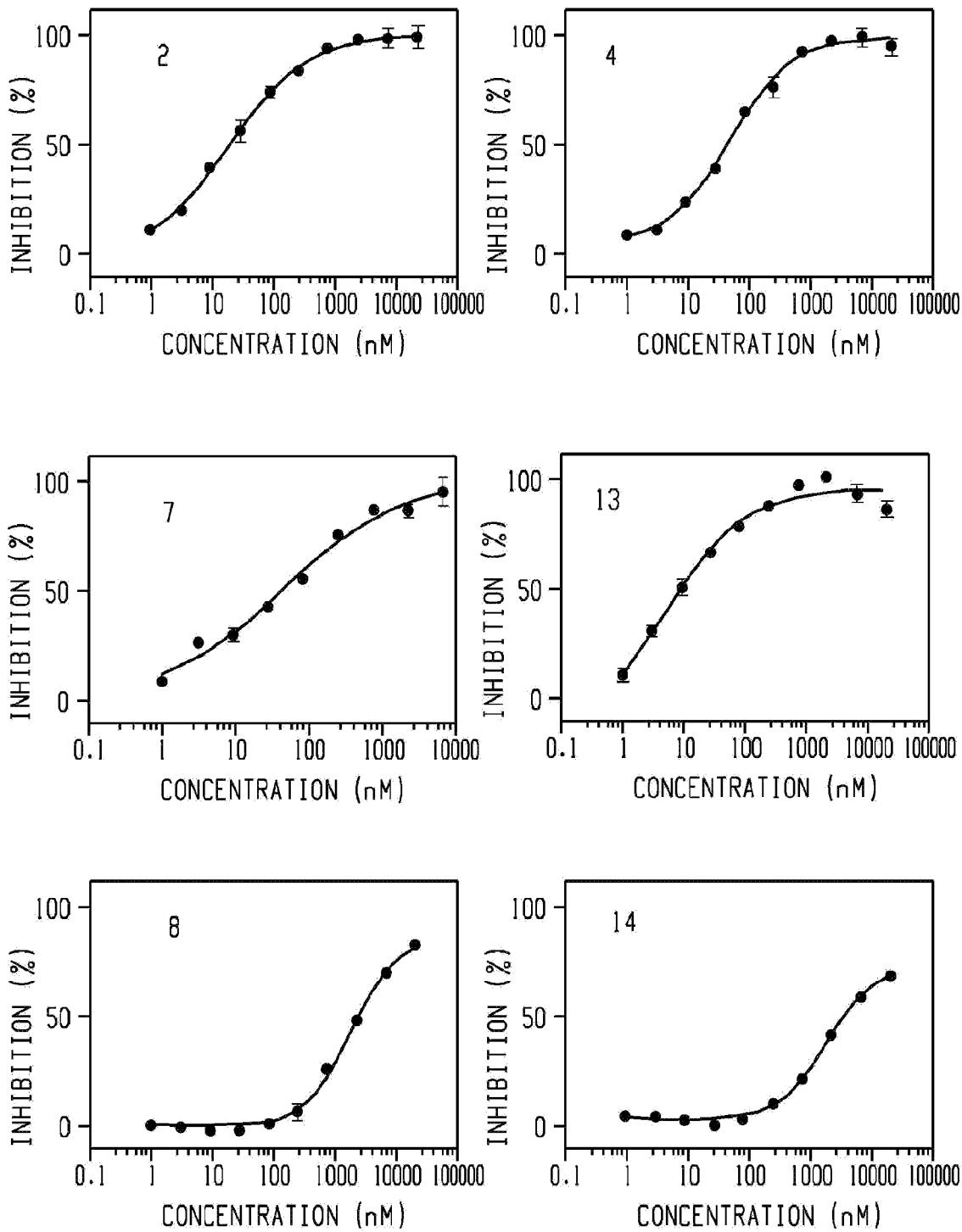
FIG. 9. In vitro kinase inhibition activity. Inhibition profiles of BRAFV600E kinase activity using Z'-LYTE™ assay in the presence of 100 μM ATP. Data represent mean SD, n=3. Half-maximal inhibition values (IC50s) derived from least square fits (shown) are provided in TABLE 1.
Figure 9B:
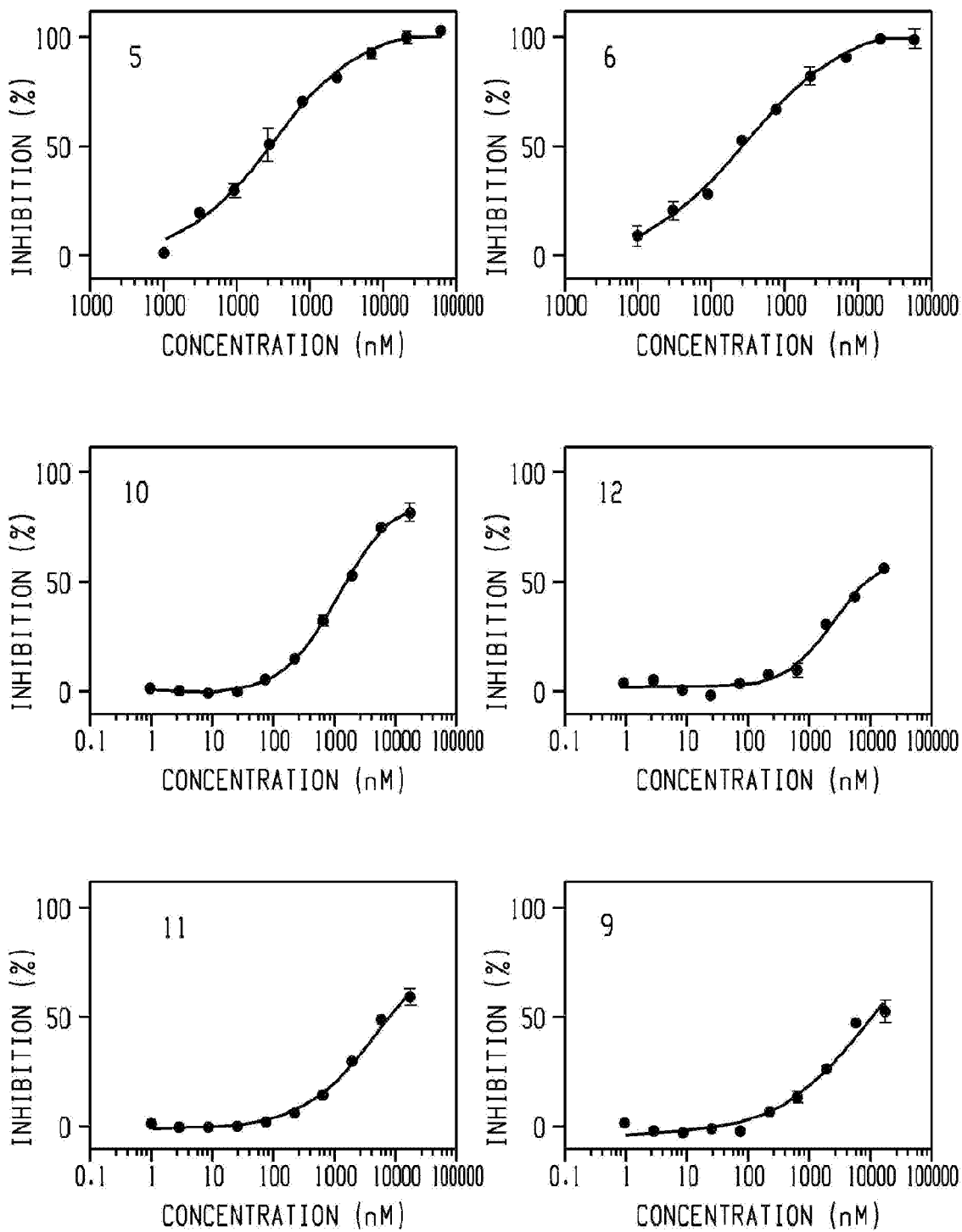
Figure 10A:
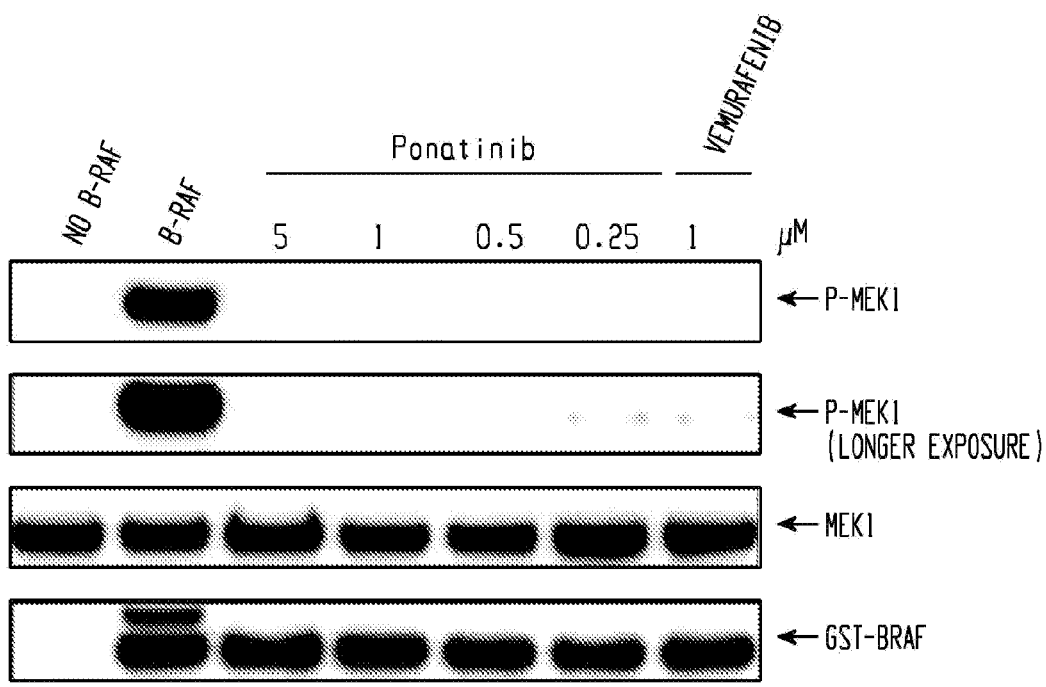
FIG. 10. (A) BRAF kinase activity in the absence or presence of BRAF kinase activity assay in the absence or presence of ponatinib or vemurafenib, then assayed for western blot with the indicated antibodies. (B) Potantinb does not inhibit MEK. MEK kinase activity assay in the absence or presence of ponatinib or trametinib at the indicated doses, then was assayed by western blot with the indicated antibodies.
Figure 10B:
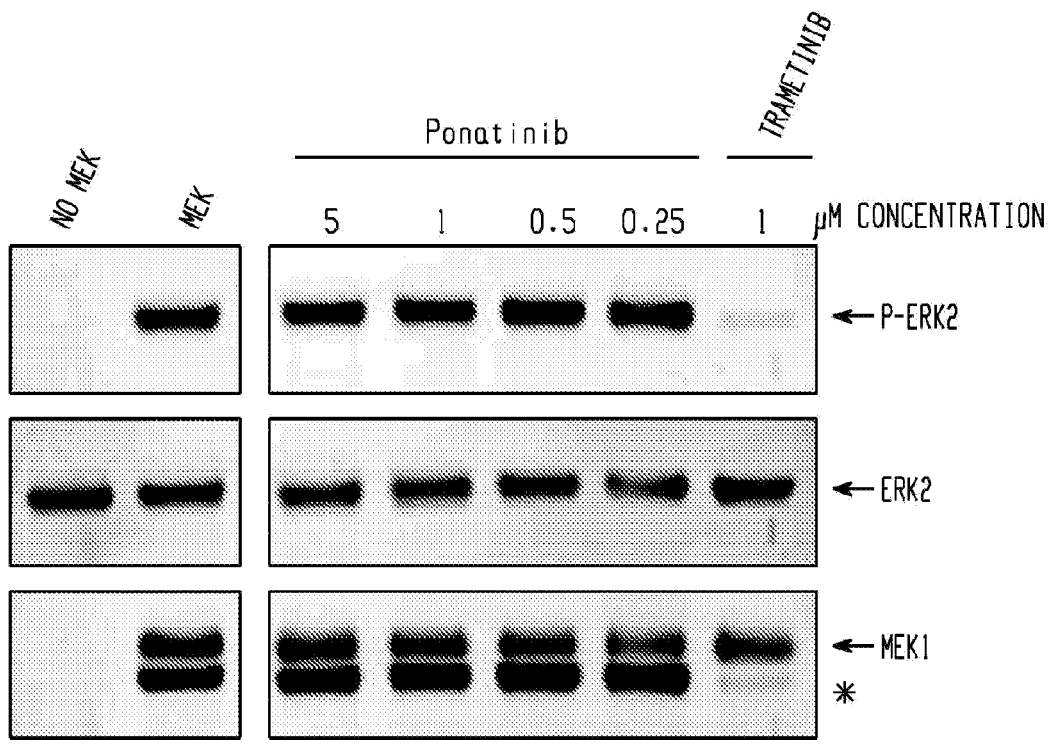
Figure 11:
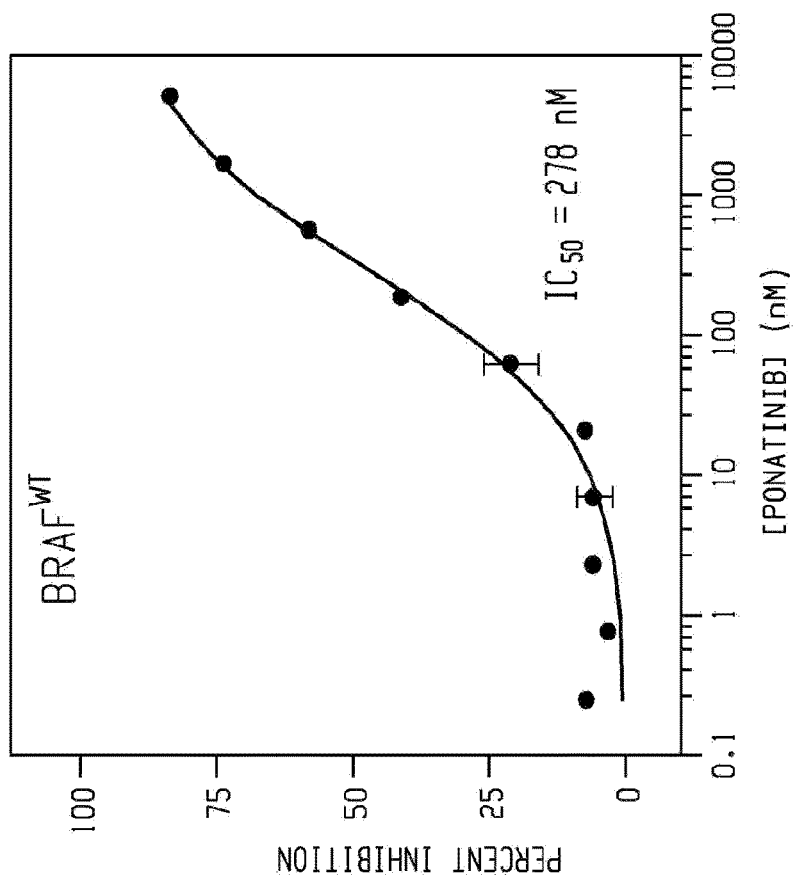
FIG. 11. Kinase activity inhibition profiles of BRAF$^{WT}$ and BRAF$^{V600E}$ upon ponatantib titration using SelectScreen assay. Data represent mean±SD, n=3 or are representative of three independent experiments.
Figure 11:
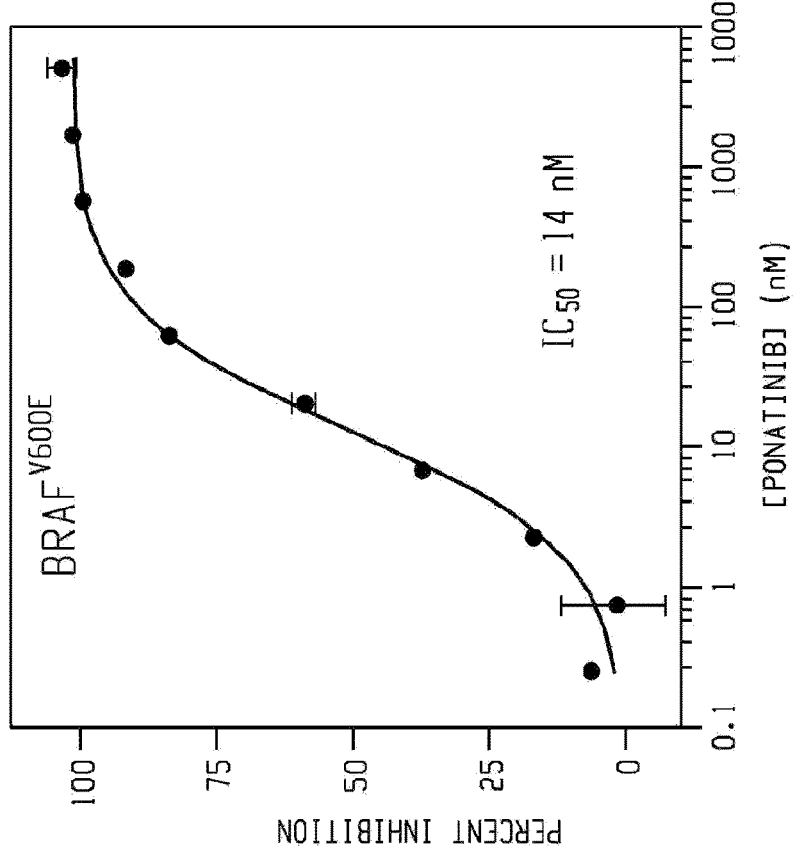
Figure 12A:
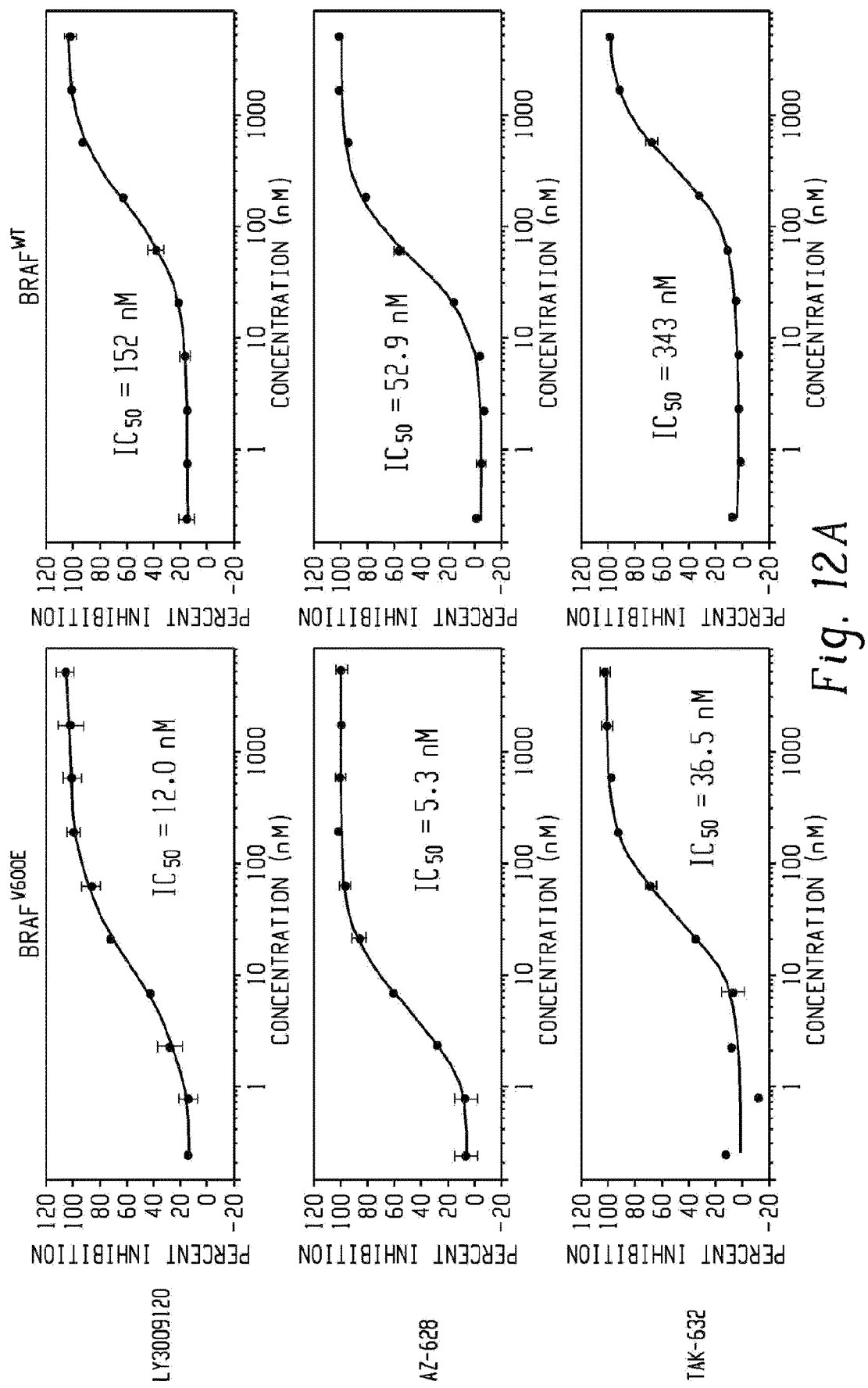
FIG. 12. In vitro BRAF kinase inhibition activity of RAF inhibitors. BRAF$^{WT}$ and BRAF$^{V600E}$ kinase inhibition by selected αC-IN inhibitors (LY3009120, AZ-628, TAK-632) and αC-OUT inhibitors (vemurafenib, dabrafenib, PL7904), in comparison to BRAF inhibition by ponatinib as reported in this disclosure. Kinase activity was measured using SelectScreen (Invitrogen) assay in the presence of 100 μM ATP. Half-maximal inhibition values (IC$_{50}$) in kinase activity are summarized in Table 1. Data represent mean±SD, n=3.
Figure 12B:
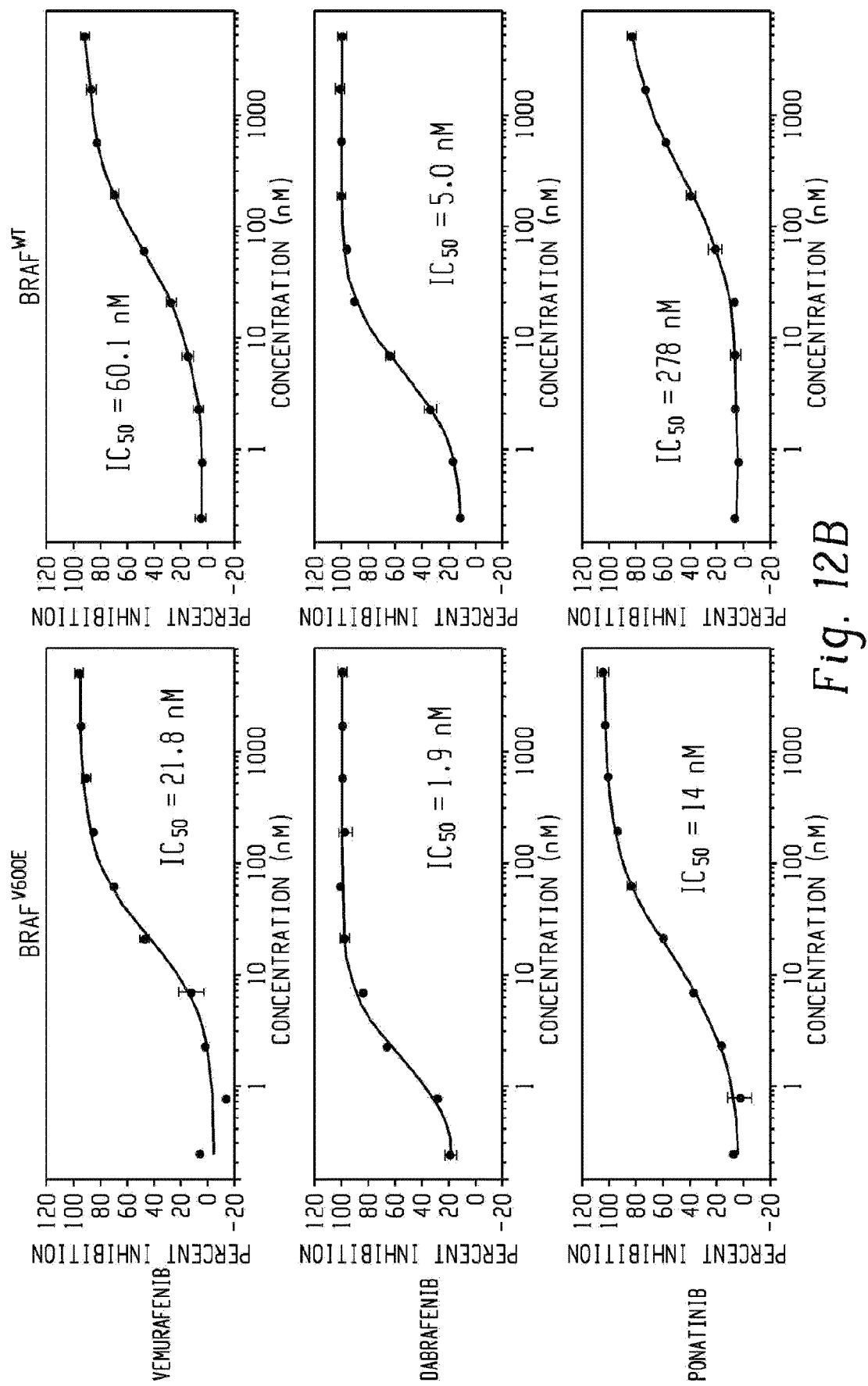

Surprisingly, ponatinib has not been previously identified to inhibit any of the RAF proteins. Besides ABL in CML it strongly inhibits other kinases such as FGFR, FLT3 and PDFGRα (FIG. 9). We performed in vitro kinase assays for BRAF$^{V600E}$ activity to phosphorylate recombinant MEK; and for MEK1 activity to phosphorylate recombinant ERK2, respectively. We found that ponatinib is a potent inhibitor of BRAF$^{V600E}$ but does not inhibit MEK (FIG. 10A, 10B) In addition, Ponatinib potently inhibited CRAF activity. To further validate these results, we compared biochemical BRAF inhibition by Ponatinib to other known RAF inhibitors. We found that ponatinib is a very potent inhibitor of BRAF$^{V600E}$ (IC$_{50}$=14 nM) and BRAF$^{WT}$ (IC$_{50}$=278 nM) comparable to vemurafenib, vabrafenib and PLX7904 inhibitors but also to TAK-632, LY3009120, and AZ-628, which were previously shown to inhibit RAF dimers (FIG. 11, FIG. 12). The potencies of ponatinib, known BRAF inhibitors, and compounds of Formula I are given in Table 1.

TABLE 1

BRAF$^{V600E}$ Inhibition

| Compound | IC$_{50}$ (nM) |
|---|---|
| Ponatinib | 14 |
| LY3009120 | 12 |
| AZ-628 | 5.3 |
| TAK-632 | 36.2 |
| Vemurafenib | 21.8 |
| Dabrafenib | 1.9 |
| PLX7904 | 6.7 |
| PH1 | 10.4 |
| 2 | 17.8 |
| 4 | 48 |
| 5 | 30.7 |
| 6 | 29.4 |
| 7 | 44.3 |
| 8 | 1790 |
| 9 | 10900 |
| 10 | 1360 |
| 11 | 8940 |
| 12 | 11900 |
| 13 | 5.5 |
| 14 | 1830 |

Remarkably, ponatinib similarly or even more potently inhibited BRAF than its other established targets. Thus, our data highlight that ponatinib is a previously unrecognized potent BRAF inhibitor.

Figure 13:
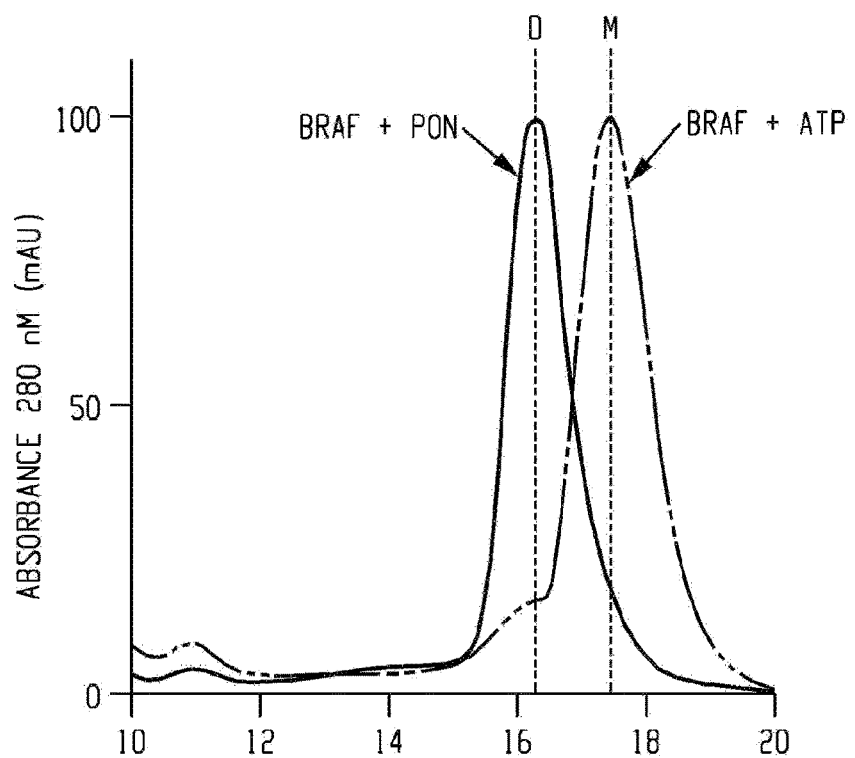
FIG. 13. Size exclusion chromatography profiles of recombinant purified apo-BRAF$^{V600E}$ kinase domain upon addition of ATP (BRAF+ATP) at 1:2 protein to compound molar ratio or ponatinib (BRAF+PON) at 1:1 molar ratio. Elution profile of monomeric and dimeric BRAF$^{V600E}$ protein is marked as M and D, respectively.

Example 2. Ponatinib Induces and Inhibits a Unique BRAF Symmetrical Dimer with Minimal Negative Allostery To determine whether Ponatinib induces BRAF dimers in solution, we performed size exclusion chromatography analysis of recombinant BRAF kinase in complex with Ponatinib and compared its migration to BRAF complexed to excess ATP. As shown in FIG. 13, stoichiometric amounts of Ponatinib promote formation of BRAF dimers, in contrast to ATP, which produces BRAF monomers. Notably, these Ponatinib-derived dimers are stable in the absence of inhibitor in the chromatographic buffer, supporting the high affinity of Ponatinib with BRAF kinase (FIG. 11). BRAF-Ponatinib structure, determined by inventors, data not shown, corroborates the dimeric arrangement of the kinase, composed of Ponatinib-bound protomers. Crystal structures of BRAF kinase with type-I and type-II inhibitors have demonstrated dimers with previous inhibitor-bound protomers, however, the dimers are asymmetrical.

Figures 14A, 14B:
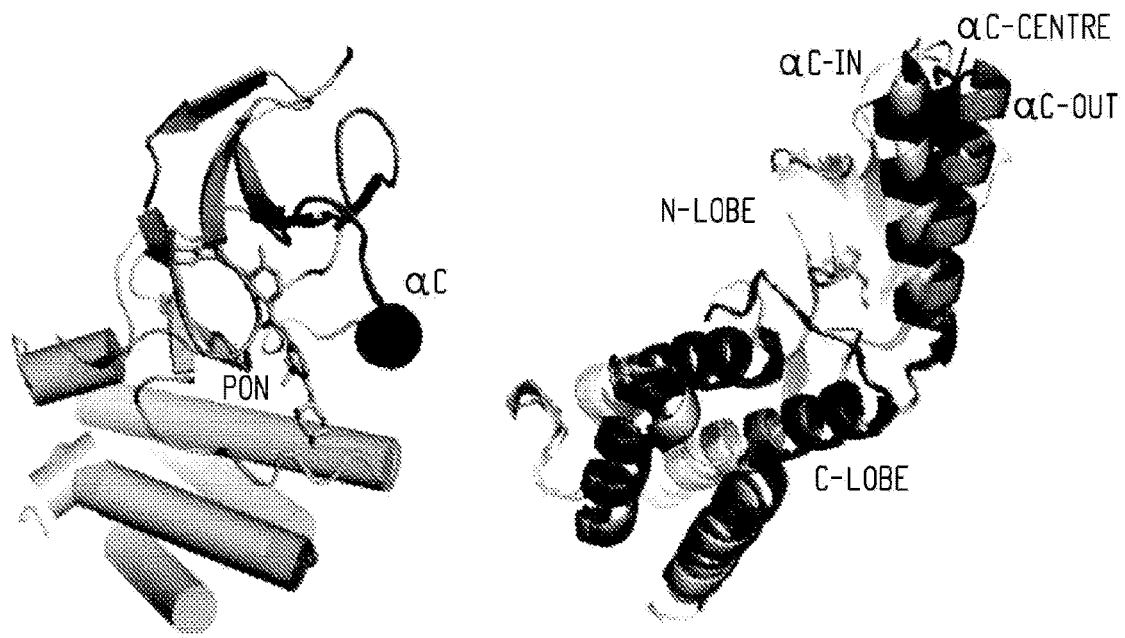
FIG. 14. (A) The BRAF$^{V600E}$/PON dimer is perfectly symmetric. 3D-superposition of each BRAF$^{V600E}$/PON protomer shows a perfect 2-fold symmetry. The perfectly overlapping αC-helices of protomers are shown in dark gray. (B) The αC helix of BRAF$^{V600E}$/PON complex adopts an unprecedented αC-CENTRE position. Structural superposition of BRAF structures in ribbon representation showing the position of αC-helix in BRAF structure bound to ponatinib (PON, dark gray) between αC-OUT and αC-IN positions observed in vemurafenib and MEK-bound BRAF structures respectively. Protein parts were omitted for clarity.

In contrast, the BRAF-Ponatinib dimer is perfectly symmetric as demonstrated by the 3D-superposition of protomers (FIG. 14A). Remarkably, Ponatinib is the first BRAF inhibitor inducing an intermediate αC-CENTRE position (FIG. 14B). This orientation solely permits the symmetrical BRAF dimerization observed in our structure. To further investigate whether BRAF-Ponatinib complex has a distinct conformation among other ponatinib-kinase complexes, we compared the orientation of αC-helix in this complex to crystal structures of ponatinib with ABL, ABL-T315I, FGFR1, FGFR4 and cKIT kinases. We found that only the αC-helix in BRAF-ponatinib adopts the unique αC-CENTER position, distinct from other complexes, despite highly similar inhibitor binding at the active sites.

Figures 15A, 15B:
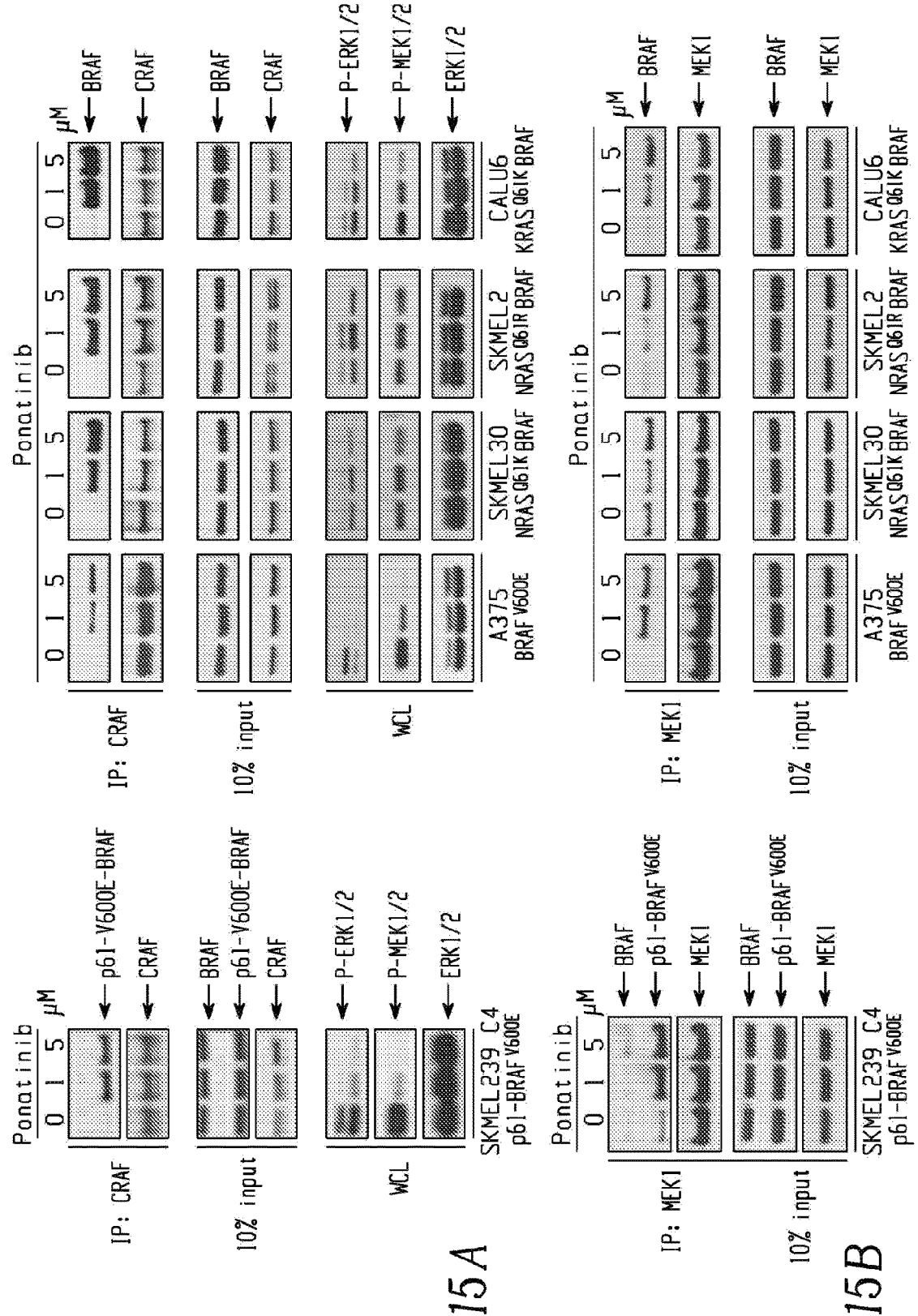
FIG. 15. (A) Various cell lines expressing BRAF$^{V600E}$ or RAS$^{MUT}$/BRAF$^{WT}$ were left untreated or treated with 1 μM or 5 μM ponatinib for 1 hr, then cells were collected, assayed for CRAF immunoprecipitation and immunoblot with the indicated antibodies for monitoring BRAF/CRAF heterodimerization and activation of ERK signaling. (B) Various cell lines expressing BRAF$^{V600E}$ or RAS$^{MUT}$/BRAF$^{WT}$ were left untreated or treated with 1 μM or 5 μM ponatinib for 1 hr, then cells were collected, assayed for MEK immunoprecipitation and immunoblot with the indicated antibodies for monitoring BRAF/MEK complex formation. Data are representative of three independent experiments.

To further assess these structural effects of Ponatinib on stabilization of RAF dimers, we evaluated heterodimerization of BRAF variants with CRAF and inhibition of ERK signaling in melanoma cell lines expressing BRAF$^{V600E}$, p61BRAF$^{V600E}$, NRAS mutant with BRAF$^{WT}$ and a lung cell line KRAS mutant with BRAF$^{WT}$. Consistent with our in vitro and structural data, ponatinib promoted formation of dimers of BRAF variants with CRAF in all cell lines in a dose-dependent manner and inhibited ERK signaling (FIG. 15A). Interestingly, inhibition of ERK signaling by Ponatinib is correlated with RAF dimerization and Ponatinib inhibited activity of even BRAF$^{V600E}$ monomers (A375 cells) by promoting formation of dimers (FIG. 15A). RAF inhibitors can promote the formation of and at the same time catalytically inhibit the RAF/MEK complex, an effect that depends on αC helix conformation of BRAF. We found that ponatinib enhances the formation of RAF/MEK complexes in all cell lines suggesting that its RAF dimer-induced conformation is complementary to the interaction with MEK (FIG. 15B).

Taken together, our data demonstrate that ponatinib binding to an allosteric pocket tailors a unique BRAF dimer conformation, characterized by an unprecedented αC-CENTER helix orientation, which enables inhibition of both RAF monomers and dimers in cells with minimal negative allostery for binding both protomers.

Example 3. A Ponatinib-Hybrid Inhibitor Increased Inhibition and BRAF Selectivity To further characterize the allosteric pocket of BRAF and investigate its role in regulating BRAF conformations and activity in ERK signaling, we aimed to identify compounds that would form additional contacts with the allosteric pocket. We thus carried out a modular structure-based design approach to keep the interactions of the trifluorophenyl and piperazine interactions of ponatinib while extending the compound deeper in the allosteric pocket, which yielded a number of candidate ponatinib-hybrid inhibitors. Candidate PHIs were evaluated in silico for the interactions with the new allosteric pocket and filtered for favorable properties compared to ponatinib. Using this approach, we synthesized PHI1 (see Example 5), which uses a morpholine-based head group predicted to interact with the new allosteric pocket.

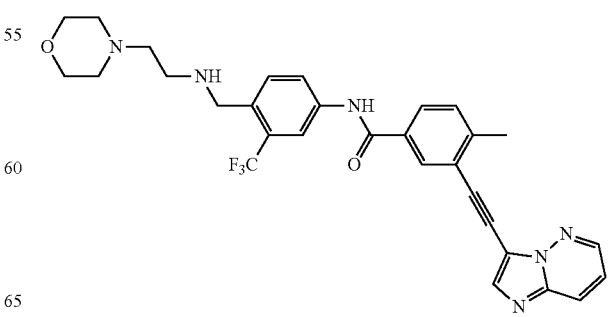

Indeed, PHI1 showed increased in vitro inhibitory potency ($IC_{50}$ value of 10.4 nM) compared to ponatinib against $BRAF^{V600E}$. Moreover, using Biolayer Interferometry (BLI), PHI1 consistently showed higher affinity for $BRAF^{V600E}$ than ponatinib. However, no significant difference in Koff values was detected, suggesting that PHI1 and ponatinib demonstrate similar pharmacological retention times. In addition, PHI1 demonstrated reduced inhibitory activity for several known Ponatinb kinase targets, with FGFR (43-fold reduction) and FLT3 (10-fold reduction) having the highest differences. Taken together, our results corroborate an increased BRAF binding affinity and selectivity for PHI1.

Figure 7A:
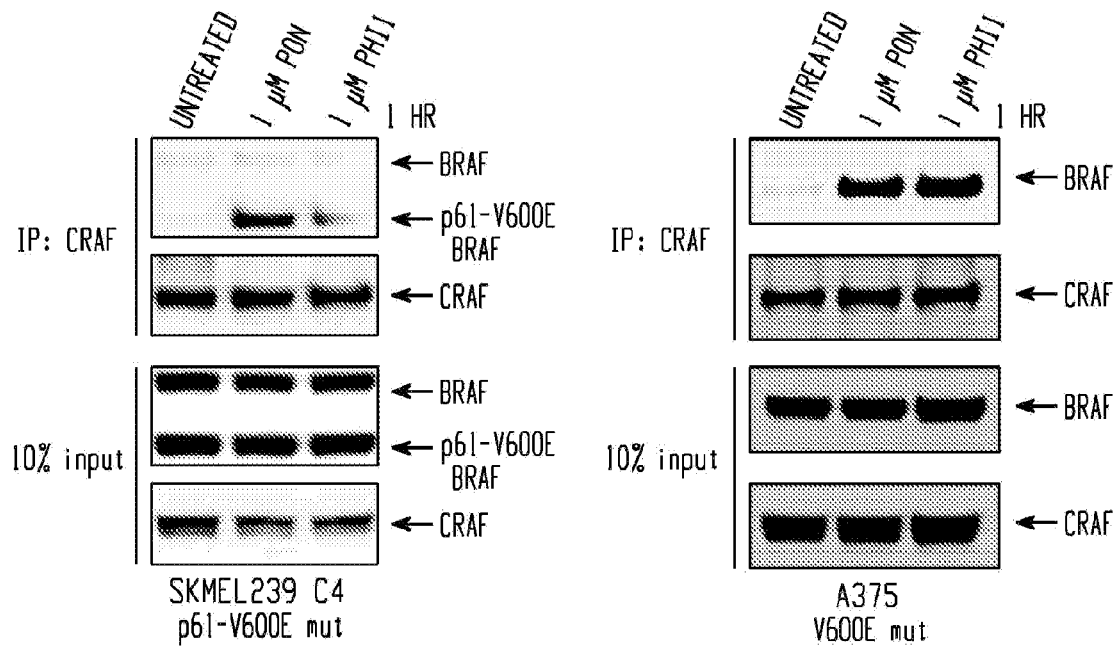
FIG. 7. PHI1 is mechanistically distinct from ponatinib, stimulating less formation of p61-BRAFV600E/CRAF dimers and BRAF/MEK complexes compared to PON in p61-BRAF$^{V600E}$ dimer expressing melanoma cells. (A) Melanoma A375 and SKMEL239 C4 cell lines, expressing BRAF$^{V600E}$ monomers or p61-BRAF$^{V600E}$ constitutive dimers respectively, left untreated or treated with 1 μM ponatinib or PHI1 for 1 hr, then cells were collected, assayed for CRAF immunoprecipitation and immunoblot with the indicated antibodies for monitoring BRAF/CRAF heterodimerization. (B) Cell lines as in (A) left untreated or treated with 1 μM ponatinib or PHI1 for 1 hr, then cells were collected, assayed for MEK immunoprecipitation and immunoblot with the indicated antibodies for monitoring BRAF/MEK complex formation. Data are representative of three independent experiments.
Figure 7B:
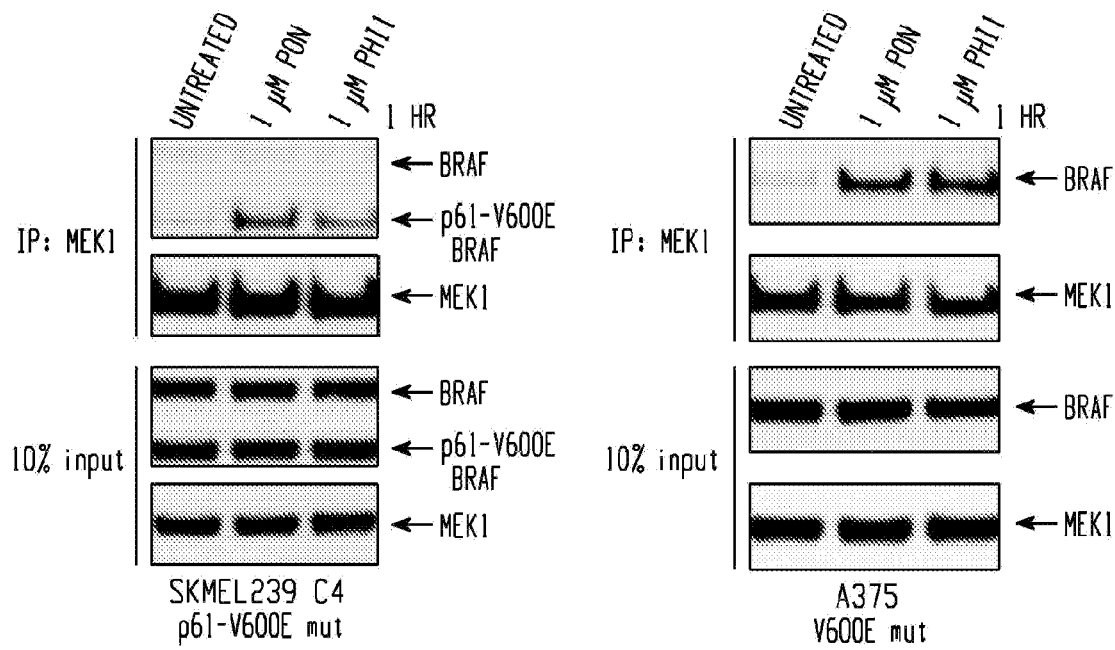
Figure 8:
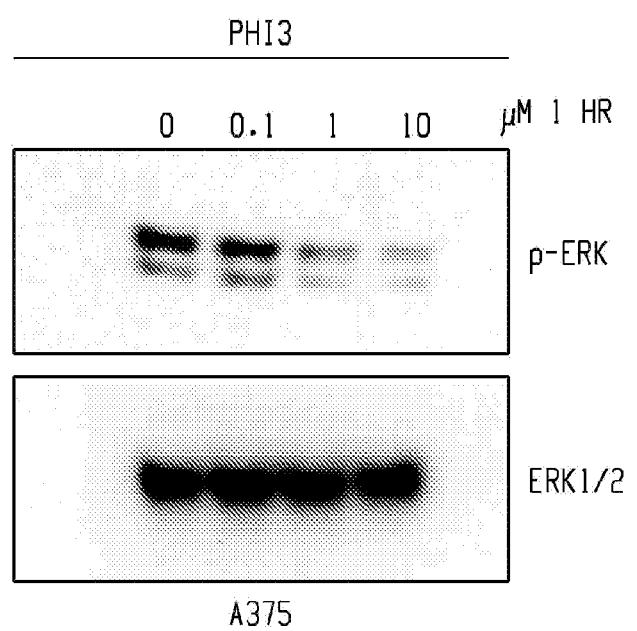
FIG. 8. Inhibition by PH13. A375 melanoma cells were left untreated (regular media plus 0.2% DMSO) or treated for 1 hr with increasing concentrations of PHI3. Activity was assayed with western blotting of pERK with ERK1/2 being the total ERK loading control.

Example 4. PHI1 is Mechanistically Distinct and has Improved Selectivity for BRAFV600E Dimers To investigate the cellular effects of PHI1 induced by its distinct allosteric binding mode in comparison to ponatinib, we assessed its activity (inhibition of pMEK and pERK) against oncogenic BRAF in melanoma cells expressing $BRAF^{V600E}$ monomers (A375 cells) and $p61BRAF^{V600E}$ dimers (SKMEL239-$C_4$ cells). The results demonstrate superior potency (IC50~0.3-0.5 µM) of PHI1 for $p61BRAF^{V600E}$ dimers compared to Ponatinib. Interestingly, the activity of PHI1 against $BRAF^{V600E}$ monomers in A375 cells is significantly reduced compared to ponatinib, showing specificity for $p61BRAF^{V600E}$ dimers. To further dissect these results, we compared the ability of PHI1 and ponatinib to induce BRAF/CRAF hetero-dimers and BRAF/MEK complexes (FIG. 7A, 7B). PHI1 is distinct from ponatinib as it induces less BRAF/CRAF and BRAF/MEK1 complexes in $p61BRAF^{V600E}$ cells, but not in A375 cells.

Taken together, our results demonstrate the role of the new allosteric pocket in regulating stabilization of a unique inactive BRAF dimer conformations with αC-CENTER position that results in specific inhibition of BRAF activity and downstream ERK signaling. Moreover, PHI1 is a lead of a new class of BRAF inhibitors that can be tailored for clinically relevant dimers such as $p61BRAF^{V600E}$ dimer splice variants in melanoma.

Example 5. Synthesis of PHI1-1 (N-[4-Formyl-3-(Trifluoromethyl)Phenyl]-3-(2-[Imidazo[1,2-B]Pyridazin-3-yl]Ethynyl)-4-Methylbenzamide)

Step 1. Synthesis of PHI1-1 (N-[4-cyano-3-(trifluoromethyl)phenyl]-3-iodo-4-methylbenzamide)

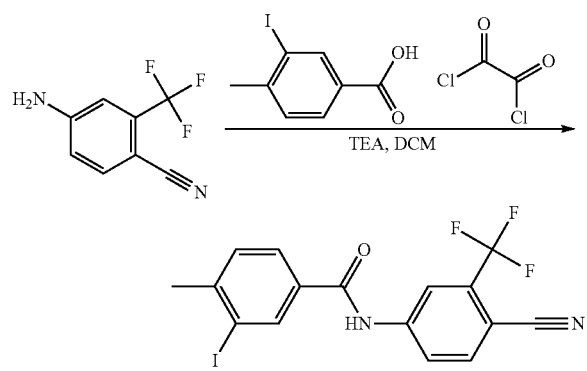

To a stirred solution of 3-iodo-4-methylbenzoic acid (28.156 g, 107.45 mmol, 1.000 equiv) and N,N-Dimethylformamide (1 drop) in dichloromethane (50 ml) was added oxalic dichloride (27.27 g, 214.85 mmol, 2.000 equiv) dropwise at 0° C. The resulting mixture was stirred at room temperature for 1 h. The resulting mixture was added to a solution of 4-amino-2-(trifluoromethyl)benzonitrile (20 g, 107.45 mmol, 1 equiv) in dichloromethane (150 ml) at 0-5° C. And the mixture stirred at room temperature for 1 h. The reaction mixture was partitioned between dichloromethane and saturated aqueous sodium bicarbonate solution. The aqueous phase was separated and extracted with dichloromethane. The combined organic phases were washed with water, brine, dried over anhydrous sodium sulfate and concentrated under vacuum. This resulted in N-[4-cyano-3-(trifluoromethyl)phenyl]-3-iodo-4-methylbenzamide (16.1 g, 34.83%) as a white solid. LC-MS, PHI1-2 (ES, m/z): $[M+1]^+=431$; RT=1.58 min

Step 2. Synthesis of PHI1-2 (N-[4-formyl-3-(trifluoromethyl)phenyl]-3-iodo-4-methylbenzamide)

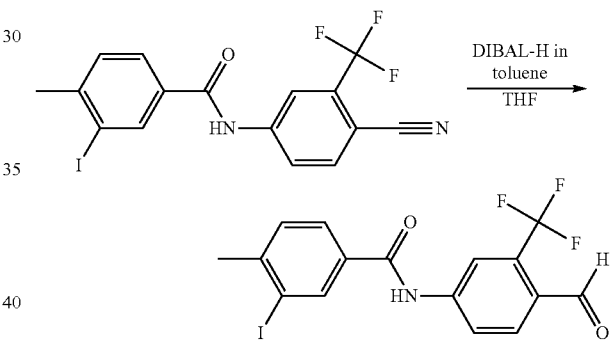

To a stirred solution of N-[4-cyano-3-(trifluoromethyl)phenyl]-3-iodo-4-methylbenzamide (8 g, 18.60 mmol, 1 equiv) in THF (240 mL, 2962.32 mmol, 159.285 equiv) was added DIBAl-H in toluene (93 mL, 93 mmol, 93 equiv) dropwise at 25-30° C. under $N_2$ atmosphere. The resulting mixture was stirred at 25-30° C. for 1.5 h. The reaction was quenched by the addition of 120 mL methanol and 120 mL of potassium sodium 2,3-dihydroxysuccinate solution at 25-30° C. The aqueous layer was extracted with tert-butyl methyl ether (3×250 mL). The resulting mixture was concentrated under vacuum. The crude product was purified by Prep-HPLC with the following conditions (Prep-HPLC-006): Column, XBridge Prep C18 OBD Column, 5 um, 19*150 mm; mobile phase, Water (10 mmol/L $NH_4HCO_3$+ 0.1% $NH_3 \cdot H_2O$) and ACN (67% Phase B up to 71% in 6 min, hold 95% in 1 min, hold 67% in 1 min); Detector, UV. This resulted in N-[4-formyl-3-(trifluoromethyl)phenyl]-3-iodo-4-methylbenzamide (1.3 g, 16.14%) as an off-white solid. LC-MS, PHI1-3 (ES, m/z): $[M+1]^+=434$; RT=1.70 min

Step 3. Synthesis of PHI1-3 (N-[4-formyl-3-(trifluoromethyl)phenyl]-3-(2-[imidazo[1,2-b]pyridazin-3-yl]ethynyl)-4-methylbenzamide)

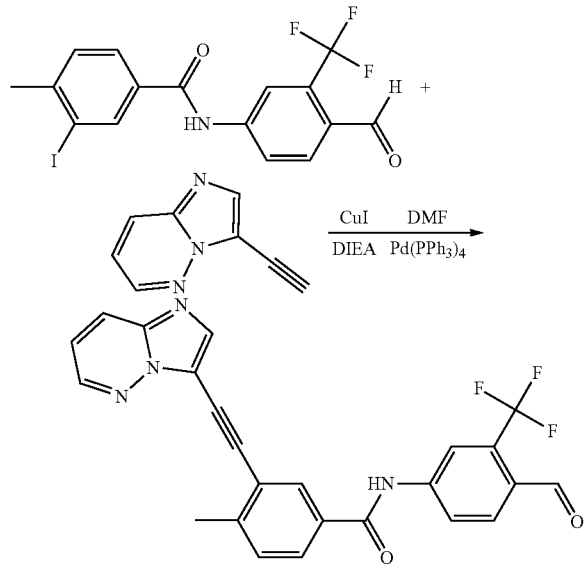

A mixture of N-[4-formyl-3-(trifluoromethyl)phenyl]-3-iodo-4-methylbenzamide (1.3 g, 3.00 mmol, 1 equiv), 3-ethynylimidazo[1,2-b]pyridazine(429 mg, 3.00 mmol, 0.999 equiv), CuI(42.2 mg, 0.22 mmol, 0.074 equiv), Pd(PPh$_3$)$_4$(173 mg, 0.15 mmol, 0.050 equiv) and DIEA(0.8 mL, 4.84 mmol, 1.613 equiv) in DMF(20 mL, 258.44 mmol, 86.111 equiv) was stirred under N$_2$ atmosphere at room temperature overnight. The resulting mixture was diluted with ethyl acetate (50 mL). The resulting mixture was washed with 3×20 mL of water and 20 mL of brine. The resulting ethyl acetate phase was dried over anhydrous sodium sulfate and concentrated under vacuum. The residue was purified by silica gel column chromatography, eluted with EA/PE (0-50%) to afford N-[4-formyl-3-(trifluoromethyl)phenyl]-3-(2-[imidazo[1,2-b]pyridazin-3-yl]ethynyl)-4-methylbenzamide (1.0 g, 74.31%) as a yellow solid. LC-MS, PHI1-3 (ES, m/z): [M+1]$^+$=449; RT=1.61 min

Step 4. Synthesis of (N-[4-formyl-3-(trifluoromethyl)phenyl]-3-(2-[imidazo[1,2-b]pyridazin-3-yl]ethynyl)-4-methylbenzamide) (PH1, Cmp. 1)

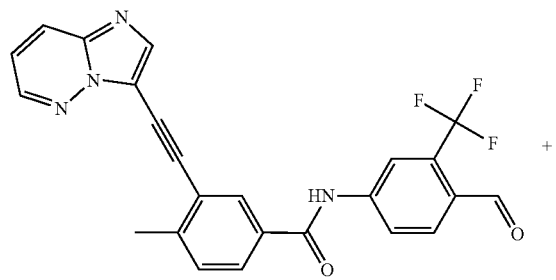

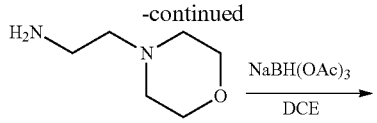

A mixture of N-[4-formyl-3-(trifluoromethyl)phenyl]-3-(2-[imidazo[1,2-b]pyridazin-3-yl]ethynyl)-4-methylbenzamide (50 mg, 0.11 mmol, 1 equiv) and 2-(morpholin-4-yl)ethan-1-amine (21.4 mg, 0.16 mmol, 1.474 equiv) in 1,2-dichloroethane (1 mL, 12.63 mmol, 113.278 equiv) was stirred at room temperature for 30 min. To a stirred mixture was added acetyl ethaneperoxoate sodioboranyl acetate (70 mg, 0.33 mmol, 2.962 equiv) in portions at room temperature. The resulting mixture was stirred under at room temperature overnight. The reaction was quenched with 0.2 mL water. The resulting mixture was concentrated under reduced pressure. The residue was purified by Prep-HPLC to afford 3-(2-[imidazo[1,2-b]pyridazin-3-yl]ethynyl)-4-methyl-N-[4-([[2-(morpholin-4-yl)ethyl]amino]methyl)-3 (trifluoromethyl)phenyl]benzamide (6.0 mg, 9.56%) as a white solid.

LC-MS: (ES, m/z): [M+1]$^+$=563.2; RT=1.83 min. 1H-NMR: (300 MHz, DMSO-d$_6$, ppm) δ 10.56 (s, 1H), 8.74 (d, J=4.4 Hz, 1H), 8.25 (td, J=10.5, 9.9, 3.1 Hz, 4H), 8.07 (d, J=8.6 Hz, 1H), 8.01-7.91 (m, 1H), 7.73 (d, J=8.6 Hz, 1H), 7.56 (d, J=8.2 Hz, 1H), 7.40 (dd, J=9.2, 4.5 Hz, 1H), 3.85 (s, 2H), 3.55 (t, J=4.7 Hz, 4H), 2.62 (s, 5H), 2.41 (t, J=6.2 Hz, 2H), 2.33 (s, 4H).

Example 6. Synthesis of Methyl 4-(2-((4-(3-(Imidazo[1,2-B]Pyridazin-3-Ylethynyl)-4-Methylbenzamido)-2-(Trifluoromethyl)Benzyl)Amino)Ethyl) Piperazine-1-Carboxylate (Cmp. 2)

Cmp. 2 is synthesized according to the following reaction scheme.

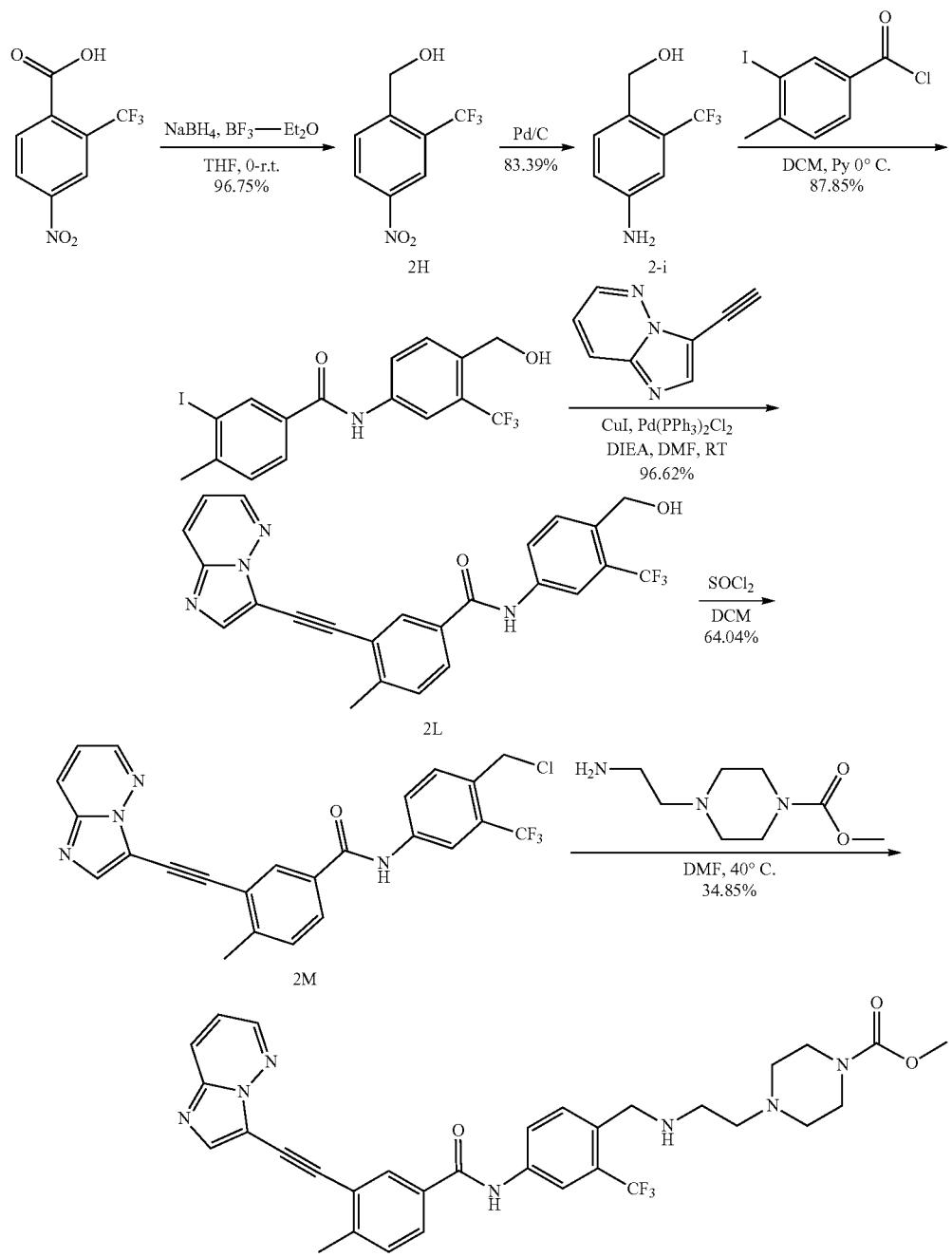
Step 1. Synthesis of Starting Material. 3-Iodo-4-Methyl-benzoyl Chloride (Cmp. 2A)
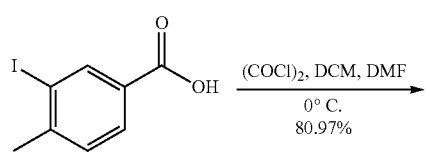
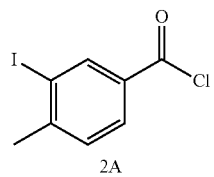
To a stirred solution of 3-iodo-4-methylbenzoic acid(1.50 g, 5.724 mmol, 1.00 equiv) and DMF(0.02 mL, 0.303 mmol, 0.05 equiv) in DCM(20.00 mL, 235.480 mmol) were added (COCl)$_2$(1.22 mL, 9.604 mmol, 2.5 equiv) dropwise at 0° C. under nitrogen atmosphere. The resulting mixture was concentrated under reduced pressure. This resulted in 3-iodo-4-methylbenzoyl chloride (Cmp. 2A) (1.3 g, 80.97%) as a yellow solid.

Step 2. Synthesis of Starting Material. 3-[2-(trimethylsilyl)ethynyl]imidazo[1,2-b]pyridazine (Cmp. 2B)

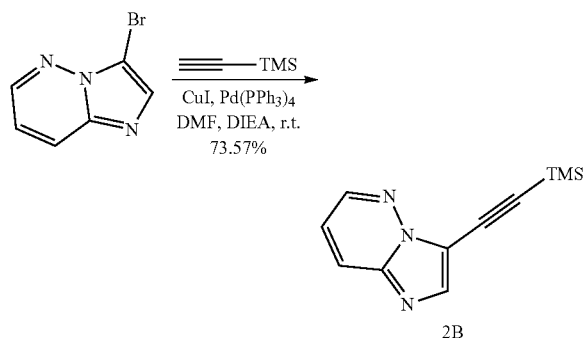

To a stirred solution of 3-bromoimidazo[1,2-b]pyridazine (2.50 g, 12.625 mmol, 1.00 equiv) and trimethylsilylacetylene (2.48 g, 25.250 mmol, 2.00 equiv), DIEA (6.53 g, 50.525 mmol, 4.00 equiv) in DMF was added CuI (0.36 g, 1.894 mmol, 0.15 equiv), Pd(PPh₃)₄(0.73 g, 0.631 mmol, 0.05 equiv). The resulting mixture was stirred for 2.0 h at room temperature under nitrogen atmosphere. The resulting mixture was diluted with water. The resulting mixture was extracted with EtOAc. The combined organic layers were washed with water, dried over anhydrous Na₂SO₄. After filtration, the filtrate was concentrated under reduced pressure. The residue was purified by silica gel column chromatography, eluted with hexane/EtOAc (0-30%) to afford 3-[2-(trimethylsilyl)ethynyl]imidazo[1,2-b]pyridazine (2.0 g, 73.57%) as a yellow solid.

Step 3. Synthesis of Starting Material, tert-Butyl 4-(2-[[(benzyloxy)carbonyl]amino]ethyl)piperazine-1-carboxylate (Cmp. 2C)

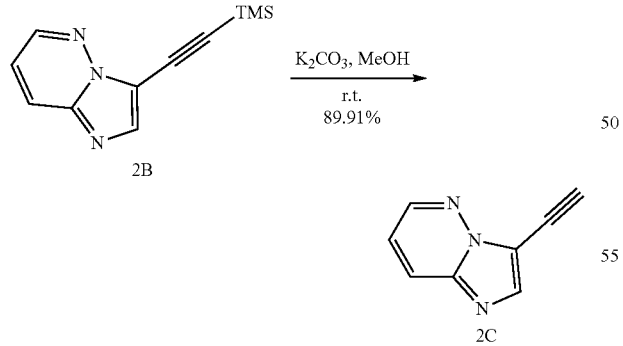

The solution of 3-[2-(triethylsilyl)ethynyl]imidazo[1,2-b]pyridazine(2.00 g, 7.770 mmol, 1.00 equiv) and K₂CO₃ (3.22 g, 23.309 mmol, 3.00 equiv) in MeOH(40 mL) was stirred for 2 h at room temperature. The resulting mixture was filtered; the filter cake was washed with MeOH (3×10 mL). The filtrate was concentrated under reduced pressure. The residue was purified by silica gel column chromatography, eluted with CH₂Cl₂/MeOH (20:1) to afford 3-ethynylimidazo[1,2-b]pyridazine(1 g, 89.91%) as a Brown yellow solid.

Step 4. Synthesis of tert-Butyl 4-(2-[[(benzyloxy)carbonyl]amino]ethyl)piperazine-1-carboxylate (Cmp. 2D)

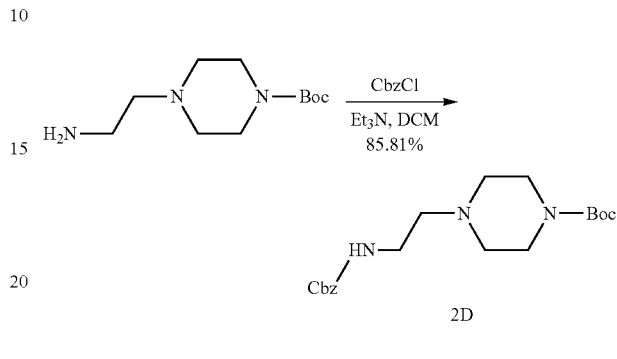

To a stirred solution of tert-butyl 4-(2-aminoethyl)piperazine-1-carboxylate(5.00 g, 21.803 mmol, 1.00 equiv) and TEA(6.62 g, 65.410 mmol, 3.00 equiv) in DCM(27.72 mL, 326.395 mmol, 20.00 equiv) was added CbzCl(4.09 g, 23.984 mmol, 1.10 equiv) dropwise at 0° C. under nitrogen atmosphere. The resulting mixture was concentrated under reduced pressure. The crude product was purified by reverse phase flash with the following conditions (MeCN:water=20:80) to afford tert-butyl 4-(2-[[(benzyloxy)carbonyl]amino]ethyl)piperazine-1-carboxylate(6.8 g, 85.81%) as a white solid.

Step 5. Synthesis of benzyl N-[2-(piperazin-1-yl)ethyl]carbamate (Cmp. 2E)

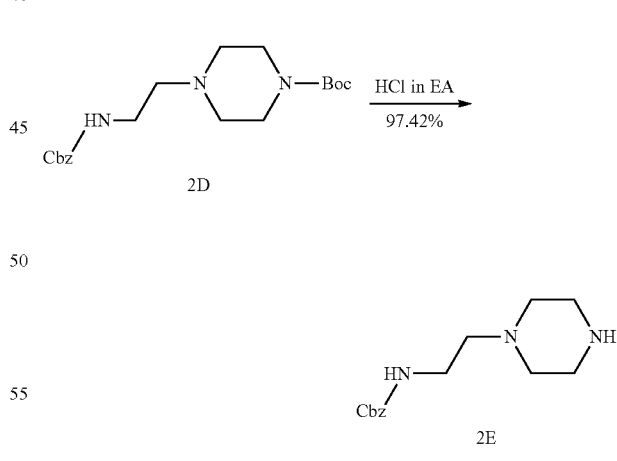

A solution of tert-butyl 4-(2-[[(benzyloxy)carbonyl]amino]ethyl)piperazine-1-carboxylate(6.80 g, 18.709 mmol, 1.00 equiv) in Hydrogen chloride solution 2 μM in diethyl ether (120.00 mL) was stirred for 2 h at room temperature under air atmosphere. The resulting mixture was concentrated under vacuum. This resulted in benzyl N-[2-(piperazin-1-yl)ethyl]carbamate(4.8 g, 97.42%) as a light yellow solid.

Step 6. Synthesis of 4-(2-[[(benzyloxy)carbonyl]amino]ethyl)piprazine-1-carboxylate, (Cmp. 2 F)

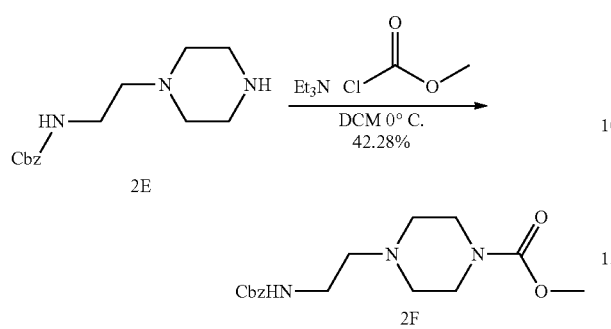

To a stirred solution of benzyl N-[2-(piperazin-1-yl)ethyl] carbamate (500.00 mg, 1.899 mmol, 1.00 equiv) and DIEA (981.57 mg, 7.595 mmol, 4.00 equiv) in DCM (10.00 mL, 117.744 mmol, 82.85 equiv) was added methyl chloroformate (215.29 mg, 2.278 mmol, 1.20 equiv) in portions at 0° C. The resulting mixture was stirred for 2 h at 0° C. The reaction was quenched by the addition of Water (2 mL) at 0° C. The resulting mixture was concentrated under vacuum. The residue was purified by reverse flash chromatography with the following conditions: column, C18 silica gel; mobile phase, ACN in water, 5% to 50% gradient in 20 min; detector, UV 254 nm. This resulted in methyl 4-(2-[[(benzyloxy)carbonyl]amino]ethyl)piperazine-1-carboxylate (258 mg, 42.28%) as a white oil.

Step 7. Synthesis of 4-(2-aminoethyl)piperazine-1-carboxylate (Cmp. 2G)

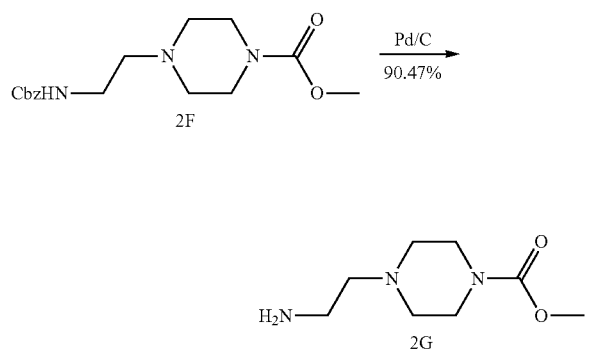

To a stirred mixture of methyl 4-(2-[[(benzyloxy)carbonyl]amino]ethyl)piperazine-1-carboxylate(258.00 mg, 0.803 mmol, 1.00 equiv) in MeOH(6.00 mL) was added Pd/C(100.00 mg, 0.940 mmol, 1.17 equiv). The resulting mixture was stirred for 2 h at room temperature under hydrogen atmosphere. The resulting mixture was filtered, the filter cake was washed with MeOH (3×5 mL). The resulting mixture was concentrated under vacuum. This resulted in methyl 4-(2-aminoethyl)piperazine-1-carboxylate(136 mg, 90.47%) as a white oil.

Step 8. Synthesis of 4-nitro-2-(trifluoromethyl)phenyl]methanol (Cmp. 2H)

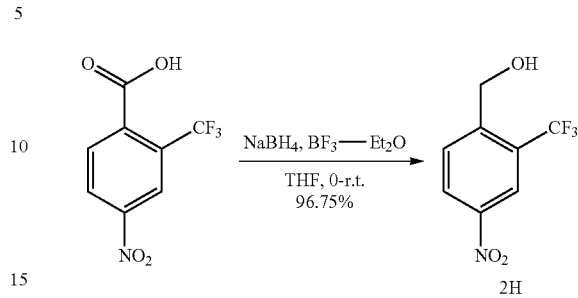

To a stirred mixture of 4-nitro-2-(trifluoromethyl)benzoic acid(10.00 g, 42.532 mmol, 1.00 equiv) inTHF(68.92 mL, 955.772 mmol, 20.00 equiv) were added NaBH4(6.44 g, 170.127 mmol, 4.00 equiv) in portions at 0° C. under nitrogen atmosphere. After 30 min the mixture was added $BF_3 \cdot Et_2O$ (16.17 mL, 113.925 mmol, 3.00 equiv) dropwise at 0° C. under nitrogen atmosphere. The resulting mixture was stirred for 4 h at room temperature under nitrogen atmosphere. The mixture was allowed to cool down to 0° C. The reaction was quenched by the addition of Water/Ice (200 mL) at 0° C. The aqueous layer was extracted with EtOAc (3×50 mL). The resulting mixture was concentrated under reduced pressure. This resulted in crude product 4-nitro-2-(trifluoromethyl)phenyl]methanol (9.1 g, 96.75%) as a yellow solid.

Step 9. Synthesis of 4-amino-2-(trifluoromethyl)phenyl]methanol, (Cmp. 2-i)

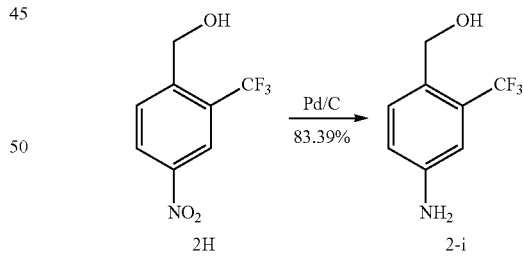

To a stirred solution of 4-(hydroxymethyl)-3-(trifluoromethyl)phenylazinic acid (9.10 g, 40.780 mmol, 1.00 equiv) and Pd/C (0.43 g, 4.078 mmol, 0.10 equiv) in MeOH (49.53 mL, 1545.851 mmol, 30.00 equiv) at room temperature under hydrogen atmosphere. The precipitated solids were collected by filtration and washed with MeOH (3×40 mL). The resulting mixture was concentrated under vacuum. This resulted in 4-amino-2-(trifluoromethyl)phenyl]methanol (6.5 g, 83.39%) as a yellow solid.

Step 10. Synthesis of N-[4-(hydroxymethyl)-3-(trifluoromethyl)phenyl]-3-iodo-4-methylbenzamide, (Cmp. 2K)

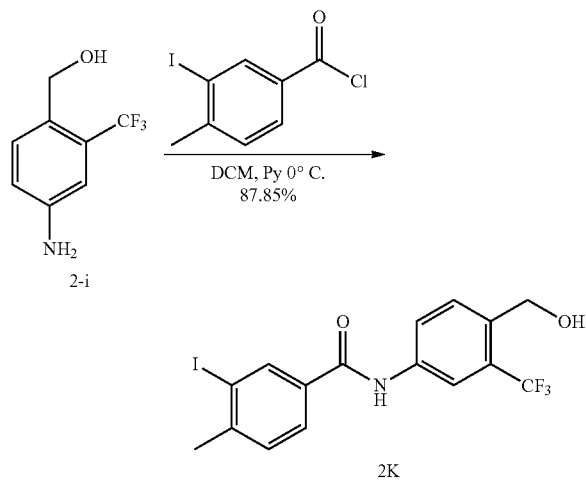

To a stirred mixture of [4-amino-2-(trifluoromethyl)phenyl]methanol(1.00 g, 5.231 mmol, 1.00 equiv) and pyridine (2.11 mL, 26.618 mmol, 5.00 equiv) in DCM(9.98 mL, 117.472 mmol, 30.00 equiv) were added 3-iodo-4-methylbenzoyl chloride(1.32 g, 4.708 mmol, 0.90 equiv) dropwise at 0° C. under nitrogen atmosphere. The resulting mixture was concentrated under reduced pressure. The residue was purified by silica gel column chromatography, eluted with hexane/EtOAc (5:1) to afford N-[4-(hydroxymethyl)-3-(trifluoromethyl)phenyl]-3-iodo-4-methylbenzamide (2 g, 87.85%) as a yellow solid.

Step 11. Synthesis of N-[4(hydroxymethyl)-3-(trifluoromethyl)phenyl]-3-(2-[imidazo[1,2-b]pyridazin-3-yl]ethynyl)-4-methylbenzamide (Cmp. 2L)

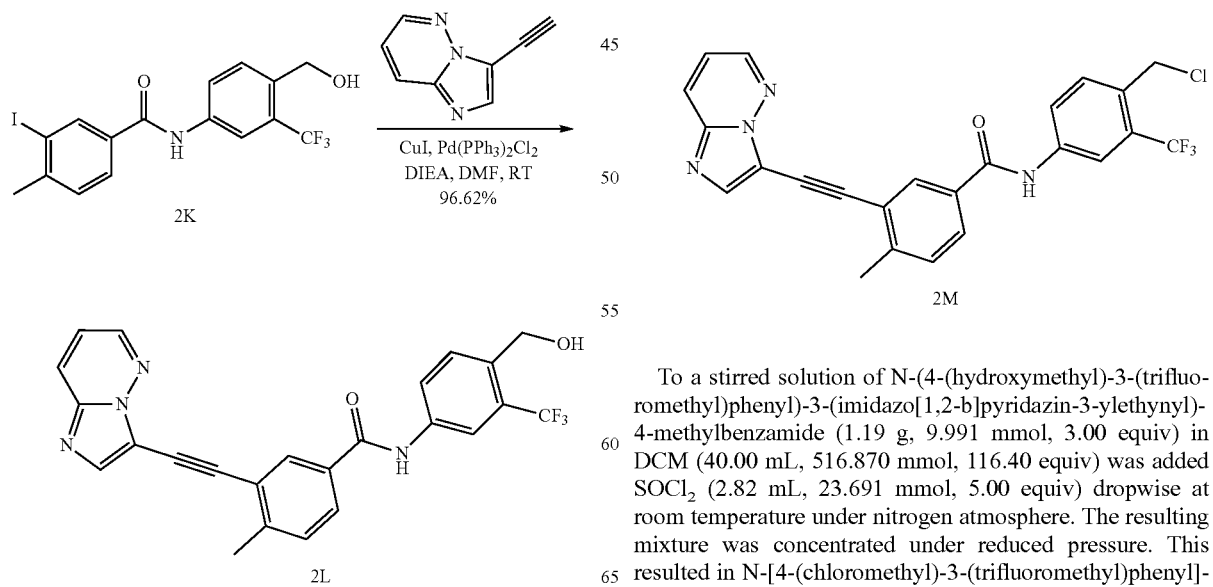

A solution of N-[4-(hydroxymethyl)-3-(trifluoromethyl)phenyl]-3-iodo-4-methylbenzamide(2.00 g, 4.596 mmol, 1.00 equiv), CuI(0.18 g, 0.919 mmol, 0.20 equiv), Pd(PPh$_3$)$_2$Cl$_2$(0.32 g, 0.460 mmol, 0.10 equiv)in DMF(14.23 mL, 194.632 mmol, 40.00 equiv) was treated with DIPEA(3.20 mL, 24.775 mmol, 4.00 equiv) for 30 min at room temperature under nitrogen atmosphere followed by the addition of 3-ethynylimidazo[1,2-b]pyridazine(0.99 g, 6.894 mmol, 1.50 equiv) in portions at room temperature overnight. The resulting mixture was filtered; the filter cake was washed with EtOAc (3×50 mL). The resulting mixture was diluted with water (150 mL). The aqueous layer was extracted with EtOAc (3×50 mL). The resulting mixture was concentrated under vacuum. The residue was purified by silica gel column chromatography, eluted with hexane/EtOAc (1:1) to afford N-[4-(hydroxymethyl)-3-(trifluoromethyl)phenyl]-3-(2-[imidazo[1,2-b]pyridazin-3-yl]ethynyl)-4-methylbenzamide (2 g, 96.62%) as a yellow solid.

Step 12. Synthesis of N-[4-chloromethyl)-3-(trifluoromethyl)phenyl]-3-(2-[imidazo[1,2-b]pyridazin-3-yl]ethynyl)-4-methylbenzamide, (Cmp. 2M)

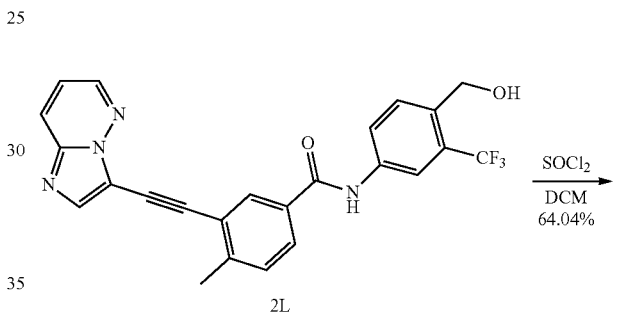

To a stirred solution of N-(4-(hydroxymethyl)-3-(trifluoromethyl)phenyl)-3-(imidazo[1,2-b]pyridazin-3-ylethynyl)-4-methylbenzamide (1.19 g, 9.991 mmol, 3.00 equiv) in DCM (40.00 mL, 516.870 mmol, 116.40 equiv) was added SOCl$_2$ (2.82 mL, 23.691 mmol, 5.00 equiv) dropwise at room temperature under nitrogen atmosphere. The resulting mixture was concentrated under reduced pressure. This resulted in N-[4-(chloromethyl)-3-(trifluoromethyl)phenyl]-3-(2-[imidazo[1,2-b]pyridazin-3-yl]ethynyl)-4-methylbenzamide (1 g, 64.04%) as a yellow solid.

Step 13. Synthesis of 4-[2-[([4-[3-(2-[imidazo[1,2-b]pyridazin-3-yl]ethynyl)-4-methylbenzamido]-2-(trifluoromethyl)phenyl]methyl)amino]ethyl]piperazine-1-carboxylate (Cmp. 2)

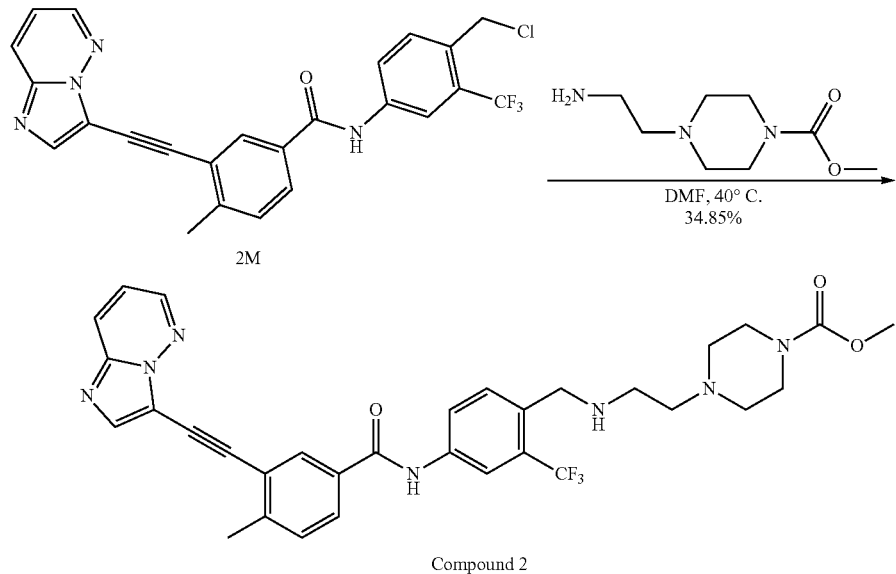

Compound 2

To a stirred solution of methyl 4-(2-aminoethyl)piperazine-1-carboxylate(119.81 mg, 0.640 mmol, 3.00 equiv) in DMF (3.00 mL) were added N-[4-(chloromethyl)-3-(trifluoromethyl)phenyl]-3-(2-[imidazo[1,2-b]pyridazin-3-yl]ethynyl)-4-methylbenzamide(100.00 mg, 0.213 mmol, 1.00 equiv) in DMF (2.00 mL) dropwise at 40° C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford methyl 4-[2-[([4-[3-(2-[imidazo[1,2-b]pyridazin-3-yl]ethynyl)-4-methylbenzamido]-2-(trifluoromethyl)phenyl]methyl)amino]ethyl]piperazine-1-carboxylate (Cmp. 2)(47.5 mg, 34.85%) as an off-white solid.

LC-MS-PH-AEI-001-0: (ES, m/z): [M+1]=620.3

$^1$H NMR (300 MHz, Methanol-$d_4$) δ 8.62 (d, J=4.2 Hz, 1H), 8.26-7.94 (m, 5H), 7.88 (dd, J=8.0, 2.0 Hz, 1H), 7.65 (d, J=8.4 Hz, 1H), 7.46 (d, J=8.1 Hz, 1H), 7.36 (dd, J=9.2, 4.4 Hz, 1H), 3.96 (s, 2H), 3.69 (s, 3H), 3.47 (t, J=5.0 Hz, 4H), 2.79 (t, J=6.2 Hz, 2H), 2.64 (s, 3H), 2.56 (t, J=6.2 Hz, 2H), 2.41 (t, J=5.1 Hz, 4H).

Example 7. Synthesis of 4-Chloro-N-(4-(3-((2-Morpholinoethyl)Amino)Prop-1-yn-1-yl)-3-(TRIFLUOROMETHYL)PHENYL)BENZAMIDE (Cmp. 3)

Step. 1. Synthesis of 4-Chloro-N-(4-iodo-3-(trifluoromethyl)phenyl)benzamide (Cmp. 3A)

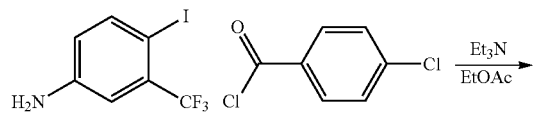

-continued

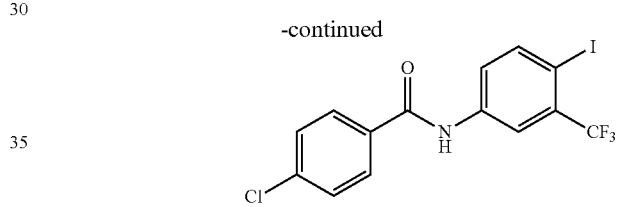

4-Chlorobenzoyl chloride (0.49 mL; 3.8 mmol; 1.1 equiv.) was added drop-wise to a solution of 4-iodo-3-(trifluoromethyl)aniline (1.00 g; 3.48 mmol; 1 equiv.) and triethylamine (0.58 mL; 4.2 mmol; 1.2 equiv.) in ethyl acetate (10 mL) at 0° C. A precipitate formed within few minutes and after 5 minutes, the mixture has turned into a thick gel. After an additional 20 minutes, water (10 mL) was added followed by FastWoRX (10 g). Ethyl acetate was removed (rotavap; 100 mbar; 40° C.; 20 min.) and the polymer was transferred to an ISCO loading cartridge, filtered, washed water (20 mL), and dried under a flow of air (house vacuum). Column chromatography (12 g silica; 0-100% EtOAc in hexanes) provided the pure product.

TLC: Rr 0.59 (Hexanes/EtOAc 2:1; UV). $^1$H NMR (600 MHz, DMSO-$d_6$) δ 10.64 (s, 1H), 8.28 (d, J 2.5 Hz, 1H), 8.10 (d, J 8.6 Hz, 1H), 8.00 (d, J 8.6 Hz, 2H), 7.83 (dd, J 8.6, 2.5 Hz, 1H), 7.64 (d, J 8.5 Hz, 1H). $^{13}$C NMR (151 MHz, DMSO-$d_6$) δ 165.28, 142.72, 139.85, 137.36, 133.38, 132.45 (q, J 29.9 Hz), 130.17, 129.07, 125.26, 123.32 (q, J 273.6 Hz), 119.59 (q, J 6.0 Hz), 84.81. $^{19}$F NMR (282 MHz, DMSO-$d_6$) δ-61.53. HRMS (ESI) calc'd for $C_{14}H_9ClF_3INO$ (M+H)$^+$425.9364 found 425.9369.

Step 2. Synthesis of 4-chloro-N-(4-(3-((2-morpholinoethyl)amino)prop-1-yn-1-yl)-3-(trifluoromethyl)phenylbenzamide (Compound 3)

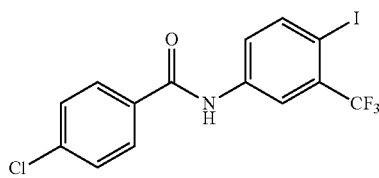

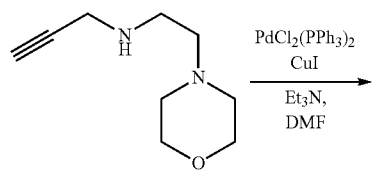

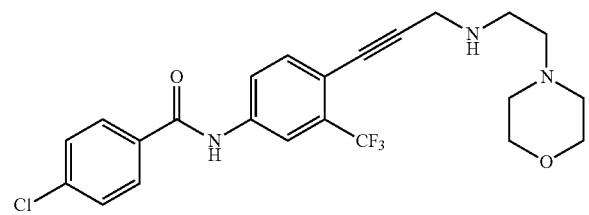

To a microwave vial under Ar was added N-(2-morpholinoethyl)prop-2-yn-1-amine (37 mg, 0.22 mmol; 1 equiv.), 3A (130 mg, 0.31 mmol; 1.41 equiv.), DMF (2 mL), triethylamine (0.61 mL, 4.4 mmol; 20 equiv.), bis(triphenylphosphine)palladium(II) chloride (15. mg, 0.022 mmol; 0.1 equiv.), copper(I) iodide (2.1 mg, 0.011 mmol; 0.05 equiv.). The vial was capped and heated to 80° C. for 30 min. under microwave irradiation. After cooling to r.t. EDTA (tetra-Na; 100 mg) was added and and the mixture was transferred to a round bottom flask using little MeOH for rinsing. The volatiles were removed under high vacuum and the residue was purified by chromatography on basic alumina (8 g; 0-5% MeOH in $CH_2Cl_2$) to give the product was a colorless film (20 mg; 0.043 mmol; 20%).

$^1$H NMR (600 MHz, $CD_3OD$) δ 8.20 (d, J 2.1 Hz, 1H), 7.99-7.94 (m, 3H), 7.63 (d, J 8.5 Hz, 1H), 7.58-7.54 (m, 2H), 3.73 (s, 2H), 3.71 (t, J 4.7 Hz, 4H), 2.92 (t, J 6.5 Hz, 2H), 2.57 (t, J 6.4 Hz, 2H), 2.52 (m, 5H). $^{13}$C NMR (151 MHz, $CD_3OD$) δ 166.21, 138.87, 137.95, 134.67, 132.99, 131.77-131.05 (m), 129.05, 128.47, 126.25-120.70 (m), 122.88, 117.42 (q, J 5.5 Hz), 116.16, 91.79, 79.30, 66.41, 57.27, 53.37, 43.87, 37.80. $^{19}$F NMR (282 MHz, $CD_3OD$) δ-63.69. HRMS (ESI) calc'd for $C_{23}H_{23}C_1F_3N_3O_2$ (M+H)$^+$466.1504 found 466.1497.

Example 8. Synthesis of 3-(2-[Imidazo[1,2-B]Pyridazin-3-Yl]Ethynyl)-N-[4-[([2-[4-(6-Methoxypyrimidin-4-Yl)Piperazin-1-Yl]Ethyl]Amino)Methyl]-3-(Trifluoromethyl)Phenyl]-4-Methylbenzamide (Cmp. 4)

Step. 1. Synthesis of N-[2-[4-(6-methoxypyrimidin-4-yl)piperazin-1-yl]ethyl]carbamate (Cmp. 4A)

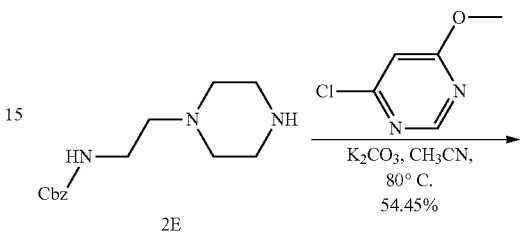

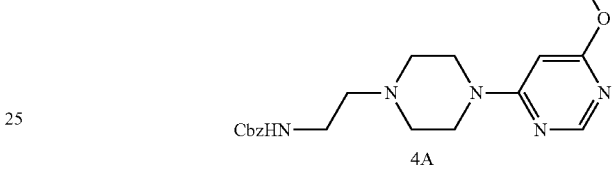

A solution of benzyl N-[2-(piperazin-1-yl)ethyl]carbamate (2E) (500.00 mg, 1.899 mmol, 1.00 equiv) in MeCN (0.52 mL, 12.642 mmol, 20.00 equiv) was treated with $K_2CO_3$ (1049.63 mg, 7.595 mmol, 4.00 equiv) for 30 min at room temperature under nitrogen atmosphere followed by the addition of 4-chloro-6-methoxypyrimidine (411.71 mg, 2.848 mmol, 1.50 equiv) in portions at 80° C. The residue product was purified by reverse phase flash with the following conditions (MeCN:water=20:80) to afford benzyl N-[2-[4-(6-methoxypyrimidin-4-yl)piperazin-1-yl]ethyl]carbamate (4A) (384 mg, 54.45%) as a yellow solid.

Step. 2. Synthesis of 2-[4-(6-methoxypyrimidin-4-yl)piperazin-1-yl]ethanamine (Cmp. 4B)

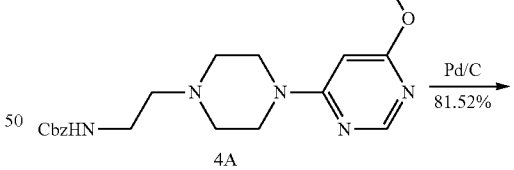

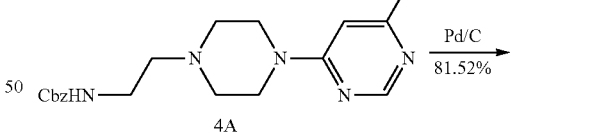

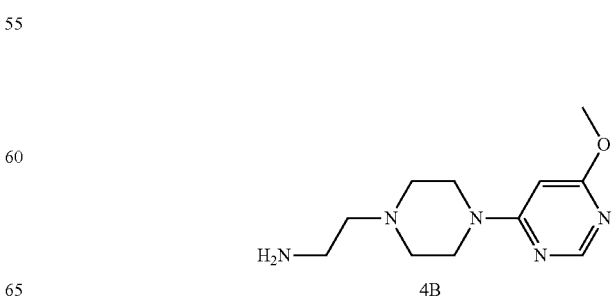

To a stirred mixture of benzyl N-[2-[4-(6-methoxypyrimidin-4-yl)piperazin-1-yl]ethyl]carbamate(4A) (384.00 mg, 1.034 mmol, 1.00 equiv) in MeOH (10.00 mL) was added Pd/C (100.00 mg, 0.940 mmol, 0.91 equiv). The reaction mixture was stirred for 2 h at room temperature under hydrogen atmosphere. The resulting mixture was filtered, the filter cake was washed with MeOH (3×5 mL). Then the MeOH was evaporated to obtain 2-[4-(6-methoxypyrimidin-4-yl)piperazin-1-yl]ethanamine (4B) (200 mg, 81.52%) as a light yellow oil.

Step 3. Synthesis of 3-(2-[imidazo[1,2-b]pyridazin-3-yl]ethynyl)-N-[4-[([2-[4-(6-methoxypyrimidin-4-yl)piperazin-1-yl]ethyl]amino)methyl]-3-(trifluoromethyl)phenyl]-4-methylbenzamide (Compound 4)

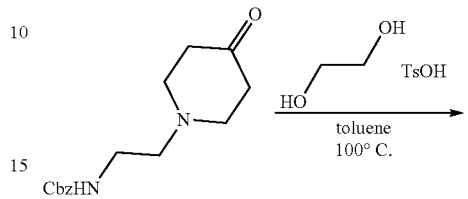

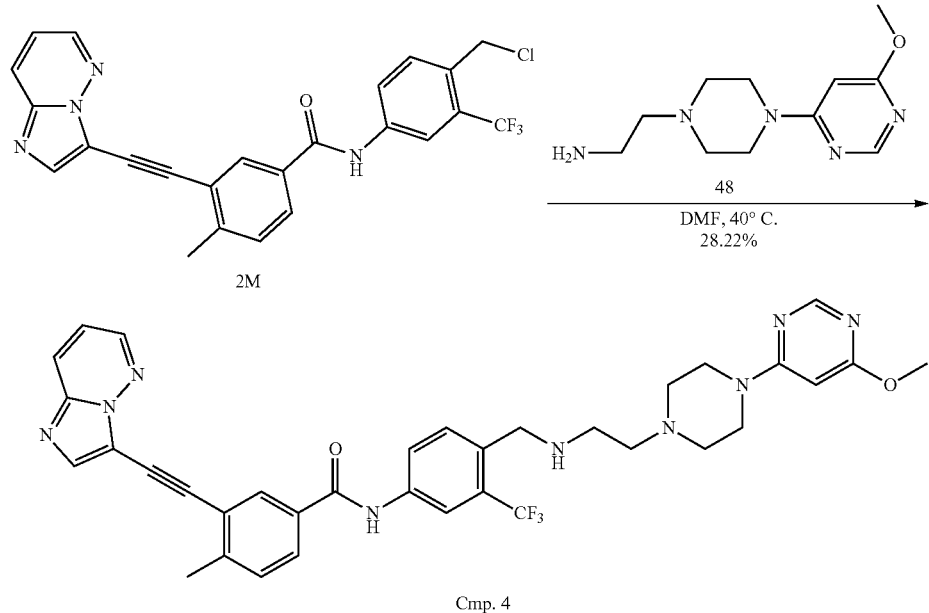

To a stirred solution of 2-[4-(6-methoxypyrimidin-4-yl)piperazin-1-yl]ethanamine (4B) (151.84 mg, 0.640 mmol, 3.00 equiv) in DMF (3.00 mL) was added N-[4-(chloromethyl)-3-(trifluoromethyl)phenyl]-3-(2-[imidazo[1,2-b]pyridazin-3-yl]ethynyl)-4-methylbenzamide (2M) (100.00 mg, 0.213 mmol, 1.00 equiv) in DMF (2.00 mL) dropwise at 40° C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford 3-(2-[imidazo[1,2-b]pyridazin-3-yl]ethynyl)-N-[4-[([2-[4-(6-methoxypyrimidin-4-yl)piperazin-1-yl]ethyl]amino)methyl]-3-(trifluoromethyl)phenyl]-4-methylbenzamide (Cmp. 4) (41.4 mg, 28.22%) as an off-white solid.

$^1$H NMR (400 MHz, Methanol-$d_4$) δ 8.62 (dd, J=4.5, 1.6 Hz, 1H), 8.22-8.15 (m, 3H), 8.13-8.04 (m, 2H), 8.00 (dd, J=8.3, 2.2 Hz, 1H), 7.90 (dd, J=8.0, 2.0 Hz, 1H), 7.66 (d, J=8.5 Hz, 1H), 7.48 (d, J=8.1 Hz, 1H), 7.35 (dd, J=9.2, 4.4 Hz, 1H), 6.00 (d, J=0.9 Hz, 1H), 3.96 (s, 2H), 3.87 (s, 3H), 3.61 (t, J=5.1 Hz, 4H), 2.79 (t, J=6.2 Hz, 2H), 2.65 (s, 3H), 2.57 (t, J=6.1 Hz, 2H), 2.48 (t, J=5.1 Hz, 4H). LC-MS-PH-AEI-002-0: (ES, m/z): [M+1]=670.3.

Example 9. Synthesis of 3-Ethynyl-4-Methyl-N-(4-(((2-(4-(Pyridin-2-Yl)Piperazin-1-Yl)Ethyl)Amino) Methyl)-3-(Trifluoromethyl)Phenyl)Benzamide (Cmp. 5)

Step. 1. Synthesis of benzyl (2-(1,4-dioxa-8-azaspiro[4.5]decan-8-yl)ethyl)carbamate (Cmp. 5A)

-continued

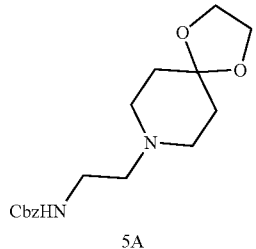

To a stirred solution of benzyl (2-(4-oxopiperidin-1-yl)ethyl)carbamate (2.50 g, 20.989 mmol, 1.00 equiv) and ethane-1,2-diol(2.8 mL, 68.4 mmol, 3.00 equiv) in toluene (100 mL) was added 4-methylbenzenesulfonic acid (2.42 g, 31.2 mmol, 1.50 equiv) in portions at room temperature. The resulting mixture was stirred for overnight at 100° C. under N$_2$ atmosphere. The resulting mixture was concentrated under vacuum. The resulting mixture was washed with 3×100 mL of Sodium carbonate aqueous solution. The resulting solid was dried under vacuum. This resulted in benzyl (2-(1,4-dioxa-8-azaspiro[4.5]decan-8-yl)ethyl)carbamate (5A) (1.28 g, 14.25 mmol, 44.92%) as a yellow oil.

Step. 2. Synthesis of 2-(1,4-Dioxa-8-Azaspiro[4.5]decan-8-Yl)Ethan-1-Amine (Cmp. 5B)

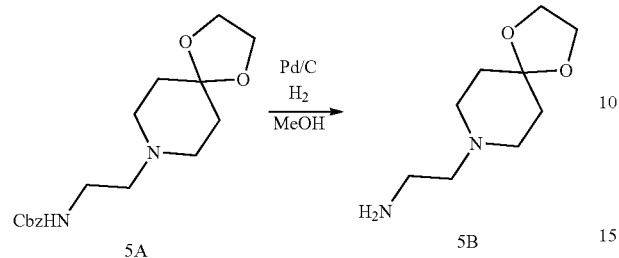

To a stirred mixture of benzyl (2-(1,4-dioxa-8-azaspiro[4.5]decan-8-yl)ethyl)carbamate (5A) (1.28 g, 14.25 mmol, 1.00 equiv) in MeOH (7.00 mL) was added Pd/C (128.00 mg, 0.940 mmol, 0.1 equiv). The reaction mixture was stirred for 2 h at room temperature under hydrogen atmosphere. The resulting mixture was filtered, the filter cake was washed with MeOH (3×5 mL). Then the MeOH was evaporated to obtain 2-(1,4-dioxa-8-azaspiro[4.5]decan-8-yl)ethan-1-amine (5B) (560 mg, 67.90%) as a light yellow oil.

Step. 3. Synthesis of N-(4-(((2-(1,4-dioxa-8-azaspiro[4.5]decan-8-yl)ethyl]amino)methyl)-3-(trifluoromethyl)phenyl)-3-(imidazo[1,2-b]pyridazin-3-ylethynyl-4-methylbenzamide (Cmp. 5C)

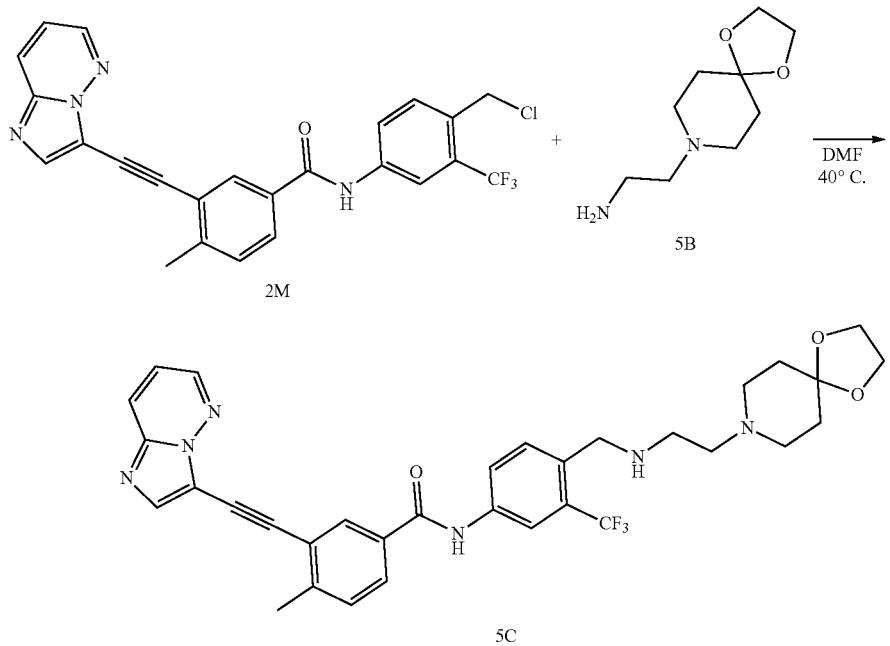

To a stirred solution of N-[4-(chloromethyl)-3-(trifluoromethyl)phenyl]-3-(2-[imidazo[1,2-b]pyridazin-3-yl]ethynyl)-4-methylbenzamide (2M) (145.92 mg, 0.711 mmol, 1.00 equiv) in DMF (2.00 mL) were added 2-(1,4-dioxa-8-azaspiro[4.5]decan-8-yl)ethan-1-amine (5B) (560 mg, 2.2 mmol, 2.50 equiv) in DMF (2.00 mL) dropwise at 40° C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford N-(4-(((2-(1,4-dioxa-8-azaspiro[4.5]decan-8-yl)ethyl)amino)methyl)-3-(trifluoromethyl)phenyl)-3-(imidazo[1,2-b]pyridazin-3-yl-ethynyl)-4-methylbenzamide (5C) (184 mg, 0.042 mmol, 48%).

Step 4. Synthesis of 3-ethynyl-4-methyl-N-(4-(((2-(4-(pyridin-2-yl)piperazin-1-yl)ethyl)amino)methyl)-3-(trifluoromethyl)phenyl)benzamide (Compound 5)

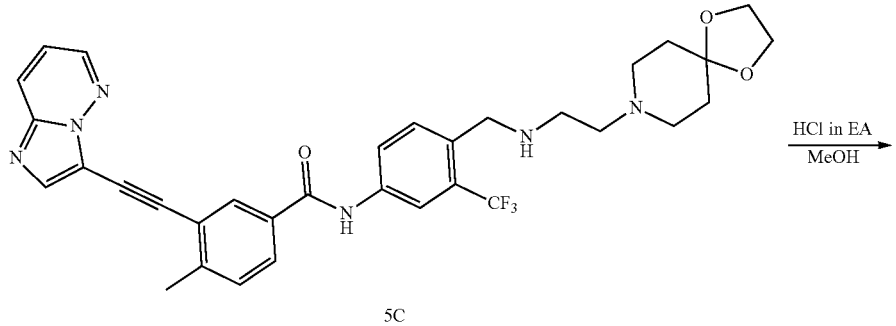

5C

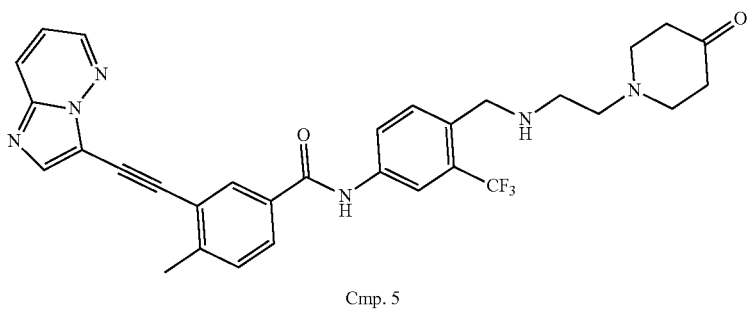

Cmp. 5

To a stirred solution of N-(4-(((2-(1,4-dioxa-8-azaspiro[4.5]decan-8-yl)ethyl)amino)methyl)-3-(trifluoromethyl)phenyl)-3-(imidazo[1,2-b]pyridazin-3-ylethynyl)-4-methyl-benzamide (5C) (184 mg, 0.42 mmol, 1.00 equiv), MeOH (3.00 mL, 45.989 mmol, 13.04 equiv) was added HCl in EA(4M, 4.00 mL, 16 mmol, 38.8 equiv) at room temperature. The resulting mixture was stirred overnight at room temperature. The mixture was concentrated under reduced pressure. The mixture was purified by reverse flash chromatography with the following conditions: column, C18 silica gel; mobile phase, ACN in water, 5% to 100% gradient in 30 min; detector, UV 254 nm to afford 76 mg crude product. The crude product was purified by Prep-HPLC with the following conditions (Column: XBridge Shield RP18 OBD Column, 5 um, 19*150 mm; Mobile Phase A:Water (0.1% FA), Mobile Phase B:ACN; Flow rate:25 mL/min; Gradient:55 B to 75 B in 8 min; 254/220 nm; RT1:6.99; RT2:; Injection Volume: ml; Number Of Runs:;) to afford 3-ethynyl-4-methyl-N-(4-(((2-(4-(pyridin-2-yl)piperazin-1-yl)ethyl)amino)methyl)-3-(trifluoromethyl)phenyl)benzamide (Cmp. 5) (15.9 mg, 11.82%) as an off-white solid.

$^1$H NMR (300 MHz, Methanol-$d_4$) δ 9.03 (d, J=2.2 Hz, 1H), 8.54 (d, J=2.0 Hz, 1H), 8.28 (dd, J=8.5, 2.3 Hz, 1H), 8.13 (dd, J=8.0, 2.0 Hz, 1H), 8.05 (d, J=8.1 Hz, 1H), 7.89-7.91 (m, 2H), 7.41-7.48 (m, 2H), 4.41 (s, 2H), 3.96 (s, 2H), 3.86 (s, 1H), 3.22-3.13 (m, 4H), 2.80 (t, J=6.3 Hz, 2H), 2.66-2.61 (m, 3H), 2.61-2.50 (m, 4H). LC-MS-PH-AEI-017-0: (ES, m/z): [M+1]=575.20.

example 10. Synthesis of 3-(imidazo[1,2-b]pyridazin-3-ylethynyl)-4-methyl-n-(4-(((2-(4-(methylsulfonyl)piperazin-1-yl)ethyl)amino)methyl)-3-(trifluoromethyl)phenyl)benzamide (Cmp. 6)

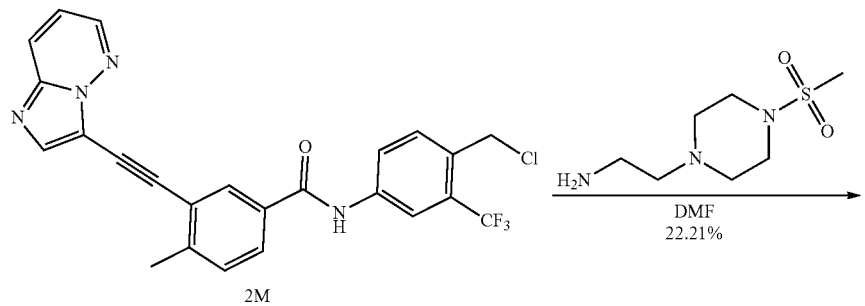

2M

-continued

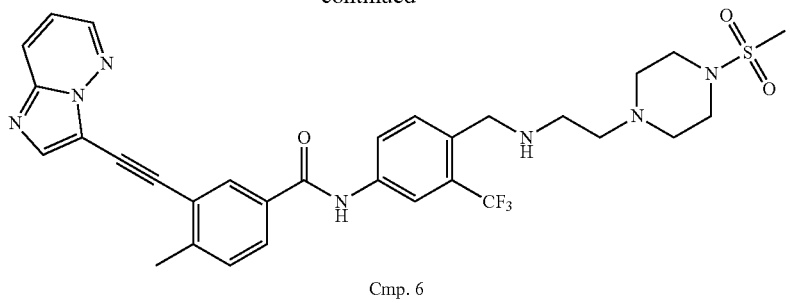

Cmp. 6

To a stirred solution of 2-(4-(methylsulfonyl)piperazin-1-yl)ethan-1-amine (25.05 mg, 0.134 mmol, 3 equiv) in DMF (0.10 mL, 1.417 mmol, 30 equiv) were added N-[4-ethyl-3-(trifluoromethyl)phenyl]-3-(2-[imidazo[1,2-b]pyridazin-3-yl]ethynyl)-4-methylbenzamide (2M) (20.00 mg, 0.045 mmol, 1.00 equiv) dropwise at 40° C. under nitrogen atmosphere. The residue product was purified by reverse phase flash with the following conditions (MeCN:water=35:65) to afford 3-(imidazo[1,2-b]pyridazin-3-ylethynyl)-4-methyl-N-(4-(((2-(4-(methylsulfonyl)piperazin-1-yl)ethyl)amino)methyl)-3-(trifluoromethyl)phenyl)benzamide (6 mg, 22.21%) as a white solid.

$^1$H NMR (400 MHz, Methanol-d$_4$) δ 8.69 (dd, J=4.2, 2.3 Hz, 1H), 8.34 (d, J=2.2 Hz, 1H), 8.22-8.11 (m, 4H), 7.92 (dd, J=8.0, 2.0 Hz, 1H), 7.76 (d, J=8.5 Hz, 1H), 7.50 (dd, J=8.3, 2.2 Hz, 1H), 7.47-7.40 (m, 1H), 4.47 (s, 2H), 3.43-3.31 (m, 11H), 2.94 (dd, J=18.1, 8.0 Hz, 1H), 2.88 (d, J=1.8 Hz, 3H), 2.86-2.76 (m, 3H), 2.66 (s, 3H). LC-MS: (ES, m/z): [M+1]=640.20.

Example 11. Synthesis of 3-(2-[Imidazo[1,2-B]Pyridazin-3-Yl]Ethynyl)-4-Methyl-N-(4-[2-[(Pyrimidin-4-Ylmethyl)Amino]Ethyl]-3-(Trifluoromethyl)Phenyl)Benzamide (Cmp. 7)

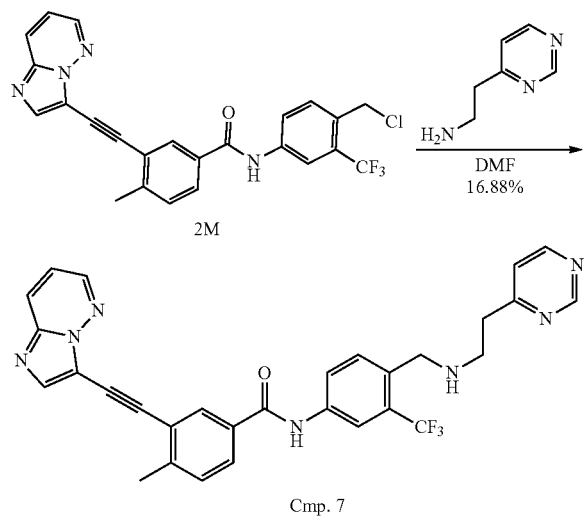

To a stirred solution of 2-(pyrimidin-4-yl)ethanamine (10.51 mg, 0.085 mmol, 4.00 equiv) in DMF(0.33 mL, 4.516 mmol, 200.00 equiv) were added N-[4-(chloromethyl)-3-(trifluoromethyl)phenyl]-3-(2-[imidazo[1,2-b]pyridazin-3-yl]ethynyl)-4-methylbenzamide (2M) (10.00 mg, 0.021 mmol, 1.00 equiv) dropwise at 40° C. under nitrogen atmosphere. The crude product was purified by reverse phase flash with the following conditions (MeCN:water=65:35) to afford 3-(2-[imidazo[1,2-b]pyridazin-3-yl]ethynyl)-4-methyl-N-(4-[2-[(pyrimidin-4-ylmethyl)amino]ethyl]-3-(trifluoromethyl)phenyl)benzamide (Cmp. 7) (0.8 mg, 16.88%) as a yellow solid.

LC-MS: (ES, m/z): [M+1]=556.15.

Example 12. Synthesis of Methyl 4-[2-([[4-(3-Ethynyl-4-Methylbenzamido)-2-(Trifluoromethyl)Phenyl]Methyl]Amino)Ethyl]Piperazine-1-Carboxylate (Cmp. 8)

Step 1. Synthesis of Methyl 3-iodo-4-methylbenzoate (8A)

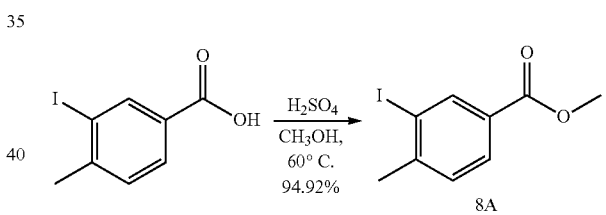

To a stirred solution of 3-iodo-4-methylbenzoic acid (5.50 g, 20.989 mmol, 1.00 equiv) and in methanol(100 mL) was added sulfuric acid(2 mL) in portions at room temperature. The resulting mixture was stirred for overnight at 60° C. under air atmosphere. The resulting mixture was concentrated under vacuum. The resulting mixture was washed with 3×100 mL of Sodium carbonate aqueous solution. The resulting solid was dried under vacuum. This resulted in methyl 3-iodo-4-methylbenzoate (8A) (5.5 g, 94.92%) as a yellow solid.

Step 2. Synthesis of Methyl 4-methyl-3-[2-(trimethylsilyl)ethynyl]benzoate (8B)

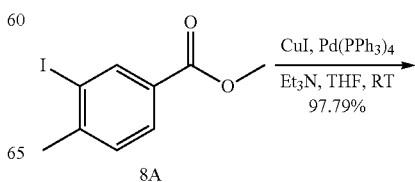

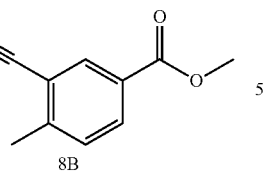

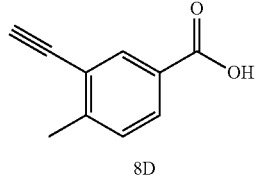

To a stirred solution/mixture of methyl 3-iodo-4-methylbenzoate(5.50 g, 19.922 mmol, 1.00 equiv), trimethylsilylacetylene (8A) (2.77 g, 28.202 mmol, 1.50 equiv) and Et3N(5.71 g, 56.429 mmol, 3.00 equiv) in THF (20.00 mL) were added CuI (0.72 g, 3.781 mmol, 0.20 equiv) and Pd(PPh3)4(1.08 g, 0.935 mmol, 0.05 equiv). The resulting mixture was stirred for 4 h at room temperature under nitrogen atmosphere. The residue was purified by silica gel column chromatography, eluted with PE/EtOAc (10:1) to afford methyl 4-methyl-3-[2-(trimethylsilyl)ethynyl]benzoate (8B) (4.8 g, 97.79%) as a brown yellow solid.

To a stirred solution of methyl 3-ethynyl-4-methylbenzoate(3.30 g, 18.944 mmol, 1.00 equiv), CH₃OH(10.00 mL, 246.989 mmol, 13.04 equiv), H₂O(30.00 mL, 1665.251 mmol, 87.90 equiv) in THF(40.00 mL, 493.720 mmol, 26.06 equiv) was added LiOH(2.27 g, 94.719 mmol, 5.00 equiv) at room temperature. The resulting mixture was stirred for 2 h at 60° C. The resulting mixture was extracted with EtOAc (3×100 mL). The combined organic layers were washed with brine (3×100 mL), dried over anhydrous Na₂SO₄. After filtration, the filtrate was concentrated under reduced pressure. This resulted in 3-ethynyl-4-methylbenzoic acid (8D) (3 g, 98.87%) as a Brown yellow solid.

Step 3. Synthesis of Methyl 3-ethynyl-4-methylbenzoate (8C)

Step 5. Synthesis of 3-ethynyl-N-[4-hydroxymethyl)-3-trifluoromethyl)phenyl]-4-methylbenzamide (8E)

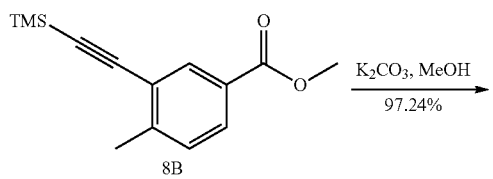

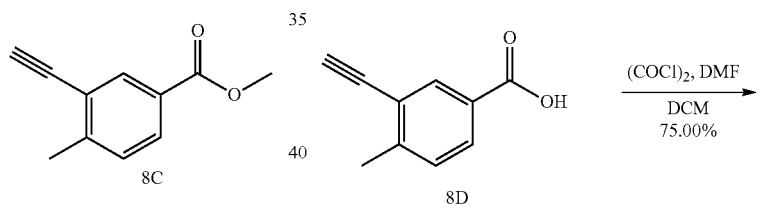

To a stirred solution of methyl 4-methyl-3-[2-(trimethylsilyl)ethynyl]benzoate(4.80 g, 19.482 mmol, 1.00 equiv) in MeOH (40.00 mL) was added K2CO3(13.41 g, 97.020 mmol, 4.98 equiv) at room temperature. The resulting mixture was stirred for 2 h. The resulting mixture was filtered; the filter cake was washed with MeOH (3×10 mL). The filtrate was concentrated under reduced pressure. This resulted in methyl 3-ethynyl-4-methylbenzoate (8C) (3.3 g, 97.24%) as a yellow solid.

Step 4. Synthesis 3-Ethynyl-4-Methylbenzoic Acid (8D)

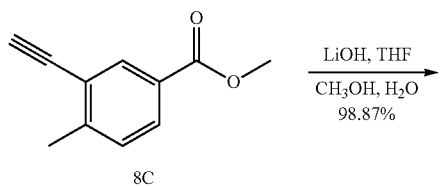

To a stirred solution of [4-amino-2-(trifluoromethyl)phenyl]methanol (1.30 g, 6.801 mmol, 1.00 equiv) and pyrazine (2.72 g, 33.963 mmol, 4.99 equiv) in DCM (25.00 mL) was added 3-ethynyl-4-methylbenzoyl chloride (1.09 g, 6.121 mmol, 0.90 equiv) dropwise at 0° C. The reaction solution was stirred for overnight at room temperature under air atmosphere. The resulting mixture was concentrated under vacuum. The residue was purified by silica gel column chromatography, eluted with PE/EtOAc (2:1) to afford 3-ethynyl-N-[4-(hydroxymethyl)-3-(trifluoromethyl)phenyl]-4-methylbenzamide (8E) (1.7 g, 75.00%) as a dark orange solid.

Step 6. Synthesis of 3-ethynyl-N-[4-hydroxymethyl)-3-(trifluoromethyl)phenyl]-4-methylbenzamide (Cmp. 8F)

Step 7. Synthesis of N-(4-(Chloromethyl)-3-(Trifluoromethylphenyl)-3-Ethynyl-4-Methylbenzamide (Cmp. 8G)

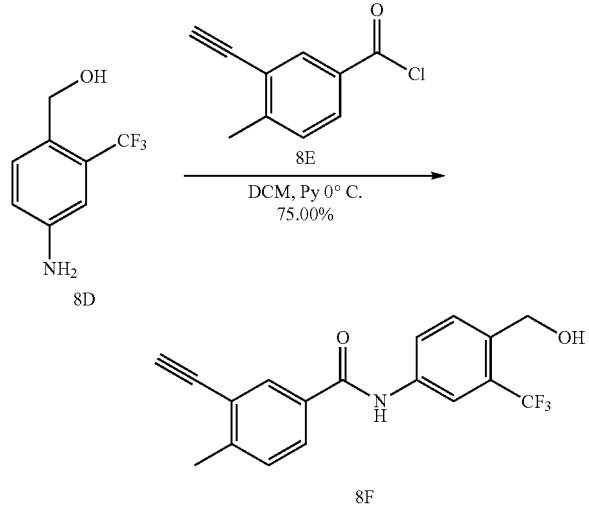

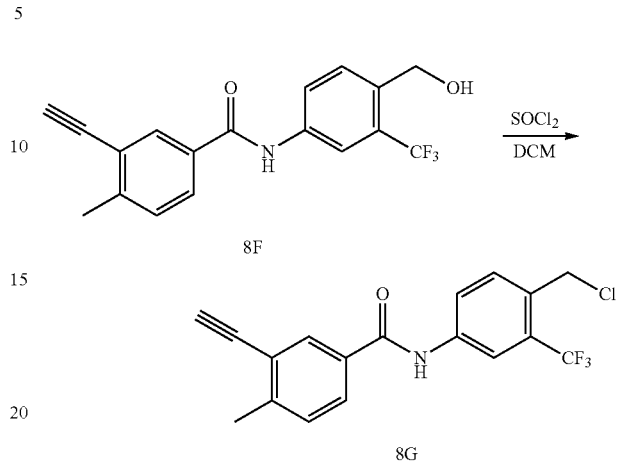

To a stirred solution of [4-amino-2-(trifluoromethyl)phenyl]methanol (2-i) (1.30 g, 6.801 mmol, 1.00 equiv) and pyrazine (2.72 g, 33.963 mmol, 4.99 equiv) in DCM (25.00 mL) was added 3-ethynyl-4-methylbenzoyl chloride (1.09 g, 6.121 mmol, 0.90 equiv) dropwise at 0° C. The reaction solution was stirred for overnight at room temperature under air atmosphere. The resulting mixture was concentrated under vacuum. The residue was purified by silica gel column chromatography, eluted with PE/EtOAc (2:1) to afford 3-ethynyl-N-[4-(hydroxymethyl)-3-(trifluoromethyl)phenyl]-4-methylbenzamide (8F) (1.7 g, 75.00%) as a dark orange solid.

To a stirred solution of 3-ethynyl-N-(4-(hydroxymethyl)-3-(trifluoromethyl)phenyl)-4-methylbenzamide(8F) (1.19 g, 9.991 mmol, 3.00 equiv) in DCM (40.00 mL, 516.870 mmol, 116.40 equiv) was added $SOCl_2$ (2.82 mL, 23.691 mmol, 5.00 equiv) dropwise at room temperature under nitrogen atmosphere. The resulting mixture was concentrated under reduced pressure. This resulted in N-(4-(chloromethyl)-3-(trifluoromethyl)phenyl)-3-ethynyl-4-methylbenzamide (8G) (1.05 g, 64.04%) as a yellow solid.

Step 8. Synthesis of methyl 4-[2-([[4-(3-ethynyl-4-methylbenzamido)-2-(trifluoromethyl)phenyl]methyl]amino)ethyl]piperazine-1-carboxylate (Cmp. 8)

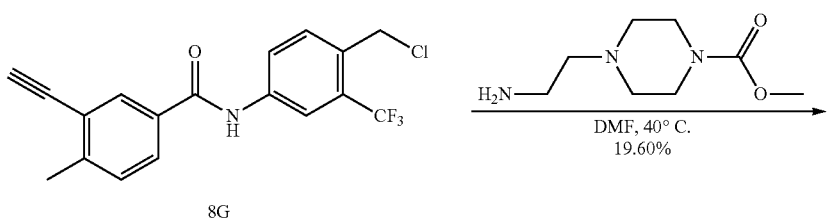

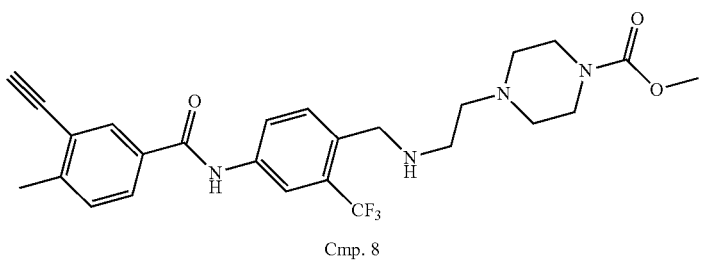

To a stirred solution of methyl 4-(2-aminoethyl)piperazine-1-carboxylate (106.46 mg, 0.569 mmol, 2.00 equiv) in DMF (2.00 mL) were added N-[4-(chloromethyl)-3-(trifluoromethyl)phenyl]-3-ethynyl-4-methylbenzamide (8G) (100.00 mg, 0.284 mmol, 1.00 equiv) in DMF (1.00 mL) dropwise at 40 degrees C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford 76 mg crude product. The crude product was purified by Prep-HPLC with the following conditions (Column: SunFire Prep C18 OBD Column, 19×150 mm 5 μm 10 nm; Mobile Phase A:Water(0.1% FA), Mobile Phase B:ACN; Flow rate:25 mL/min; Gradient:5 B to 8 B in 2 min; 254/220 nm; RT1:9.05; RT2:; Injection Volume: ml; Number Of Runs:;) to afford methyl 4-[2-([[4-(3-ethynyl-4-methylbenzamido)-2-(trifluoromethyl)phenyl]methyl]amino)ethyl]piperazine-1-carboxylate (Cmp. 8) (28 mg, 19.60%) as an off-white solid.

$^1$H NMR (400 MHz, Methanol-$d_4$) δ 8.18 (d, J=2.2 Hz, 1H), 8.00 (dd, J=8.4, 2.3 Hz, 1H), 7.95 (d, J=2.0 Hz, 1H), 7.76 (dd, J=8.0, 2.0 Hz, 1H), 7.63 (d, J=8.4 Hz, 1H), 7.32 (d, J=8.1 Hz, 1H), 4.23 (s, 2H), 3.75 (s, 1H), 3.59 (s, 3H), 3.40 (t, J=5.0 Hz, 4H), 3.06 (t, J=5.8 Hz, 2H), 2.60 (t, J=5.8 Hz, 2H), 2.40 (d, J=11.9 Hz, 7H). LC-MS-PH-AEI-008-0: (ES, m/z): [M+1]=503.15.

Example 13. Synthesis of Tert-Butyl 4-[2-([[4-(3-Ethynyl-4-Methylbenzamido)-2-(Trifluoromethyl)Phenyl]Methyl]Amino)Ethyl]Piperazine-1-Carboxylate (Cmp. 9)

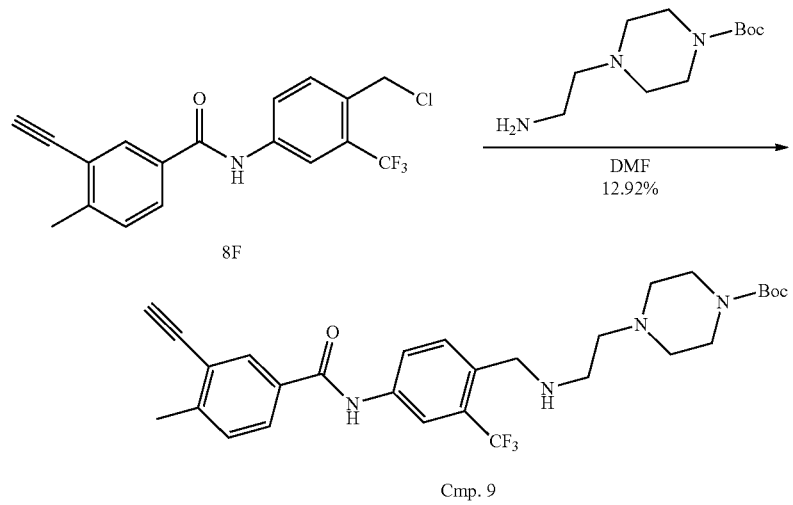

Cmp. 9

To a stirred solution of tert-butyl 4-(2-aminoethyl)piperazine-1-carboxylate (244.48 mg, 1.066 mmol, 1.5 equiv) in DMF(0.55 mL, 7.525 mmol, 10.00 equiv) was added N-[4-(chloromethyl)-3-(trifluoromethyl)phenyl]-3-ethynyl-4-methylbenzamide (8G) (250.00 mg, 0.711 mmol, 1.00 equiv) dropwise at 40° C. under nitrogen atmosphere. The residue product was purified by reverse phase flash with the following conditions (MeCN:water=35:65) to afford tert-butyl 4-[2-([[4-(3-ethynyl-4-methylbenzamido)-2-(trifluoromethyl)phenyl]methyl]amino)ethyl]piperazine-1-carboxylate (Cmp. 9) (50 mg, 12.92%) as a white solid.

$^1$H NMR (400 MHz, Methanol-$d_4$) δ 8.17 (d, J=2.2 Hz, 1H), 8.04 (d, J=2.0 Hz, 1H), 7.96 (dd, J=8.5, 2.3 Hz, 1H), 7.85 (dd, J=8.0, 2.0 Hz, 1H), 7.64 (d, J=8.4 Hz, 1H), 7.41 (d, J=8.1 Hz, 1H), 3.93 (s, 2H), 3.84 (s, 1H), 3.40 (s, 4H), 2.74 (t, J=6.2 Hz, 2H), 2.52 (d, J=6.9 Hz, 5H), 2.37 (t, J=5.1 Hz, 4H), 1.45 (s, 9H). LC-MS: (ES, m/z): [M+1]=545.20.

Example 14. Synthesis of 3-Ethynyl-4-Methyl-n-[3-([[2-(Morpholin-4-Yl)Ethyl]Amino]Methyl)-4-(Trifluoromethyl)Phenyl]Benzamide (Cmp. 10)

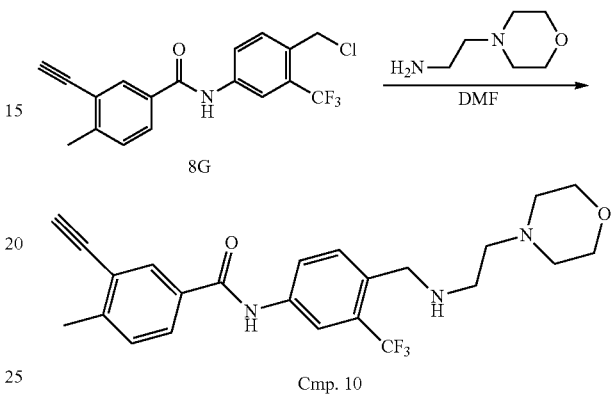

Cmp. 10

To a stirred solution of N-aminoethylmorpholine (231.33 mg, 1.777 mmol, 2.5 equiv) in DMF(2.75 mL, 37.625 mmol, 50.00 equiv) were added N-[4-(chloromethyl)-3-(trifluoromethyl)phenyl]-3-ethynyl-4-methylbenzamide (8B) (250.00 mg, 0.711 mmol, 1.00 equiv) dropwise at room temperature under nitrogen atmosphere. The crude product was purified by reverse phase flash with the following conditions (MeCN:water=35:65) to afford 3-ethynyl-4-methyl-N-[4-([[2-(morpholin-4-yl)ethyl]amino]methyl)-3-(trifluoromethyl)phenyl]benzamide (70 mg, 22.11%) as a yellow solid.

$^1$H NMR (300 MHz, Methanol-$d_4$) δ 8.19 (d, J=2.2 Hz, 1H), 8.06 (d, J=2.0 Hz, 1H), 7.87 (dd, J=8.1, 2.0 Hz, 1H), 7.66 (d, J=8.5 Hz, 1H), 7.43 (d, J=8.1 Hz, 1H), 3.96 (s, 2H), 3.86 (s, 1H), 3.69 (t, J=4.7 Hz, 4H), 2.78 (t, J=6.3 Hz, 2H), 2.53 (s, 3H), 2.44 (t, J=4.7 Hz, 4H). LC-MS: (ES, m/z): [M+1]=446.20.

Example 15. Synthesis of 3-Ethynyl-4-Methyl-N-[4-([[2-(4-Phenylpiperazin-1-Yl)Ethyl]Amino]Methyl)-3-(Trifluoromethyl)Phenyl]Benzamide (Cmp. 11)

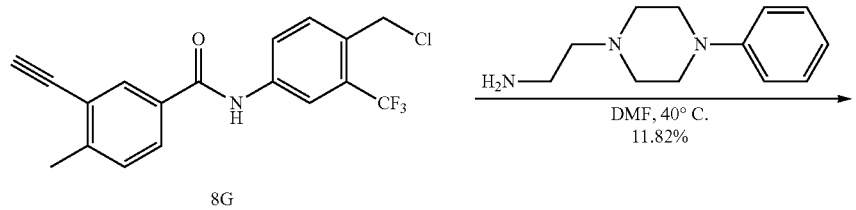

To a stirred solution of 2-(4-phenylpiperazin-1-yl)ethanamine(145.92 mg, 0.711 mmol, 2.50 equiv) in DMF (2.00 mL) were added N-[4-(chloromethyl)-3-(trifluoromethyl)phenyl]-3-ethynyl-4-methylbenzamide (8G) (100.00 mg, 0.284 mmol, 1.00 equiv) in DMF (2.00 mL) dropwise at 40 degrees C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford 76 mg crude product. The crude product was purified by Prep-HPLC with the following conditions (Column: XBridge Shield RP18 OBD Column, 5 um, 19*150 mm; Mobile Phase A:Water (0.05% $NH_3H_2O$), Mobile Phase B:ACN; Flow rate:25 mL/min; Gradient:55 B to 75 B in 8 min; 254/220 nm; RT1:6.99; RT2:; Injection Volume: ml; Number Of Runs:;) to afford 3-ethynyl-4-methyl-N-[4-([[2-(4-phenylpiperazin-1-yl)ethyl]amino]methyl)-3-(trifluoromethyl)phenyl]benzamide (Cmp. 11) (17.5 mg, 11.82%) as an off-white solid.

$^1$H NMR (300 MHz, Methanol-$d_4$) δ 8.19 (d, J=2.2 Hz, 1H), 8.06 (d, J=2.0 Hz, 1H), 7.98 (dd, J=8.5, 2.3 Hz, 1H), 7.87 (dd, J=8.0, 2.0 Hz, 1H), 7.67 (d, J=8.5 Hz, 1H), 7.43 (d, J=8.1 Hz, 1H), 7.31-7.18 (m, 2H), 7.02-6.92 (m, 2H), 6.85 (tt, J=7.3, 1.1 Hz, 1H), 3.96 (s, 2H), 3.86 (s, 1H), 3.22-3.13 (m, 4H), 2.80 (t, J=6.3 Hz, 2H), 2.66-2.61 (m, 3H), 2.61-2.50 (m, 6H). LC-MS-PH-AEI-013-0: (ES, m/z): [M+1]= 521.3.

Example 16. Synthesis of 3-Ethynyl-4-Methyl-n-[4-([[2-(Piperazin-1-Yl)Ethyl]Amino]Methyl)-3-(Trifluoromethyl)Phenyl]Benzamide (Cmp. 12)

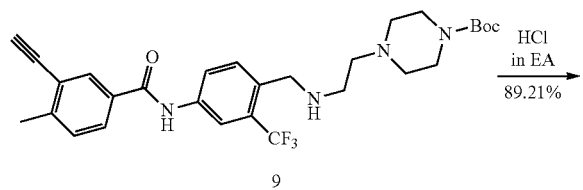

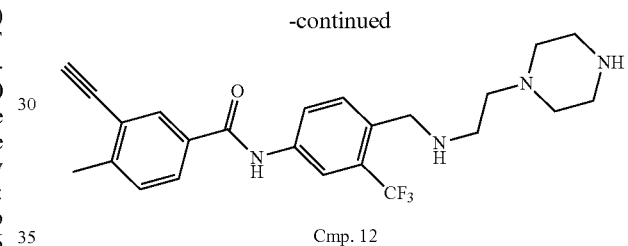

A mixture of tert-butyl 4-[2-([[4-(3-ethynyl-4-methylbenzamido)-2-(trifluoromethyl)phenyl]methyl]amino)ethyl]piperazine-1-carboxylate (Cmp. 9) (58 mg, 0.106 mmol, 1.00 equiv) in Hydrogen chloride solution 2 μM in diethyl ether (3.00 mL) was stirred for 2 h at room temperature. The resulting mixture was concentrated under vacuum. The residue was purified by reverse flash chromatography with the following conditions: column, C18 silica gel; mobile phase, ACN in water, 5% to 100% gradient in 30 min; detector, UV 254 nm to afford crude product (80 mg). The crude product was purified by Prep-HPLC with the following conditions (Column: XBridge Prep C18 OBD Column, 5 um, 19*150 mm; Mobile Phase A:Water(0.05% $NH_3H_2O$), Mobile Phase B:ACN; Flow rate:25 mL/min; Gradient:26 B to 54 B in 10 min; 254/220 nm; RT1:7.88; RT2:; Injection Volume: ml; Number Of Runs:;) to afford 3-ethynyl-4-methyl-N-[4-([[2-(piperazin-1-yl)ethyl]amino]methyl)-3-(trifluoromethyl)phenyl]benzamide (Cmp. 12) (42.7 mg, 89.21%) as an off-white solid.

$^1$H NMR (300 MHz, Methanol-$d_4$) δ 8.19 (d, J=2.3 Hz, 1H), 8.06 (d, J=2.0 Hz, 1H), 7.98 (dd, J=8.4, 2.3 Hz, 1H), 7.87 (dd, J=8.0, 2.0 Hz, 1H), 7.66 (d, J=8.5 Hz, 1H), 7.43 (d, J=8.1 Hz, 1H), 3.95 (s, 2H), 3.86 (s, 1H), 2.90 (t, J=5.0 Hz, 4H), 2.76 (t, J=6.3 Hz, 2H), 2.54 (d, J=3.8 Hz, 5H), 2.49 (s, 2H), 2.47 (s, 2H). LC-MS-PH-AEI-014-0: (ES, m/z): [M+1]= 445.4.

Example 17. Synthesis of 3-(2-[Imidazo[1,2-b]Pyridazin-3-Yl]Ethynyl)-4-Methyl-n-[4-([[2-(Piperazin-1-Yl)Ethyl]Amino]Methyl)-3-(Trifluoromethyl)Phenyl]Benzamide (Cmp. 13)

Step 1. Synthesis of Tert-Butyl 4-[2-[([4-[3-(2-[Imidazo[1,2-b]Pyridazin-3-Yl]Ethynyl)-4-Methylbenzamido-2-(Trifluoromethyl)Phenyl]Methyl)Amino]Ethyl]Piperazine-1-Carboxylate (Cmp. 13A)

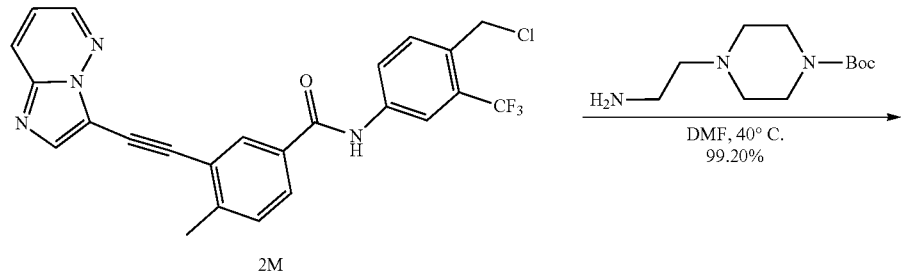

2M

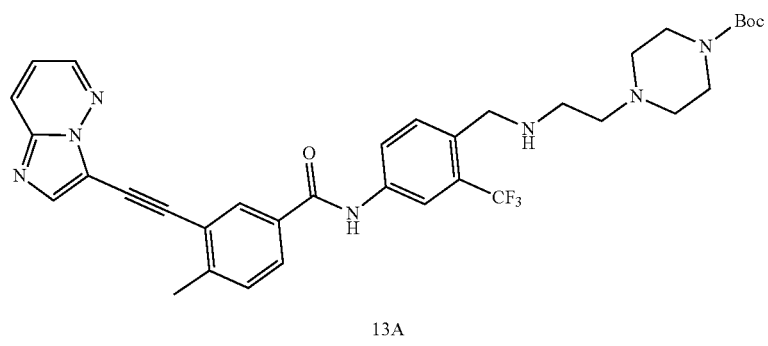

13A

To a stirred solution of tert-butyl 4-(2-aminoethyl)piperazine-1-carboxylate (733.66 mg, 3.199 mmol, 3 equiv) in DMF (10.00 mL) were added N-[4-(chloromethyl)-3-(trifluoromethyl)phenyl]-3-(2-[imidazo[1,2-b]pyridazin-3-yl]ethynyl)-4-methylbenzamide (2M) (500.00 mg, 1.066 mmol, 1.00 equiv) in DMF (10.00 mL) dropwise at 40° C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford tert-butyl 4-[2-[([4-[3-(2-[imidazo[1,2-b]pyridazin-3-yl]ethynyl)-4-methylbenzamido]-2-(trifluoromethyl)phenyl]methyl)amino]ethyl]piperazine-1-carboxylate (13A) (700 mg, 99.20%) as a brown solid.

Step 2. Synthesis of 3-(2-[imidazo[1,2-b]pyridazin-3-yl]ethynyl)-4-methyl-N-[4-([[2-(piperazin-1-yl)lethyl]amino]methyl)-3-(trifluoromethyl)phenyl]benzamide (Cmp. 13)

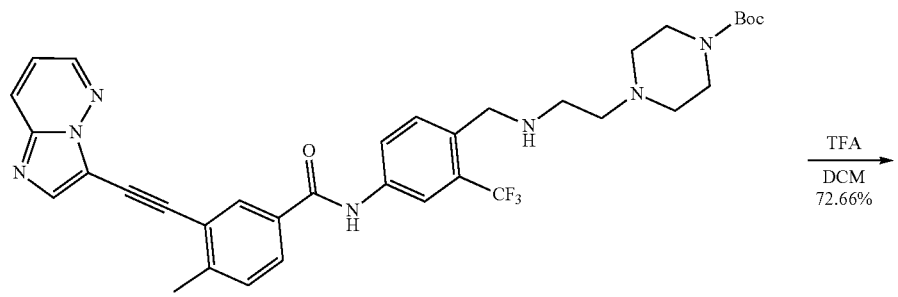

13A

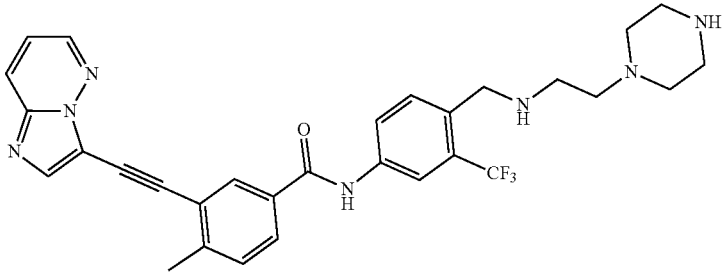

Cmp. 13

To a stirred mixture of tert-butyl 4-[2-[([4-[3-(2-[imidazo[1,2-b]pyridazin-3-yl]ethynyl)-4-methylbenzamido]-2-(trifluoromethyl)phenyl]methyl)amino]ethyl]piperazine-1-carboxylate (13A) (700.00 mg, 1.058 mmol, 1.00 equiv) in DCM (14.00 mL) was added trifluoroacetaldehyde (2 mL) in portions at 0° C. The reaction solution was stirred for overnight at room temperature. The resulting mixture was concentrated under vacuum. The residue was purified by reverse flash chromatography with the following conditions: column, C18 silica gel; mobile phase, ACN in water, 5% to 100% gradient in 30 min; detector, UV 254 nm. This resulted in 3-(2-[imidazo[1,2-b]pyridazin-3-yl]ethynyl)-4-methyl-N-[4-([[2-(piperazin-1-yl)ethyl]amino]methyl)-3-(trifluoromethyl)phenyl]benzamide (444 mg, 72.66%) as an off-white solid.

$^1$H NMR (300 MHz, Methanol-$d_4$) δ 8.64 (dd, J=4.5, 1.6 Hz, 1H), 8.51 (s, 1H), 8.31 (d, J=2.2 Hz, 1H), 8.19 (d, J=2.0 Hz, 1H), 8.16-8.05 (m, 3H), 7.92 (dd, J=8.0, 2.0 Hz, 1H), 7.76 (d, J=8.4 Hz, 1H), 7.50 (d, J=8.1 Hz, 1H), 7.38 (dd, J=9.2, 4.4 Hz, 1H), 4.27 (s, 2H), 3.25 (t, J=5.1 Hz, 4H), 3.11 (t, J=5.8 Hz, 2H), 2.75 (t, J=5.6 Hz, 6H), 2.67 (s, 3H). LC-MS-PH-AEI-015-2: (ES, m/z): [M+1]=562.35.

Example 18. Synthesis of 3-Ethynyl-4-Methyl-N-(4-(((2-(4-(Pyridin-2-Yl)Piperazin-1-Yl)Ethyl)Amino)Methyl)-3-(Trifluoromethyl)Phenyl)Benzamide (Cmp. 14)

Step 1. Synthesis of 2-(4-(pyridin-2-yl)piperazin-1-yl)ethyl)carbamate (14A)

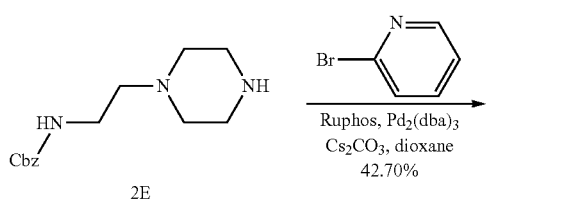

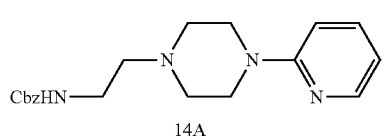

To a stirred mixture of benzyl N-[2-(piperazin-1-yl)ethyl]carbamate(1.00 g, 3.797 mmol, 1.00 equiv), Cs2CO3(1.22 g, 15.189 mmol, 4.00 equiv) and Ruphos(8.7 mg, 0.038 mmol, 0.1 equiv), Pd2(dba)3 (12.9 mg, 0.038 mmol, 0.1 equiv) in dioxane(20.00 mL) was added 2-bromopyridine (0.68 g, 4.5 mmol, 1.2 equiv) at room temperature. The resulting mixture was stirred for overnight at 100° C. under N$_2$ atmosphere. The resulting mixture was filtered; the filter cake was washed with THF (3×10 mL). The filtrate was concentrated under reduced pressure. The residue was purified by reverse flash chromatography with the following conditions: column, C18 silica gel; mobile phase, ACN in water, 5% to 100% gradient in 20 min; detector, UV 254 nm. This resulted in benzyl (2-(4-(pyridin-2-yl)piperazin-1-yl)ethyl)carbamate (345 mg, 26.77%) as a white oil.

Step 2. Synthesis of 2-(4-(pyridin-2-l)piperazin-1-ylethan-1-amine (14B)

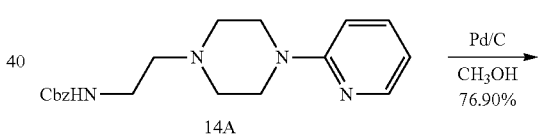

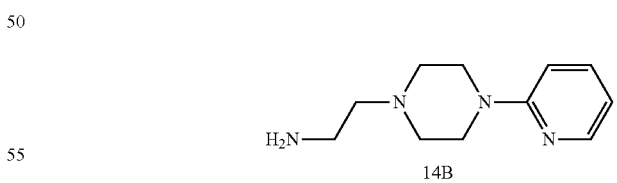

To a stirred mixture of benzyl (2-(4-(pyridin-2-yl)piperazin-1-yl)ethyl)carbamate (344 mg, 1.013 mmol, 1.00 equiv) in MeOH(7.00 mL) was added Pd/C(100.00 mg, 0.940 mmol, 0.93 equiv). The reaction mixture was stirred for 2 h at room temperature under hydrogen atmosphere. The resulting mixture was filtered, the filter cake was washed with MeOH (3×5 mL). Then the MeOH was evaporated to obtain 2-(4-(pyridin-2-yl)piperazin-1-yl)ethan-1-amine (14B) (160 mg, 76.90%) as a light yellow oil.

Step 3. Synthesis of 3-ethynyl-4-methyl-N-(4-(((2-(4-(pyridin-2-yl)piprazin-1-yl)ethyl)amino)methyl)-3-(trifluoromethyl)phenyl benzamide (14)

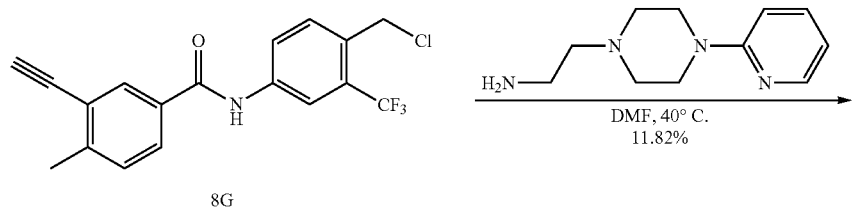

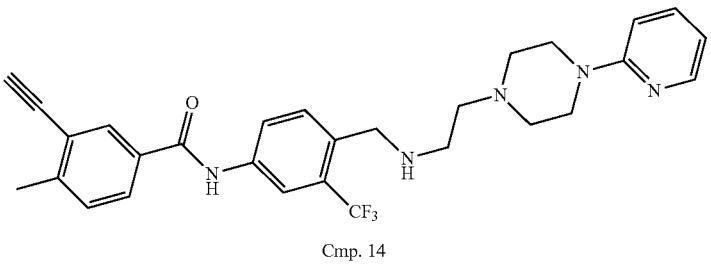

Cmp. 14

To a stirred solution of 2-(4-phenylpiperazin-1-yl)ethanamine (14B) (145.92 mg, 0.711 mmol, 2.50 equiv) in DMF (2.00 mL) were added 2-(4-(pyridin-2-yl)piperazin-1-yl)ethan-1-amine (100.00 mg, 0.284 mmol, 1.00 equiv) in DMF (2.00 mL) dropwise at 40° C. under air atmosphere. The reaction mixture was stirred for 2 h at 40° C. The mixture was purified by reverse flash chromatography with the following conditions: column, C18 silica gel; mobile phase, ACN in water, 5% to 100% gradient in 30 min; detector, UV 254 nm to afford 76 mg crude product. The crude product was purified by Prep-HPLC with the following conditions (Column: XBridge Shield RP18 OBD Column, 5 um, 19*150 mm; Mobile Phase A:Water(0.05% $NH_3H_2O$), Mobile Phase B:ACN; Flow rate:25 mL/min; Gradient:55 B to 75 B in 8 min; 254/220 nm; RT1:6.99; RT2:; Injection Volume: ml; Number Of Runs:;) to afford 3-ethynyl-4-methyl-N-(4-(((2-(4-(pyridin-2-yl)piperazin-1-yl)ethyl)amino)methyl)-3-(trifluoromethyl)phenyl)benzamide (Cmp. 14) (17.5 mg, 11.82%) as an off-white solid.

$^1$H NMR (300 MHz, Methanol-d$_4$) δ 8.19 (d, J=2.2 Hz, 1H), 8.06 (d, J=2.0 Hz, 1H), 7.98 (dd, J=8.5, 2.3 Hz, 1H), 7.87 (dd, J=8.0, 2.0 Hz, 1H), 7.43 (d, J=8.1 Hz, 1H), 7.31-7.18 (m, 2H), 7.02-6.92 (m, 2H), 6.85 (tt, J=7.3, 1.1 Hz, 1H), 3.96 (s, 2H), 3.86 (s, 1H), 3.22-3.13 (m, 4H), 2.80 (t, J=6.3 Hz, 2H), 2.66-2.61 (m, 3H), 2.61-2.50 (m, 6H). LC-MS-PH-AEI-017-0: (ES, m/z): [M+1]=522.35.

What is claimed is:

1. A compound having the structure

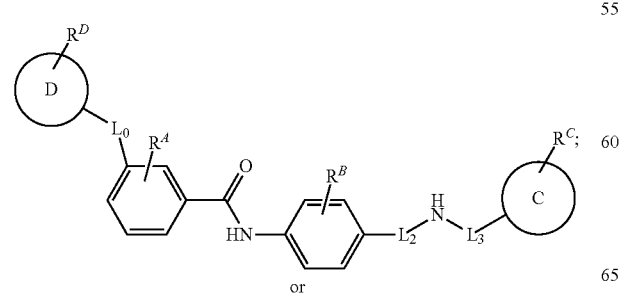

or

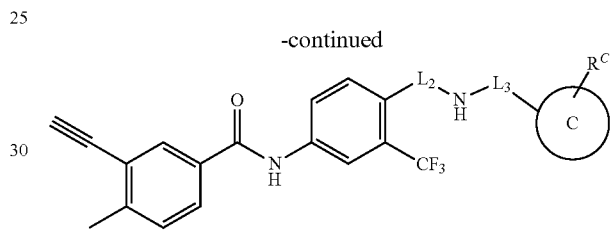

or a pharmaceutically acceptable salt or any of the foregoing, where

Ring C is a 5-6-membered heterocycloalkyl, partially unsaturated, or heteroaryl group containing at least one Nitrogen ring atom and containing 0-3 additional ring heteroatoms independently chosen from N, O, and S, that is optionally substituted by one or more substituents independently chosen from $R^C$;

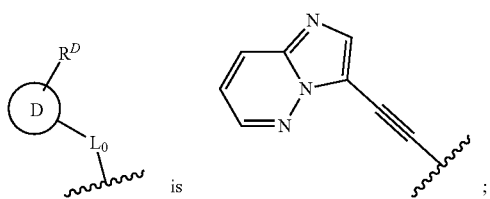
is
;

$L_2$ is a $C_1$-$C_4$alkylene linker in which one single bond is optionally replaced by a triple bond;

$L_3$ is a bond or a $C_1$-$C_4$alkylene linker, which is optionally substituted with an oxo group;

$R^A$, $R^B$, and $R^D$ are independently chosen at each occurrence from halogen, hydroxyl, cyano, nitro, amino, oxo, and Y;

$R^C$ is independently chosen at each occurrence from halogen, hydroxyl, cyano, nitro, amino, oxo, —SO$_2$F, —SO$_2$NH$_2$, Y, and Z;

Y is a $C_1$-$C_8$ alkyl group, optionally chosen at each occurrence, in which any single bond is optionally replaced by a double or triple bond and one or more CH$_2$ groups in the $C_1$-$C_8$alkyl is optionally replaced by —O—, —S—, —S(=O)—, —S(=O)₂—, —P(=O)—, or N(R²)—, and which is optionally substituted by one or more substituents independently chosen from halogen, hydroxyl, amino, cyano, oxo (=O), thiol (—SH), thione (=S), =NR¹, and $C_3$-$C_6$cycloalkyl;

Z is $C_3$-$C_6$cycloalkyl, $C_3$-$C_6$cycloalkenyl($C_0$-$C_2$alkyl)-, aryl($C_0$-$C_2$alkyl)-, (5- to 7-membered heterocycloalkyl)($C_0$-$C_2$alkyl)-, (5- to 6-membered partially unsaturated heterocycloalkyl)($C_0$-$C_2$alkyl), or (5- to 6 membered heteroaryl)($C_0$-$C_2$alkyl)-, which Z is optionally substituted by one or more substituents independently chosen from halogen, hydroxyl, cyano, nitro, oxo, amino, —SO₂F, —SO₂CH₃, and $C_1$-$C_6$ alkyl, in which any single bond is optionally replaced by a double or triple bond, and each —CH₂ group is optionally replaced by a S, N, or O heteroatom and which is optionally substituted by one or more independently chosen halogen, hydroxyl, amino, cyano, oxo, and amino substituents; and R² is independently chosen and each occurrence from hydrogen, $C_1$-$C_6$alkyl, and ($C_3$-$C_6$cycloalkyl)$C_0$-$C_4$alkyl.

2. A compound or salt of claim 1, wherein $R^A$ is 4-methyl and $R^B$ is 3-trifluoromethyl.

3. A compound of claim 1, of the formula

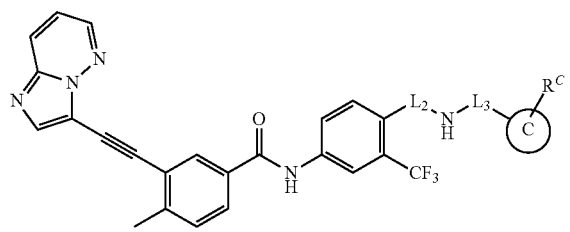

or a pharmaceutically acceptable salt thereof, wherein $L_2$ is —CH₂—, —≡—, or —≡—CH₂ and $L_3$ is a bond, —CH₂—, or —CH₂CH₂—.

4. A compound of claim 1, of the formula

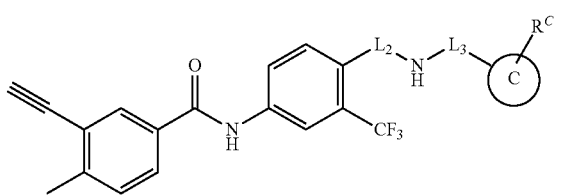

or a pharmaceutically acceptable salt thereof,
wherein $L_2$ is —CH₂—, —C≡C—, or —C≡C—CH₂ and $L_3$ is a bond, —CH₂—, or —CH₂CH₂—.

5. A compound or salt of claim 1 wherein
$L_3$ is —CH₂CH₂; and
Ring C is a morpholine, thiomorpholine, or piperazine group that is unsubstituted or substituted with 1 or 2 substituents independently chosen from halogen, oxo, $C_1$-$C_2$alkyl, and $C_1$-$C_2$alkoxy.

6. A compound or salt of claim 1, wherein
Ring C

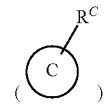

is a morpholine, piperidine, piperazine, oxadiazine, pyridine, pyrimidine, tetrahydropyrimidine, or dihydropyrimidine ring and the Ring C substituent; and
Y is a $C_1$-$C_6$ alkyl group, in which any single bond is optionally replaced by a double or triple bond and one or more CH₂ groups in the $C_1$-$C_6$alkyl is optionally replaced by —O—, —S—, or N(R²)—, and which is optionally substituted by one or more substituents independently chosen from halogen, hydroxyl, amino, and oxo (=O).

7. A compound or salt of claim 1, wherein
Ring C

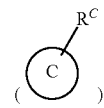

is a morpholine, piperidine, piperazine, oxadiazine, pyridine, pyrimidine, tetrahydropyrimidine, or dihydropyrimidine ring and the Ring C substituent,
$R^C$, is zero, or one or more substituents independently chosen from oxo, —$C_1$-$C_4$alkyl, —SO₂F, —SO₂NH₂, —SO₂$C_1$-$C_4$alkyl, —C(=O)O$C_1$-$C_4$alkyl, and trifluoromethyl.

8. A compound of claim 1, or a pharmaceutically acceptable salt thereof, wherein the compound is
3-(imidazo[1,2-b]pyridazin-3-ylethynyl)-4-methyl-N-(4-(((2-morpholinoethyl)amino)methyl)-3-(trifluoromethyl)phenyl)benzamide;
N-(4-(((1-(6-ethylpyrimidin-4-yl)piperidin-4-yl)amino) methyl)-3-(trifluoromethyl)phenyl)-3-(imidazo[1,2-b] pyridazin-3-ylethynyl)-4-methylbenzamide;
4-[2-[([4-[3-(2-[imidazo[1,2-b]pyridazin-3-yl]ethynyl)-4-methylbenzamido]-2-(trifluoromethyl)phenyl] methyl]amino]ethyl]piperazine-1-carboxylate;
3-(imidazo[1,2-b]pyridazin-3-ylethynyl)-N-(4-(((2-(4-(6-methoxypyrimidin-4-yl)piperazin-1-yl)ethyl)amino) methyl)-3-(trifluoromethyl)phenyl)-4-methylbenzamide;
3-(imidazo[1,2-b]pyridazin-3-ylethynyl)-4-methyl-N-(4-(((2-(4-oxopiperidin-1-yl)ethyl)amino)methyl)-3-(trifluoromethyl)phenyl)benzamide;
3-(imidazo[1,2-b]pyridazin-3-ylethynyl)-4-methyl-N-(4-(((2-(4-(methylsulfonyl)piperazin-1-yl)ethyl)amino) methyl)-3-(trifluoromethyl)phenyl)benzamide;
3-(imidazo[1,2-b]pyridazin-3-ylethynyl)-4-methyl-N-(4-(((2-(pyrimidin-4-yl)ethyl)amino)methyl)-3-(trifluoromethyl)phenyl)benzamide;
Methyl 4-[2-([[4-(3-Ethynyl-4-Methylbenzamido)-2-(Trifluoromethyl)Phenyl]Methyl]Amino)Ethyl]Piperazine-1-Carboxylate;
Tert-Butyl 4-[2-([[4-(3-Ethynyl-4-Methylbenzamido)-2-(Trifluoromethyl)Phenyl]Methyl]Amino)Ethyl]Piperazine-1-Carboxylate;

3-ethynyl-4-methyl-N-(4-(((2-morpholinoethyl)amino) methyl)-3-(trifluoromethyl)phenyl)benzamide;

3-Ethynyl-4-Methyl-N-[4-([[2-(4-Phenylpiperazin-1-yl) Ethyl]Amino]Methyl)-3-(Trifluoromethyl)Phenyl]benzamide;

3-Ethynyl-4-Methyl-N-[4-([[2-(Piperazin-1-yl)Ethyl] Amino]Methyl)-3-(Trifluoromethyl)Phenyl]benzamide;

3-(2-[imidazo[1,2-b]pyridazin-3-yl]ethynyl)-4-methyl-N-[4-([[2-(piperazin-1-yl)ethyl]amino]methyl)-3-(trifluoromethyl)phenyl]benzamide;

3-Ethynyl-4-Methyl-N-(4-(((2-(4-(Pyridin-2-yl)Piperazin-1-yl)Ethyl)Amino)Methyl)-3-(Trifluoromethyl) Phenyl) benzamide;

3-(imidazo[1,2-b]pyridazin-3-ylethynyl)-4-methyl-N-(4-(((2-(5-oxo-2-(trifluoromethyl)-5,6-dihydropyrimidin-4-yl)ethyl)amino)methyl)-3-(trifluoromethyl)phenyl) benzamide;

3-(imidazo[1,2-b]pyridazin-3-ylethynyl)-4-methyl-N-(4-(((2-(2-oxomorpholino)ethyl)amino)methyl)-3-(trifluoromethyl)phenyl)benzamide;

N-(4-(((2-(3,5-dioxopiperazin-1-yl)ethyl)amino)methyl)-3-(trifluoromethyl)phenyl)-3-(imidazo[1,2-b]pyridazin-3-ylethynyl)-4-methylbenzamide;

3-(imidazo[1,2-b]pyridazin-3-ylethynyl)-4-methyl-N-(4-(((2-(6-oxo-1,3,4-oxadiazinan-4-yl)ethyl)amino) methyl)-3-(trifluoromethyl)phenyl)benzamide;

3-(imidazo[1,2-b]pyridazin-3-ylethynyl)-4-methyl-N-(4-(((2-(5-oxo-2-(trifluoromethyl)-5,6-dihydropyrimidin-4-yl)ethyl)amino)methyl)-3-(trifluoromethyl)phenyl) benzamide;

N-(4-(((2-(2,5-dioxo-1,2,5,6-tetrahydropyrimidin-4-yl) ethyl)amino)methyl)-3-(trifluoromethyl)phenyl)-3-(imidazo[1,2-b]pyridazin-3-ylethynyl)-4-methylbenzamide;

3-(imidazo[1,2-b]pyridazin-3-ylethynyl)-4-methyl-N-(4-(3-((2-morpholinoethyl)amino)prop-1-yn-1-yl)-3-(trifluoromethyl) phenyl)benzamide;

3-(imidazo[1,2-b]pyridazin-3-ylethynyl)-4-methyl-N-(4-(((2-(4-sulfamoylpiperazin-1-yl)ethyl)amino)methyl)-3-(trifluoromethyl)phenyl)benzamide;

N-(4-(((2-(4-(hydroxymethyl)piperazin-1-yl)ethyl) amino)methyl)-3-(trifluoromethyl)phenyl)-3-(imidazo [1,2-b]pyridazin-3-ylethynyl)-4-methylbenzamide;

3-(imidazo[1,2-b]pyridazin-3-ylethynyl)-4-methyl-N-(4-(((2-(4-(pyrimidin-4-yl)piperazin-1-yl)ethyl)amino) methyl)-3-(trifluoromethyl)phenyl)benzamide;

N-(4-(((2-(2,6-dioxomorpholino)ethyl)amino)methyl)-3-(trifluoromethyl)phenyl)-3-(imidazo[1,2-b]pyridazin-3-ylethynyl)-4-methylbenzamide;

3-(imidazo[1,2-b]pyridazin-3-ylethynyl)-4-methyl-N-(4-(((2-(6-methylpyrimidin-4-yl)ethyl)amino)methyl)-3-(trifluoromethyl)phenyl)benzamide;

3-(imidazo[1,2-b]pyridazin-3-ylethynyl)-4-methyl-N-(3-(trifluoromethyl)-4-(((2-(4-(4-(trifluoromethyl)pyridin-2-yl)piperazin-1-yl)ethyl)amino) methyl)phenyl) benzamide;

methyl 5-(2-((4-(3-(imidazo[1,2-b]pyridazin-3-ylethynyl)-4-methylbenzamido)-2-(trifluoromethyl)benzyl) amino)ethyl)pyrazine-2-carboxylate;

4-(4-(2-((4-(3-(imidazo[1,2-b]pyridazin-3-ylethynyl)-4-methylbenzamido)-2-(trifluoromethyl)benzyl)amino) ethyl)piperazin-1-yl)benzenesulfonyl fluoride;

3-ethynyl-4-methyl-N-(4-(3-((2-morpholinoethyl)amino) prop-1-yn-1-yl)-3-(trifluoromethyl) phenyl)benzamide;

4-methyl-N-(4-(3-((2-morpholinoethyl)amino)prop-1-yn-1-yl)-3-(trifluoromethyl) phenyl)-3-vinylbenzamide;

3-ethynyl-4-methyl-N-(4-(3-((2-(4-(methylsulfonyl)piperazin-1-yl)ethyl)amino)prop-1-yn-1-yl)-3-(trifluoromethyl)phenyl)benzamide;

N-(4-(3-((2-(3,5-dioxopiperazin-1-yl)-2-oxoethyl)amino) prop-1-yn-1-yl)-3-(trifluoromethyl)phenyl)-3-ethynyl-4-methylbenzamide;

3-ethynyl-4-methyl-N-(4-(3-((2-(4-oxopiperidin-1-yl) ethyl)amino)prop-1-yn-1-yl)-3-(trifluoromethyl)phenyl)benzamide;

3-ethynyl-4-methyl-N-(4-(3-((2-(piperazin-1-yl)ethyl) amino)prop-1-yn-1-yl)-3-(trifluoromethyl) phenyl) benzamide;

methyl 4-(2-((4-(3-ethynyl-4-methylbenzamido)-2-(trifluoromethyl)benzyl)amino)ethyl)piperazine-1-carboxylate;

3-ethynyl-4-methyl-N-(4-(3-((2-(4-phenylpiperazin-1-yl) ethyl)amino)prop-1-yn-1-yl)-3-(trifluoromethyl)phenyl)benzamide;

3-ethynyl-4-methyl-N-(4-(((2-(4-oxopiperidin-1-yl) ethyl)amino)methyl)-3-(trifluoromethyl)phenyl)benzamide;

N-(4-(((2-(3,5-dioxopiperazin-1-yl)ethyl)amino)methyl)-3-(trifluoromethyl)phenyl)-3-ethynyl-4-methylbenzamide;

3-ethynyl-4-methyl-N-(4-(((2-(4-(pyrimidin-4-yl)piperazin-1-yl)ethyl)amino)methyl)-3-(trifluoromethyl)phenyl)benzamide;

3-ethynyl-4-methyl-N-(4-(((2-(4-phenylpiperazin-1-yl) ethyl)amino)methyl)-3-(trifluoromethyl)phenyl)benzamide; or 4-(4-(2-((4-(3-ethynyl-4-methylbenzamido)-2-(trifluoromethyl)benzyl)amino)ethyl)piperazin-1-yl)benzenesulfonyl fluoride.

9. A pharmaceutical composition comprising a compound of claim 1, or a pharmaceutically acceptable salt thereof, together with a pharmaceutically acceptable carrier.

10. A method of treating a patient suffering from a cancer comprising administering a therapeutically effective amount of a compound or salt thereof of claim 1, to the patient, wherein the cancer is a cancer containing a BRAF mutation and the cancer is selected from melanoma, thyroid cancer, hairy cell leukemia, ovarian cancer, lung cancer, or colorectal cancer.

11. A method of treating a patient suffering from a cancer, comprising
(a) determining that a cell of the cancer contains a $BRAF^{V600E}$ mutation, and
(b) administering a therapeutically effective amount of a compound or salt thereof of claim 1, to the patient.

12. The method of claim 10, wherein the compound or salt thereof of claim 3 is a first active agent and is administered together with at least one additional active agent.

* * * * *